(12) United States Patent
Yasukawa et al.

(10) Patent No.: US 8,132,049 B2
(45) Date of Patent: Mar. 6, 2012

(54) FAILURE DIAGNOSIS METHOD, FAILURE DIAGNOSIS APPARATUS, CONVEYANCE DEVICE, IMAGE FORMING APPARATUS, PROGRAM, AND STORAGE MEDIUM

(75) Inventors: Kaoru Yasukawa, Kanagawa (JP); Kouji Adachi, Kanagawa (JP); Kouki Uwatoko, Kanagawa (JP); Norikazu Yamada, Kanagawa (JP); Eigo Nakagawa, Kanagawa (JP); Tetsuichi Satonaga, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 739 days.

(21) Appl. No.: 11/064,126

(22) Filed: Feb. 23, 2005

(65) Prior Publication Data

US 2005/0262394 A1  Nov. 24, 2005

(30) Foreign Application Priority Data

Apr. 21, 2004  (JP) ................................ 2004-125675

(51) Int. Cl.
*G06F 11/00* (2006.01)
(52) U.S. Cl. .......................................... 714/26; 714/48
(58) Field of Classification Search .................... 714/26, 714/48
See application file for complete search history.

(56) References Cited

U.S. PATENT DOCUMENTS

| | | | | |
|---|---|---|---|---|
| 4,551,813 A * | 11/1985 | Sanbayashi et al. | ........... | 700/306 |
| 4,924,320 A * | 5/1990 | Tanaka et al. | ................ | 358/296 |
| 4,985,857 A * | 1/1991 | Bajpai et al. | .................. | 702/184 |
| 5,053,815 A * | 10/1991 | Wendell | ......................... | 399/10 |
| 5,113,489 A * | 5/1992 | Cihiwsky et al. | ............ | 358/1.14 |
| 5,528,347 A | 6/1996 | Kamath et al. | | |
| 5,754,738 A * | 5/1998 | Saucedo et al. | ................. | 706/11 |
| 5,790,916 A * | 8/1998 | Sawada | ............................ | 399/21 |
| 5,847,658 A * | 12/1998 | Irie et al. | ....................... | 340/683 |
| 6,003,980 A * | 12/1999 | Sheinman et al. | .............. | 347/78 |
| 6,229,972 B1 * | 5/2001 | Rushing | ......................... | 399/74 |
| 6,336,007 B1 * | 1/2002 | Sugisaki et al. | ................ | 399/11 |
| 6,415,276 B1 * | 7/2002 | Heger et al. | ..................... | 706/52 |
| 6,519,552 B1 | 2/2003 | Sampath et al. | | |
| 6,532,454 B1 * | 3/2003 | Werbos | .......................... | 706/14 |
| 6,535,865 B1 * | 3/2003 | Skaaning et al. | ............... | 706/52 |
| 6,571,000 B1 * | 5/2003 | Rasmussen et al. | .......... | 382/112 |

(Continued)

FOREIGN PATENT DOCUMENTS

JP  A-04-355772  12/1992

(Continued)

OTHER PUBLICATIONS

U.S. Appl. No. 11/064,028, dated Feb. 23, 2005, Uwatoko et al.

(Continued)

*Primary Examiner* — Scott Baderman
*Assistant Examiner* — Loan L. T. Truong
(74) *Attorney, Agent, or Firm* — Oliff & Berridge, PLC

(57) ABSTRACT

A failure diagnosis method diagnoses a failure occurring in a diagnosis target apparatus including a drive mechanism having a drive member that receives power supply to operate and a power transmission member that transmits drive force of the drive member to another member. The method includes automatically acquiring by a sensor an operation state signal indicating an operation state during the drive mechanism operating for a predetermined period; and analyzing the automatically acquired operation state signal based on a failure probability model, which is obtained by modeling a cause of failure occurring in the diagnosis target apparatus with using probabilities, to execute failure diagnosis with respect to each of constituent members of the drive mechanism.

7 Claims, 22 Drawing Sheets

U.S. PATENT DOCUMENTS

| | | | |
|---|---|---|---|
| 6,618,691 B1* | 9/2003 | Hugo | 702/181 |
| 6,665,425 B1 | 12/2003 | Sampath et al. | |
| 6,735,484 B1* | 5/2004 | Lenz | 700/51 |
| 6,772,036 B2* | 8/2004 | Eryurek et al. | 700/127 |
| 6,782,345 B1 | 8/2004 | Siegel et al. | |
| 6,901,340 B1* | 5/2005 | Pasadyn et al. | 702/84 |
| 6,944,408 B2* | 9/2005 | Holzner | 399/24 |
| 7,174,264 B2* | 2/2007 | Yasukawa et al. | 702/115 |
| 7,243,045 B2* | 7/2007 | Uwatoko et al. | 702/183 |
| 7,346,404 B2* | 3/2008 | Eryurek et al. | 700/65 |
| 7,350,106 B2* | 3/2008 | Longere | 714/25 |
| 2001/0011260 A1* | 8/2001 | Skaanning et al. | 706/46 |
| 2001/0056335 A1* | 12/2001 | Ikeda et al. | 702/188 |
| 2002/0183987 A1* | 12/2002 | Chiang | 703/2 |
| 2003/0117279 A1* | 6/2003 | Ueno et al. | 340/523 |
| 2003/0174881 A1* | 9/2003 | Simard et al. | 382/159 |
| 2003/0189640 A1* | 10/2003 | Moriya | 348/187 |
| 2004/0086284 A1* | 5/2004 | Endo | 399/10 |
| 2004/0153864 A1* | 8/2004 | Longere | 714/46 |
| 2004/0181712 A1* | 9/2004 | Taniguchi et al. | 714/47 |
| 2004/0211055 A1* | 10/2004 | Belchamber | 29/700 |

FOREIGN PATENT DOCUMENTS

| | | |
|---|---|---|
| JP | 05-056555 | 5/1993 |
| JP | A 5-164802 | 6/1993 |
| JP | A-05-183673 | 7/1993 |
| JP | 08-282878 | 10/1996 |
| JP | A-2001-175328 | 6/2001 |
| JP | A-2001-245091 | 9/2001 |
| JP | A 2002-222096 | 8/2002 |

OTHER PUBLICATIONS

Notification of Reasons for Refusal issued in Japanese Patent Application No. 2004-125675; Jan. 5, 2010; with English-language translation.

Office Action issued in JP Application No. 2004-125675 on May 31, 2010 (with English translation).

* cited by examiner

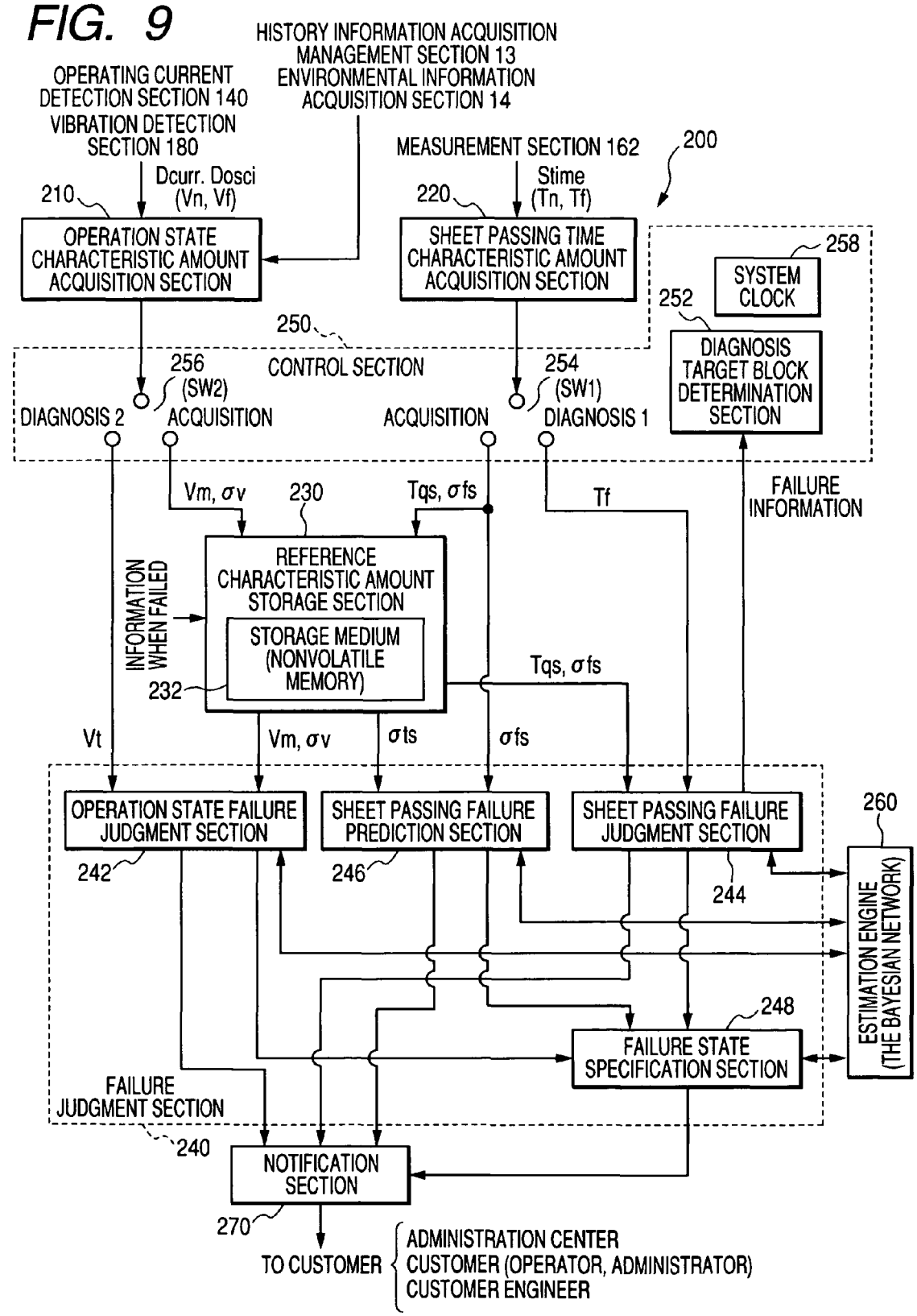

FIG. 17

| STATE OF FEED MOTOR ||||
|---|---|---|---|
| FEED NUMBER HISTORY OF FEED MOTOR | CURRENT OF FEED MOTOR | NORMAL | ABNORMAL |
| 500,000 SHEETS OR LESS | ZERO | 1% | 99% |
| 500,000 SHEETS OR LESS | SMALL | 30% | 70% |
| 500,000 SHEETS OR LESS | NORMAL | 99% | 1% |
| 500,000 SHEETS OR LESS | LARGE | 40% | 60% |
| 500,000 SHEETS OR MORE | ZERO | 1% | 99% |
| 500,000 SHEETS OR MORE | SMALL | 20% | 80% |
| 500,000 SHEETS OR MORE | NORMAL | 90% | 10% |
| 500,000 SHEETS OR MORE | LARGE | 30% | 70% |

FIG. 18

| STATE OF FEED MOTOR | | VIBRATION DUE TO FEED MOTOR ||||
|---|---|---|---|---|---|
| | | ZERO | SMALL | NORMAL | LARGE |
| NORMAL | NORMAL | 0% | 0.50% | 99% | 0.50% |
| ABNORMAL | NORMAL | 30% | 50% | 5% | 15% |
| NORMAL | ABNORMAL | 10% | 30% | 10% | 50% |
| ABNORMAL | ABNORMAL | 10% | 20% | 0% | 70% |

FIG. 19

| ON SIGNAL OF FEED MOTOR ||
|---|---|
| NORMAL (HIGH) | ABNORMAL (LOW) |
| 99.9% | 0.01% |

FIG. 20A

| SHEET INFORMATION ||
|---|---|
| NORMAL (EQUAL TO OR LARGER THAN 50g/m² AND EQUAL TO OR LESS THAN 100g/m²) | THICK PAPER OR THIN PAPER (LESS THAN 50g/m² OR LARGER THAN 100g/m²) |
| 98% | 1% |

FIG. 20B

| SHEET INFORMATION ||
|---|---|
| NORMAL | COATED PAPER |
| 98% | 1% |

FIG. 20C

| SHEET INFORMATION |||
|---|---|---|
| NORMAL | THICK PAPER | COATED PAPER |
| 98% | 1% | 1% |

<HISTOGRAM OF TIME PERIOD FROM START OF SHEET CONVEYANCE TO PASSING THROUGH FIRST SENSOR 65>

AT A TIME OF NORMAL OPERATION

AT A TIME OF FAILURE OPERATION

FAILURE DIAGNOSIS METHOD, FAILURE DIAGNOSIS APPARATUS, CONVEYANCE DEVICE, IMAGE FORMING APPARATUS, PROGRAM, AND STORAGE MEDIUM

BACKGROUND OF THE INVENTION

1. Field of the Invention

The present invention relates to a failure diagnosis method and a failure diagnosis apparatus for diagnosing a failure and malfunction of drive mechanism section used in an image forming apparatus having a conveyance device, such as a copying machine, a printer, a facsimile, or a complex machine having functions of these and other equipment (for example, electric appliances and automobiles); a conveyance device and an image forming apparatus to which the failure diagnosis method and the failure diagnosis apparatus are applied; and a program for realizing the failure diagnosis method and the failure diagnosis apparatus by using an electrical computer; and a storage (recording) medium storing the program.

More specifically, the invention relates to a technique for automatically diagnosing a conveyance device and an image forming apparatus by modeling factors that cause devices/apparatuses to fail into an information processing model based on probabilities such as the Bayesian network model.

2. Description of the Related Art

Recently, in office equipment such as, for example, a copying machine or a printer, high productivity is demanded, so that delays due to failures are not acceptable and it has been demanded that a failure is quickly detected and solved.

Also, in other industrial equipment such as automobiles, airplanes, robots, and semiconductor designing devices, a number of members that are highly reliable and operable at high speed with high accuracy are loaded as means for operation control.

Particularly, frequency of failure in drive members such as motors and solenoids and mechanical members that operate by interlocking with the drive members, including drive circuits for driving the motors, is high in comparison with other electronic parts (passive electronic parts such as resistors and capacitors, transistors, and ICs (integrated circuits)). Particularly, when the use environment is poor, even in a normal method of use, various abnormalities and failures that are hardly detected occur, and a large amount of labor is necessary for solving them.

Therefore, a method of automatic diagnosis with using a system (rule-type system) based on rules has been considered. As an example of the rule-type system, there is available a failure diagnosis system using the Bayesian network (for example, refer to U.S. Pat. No. 6,535,865).

According to U.S. Pat. No. 6,535,865, a system component that may cause the system to fail is modeled by using the Bayesian network, and the Bayesian network has an index node, plural cause nodes, and plural first troubleshooting nodes. The index node has a state indicating whether or not the system component has failed. The plural cause nodes are connected to the index node. Each of the cause nodes indicates a cause of the system component that cause a failure, the plural first troubleshooting nodes that are connected, respectively, to at least one of the plural cause nodes. The first troubleshooting nodes indicate troubleshooting steps for proposing actions for restoring the causes indicated by any of the connected cause nodes. With this configuration, when troubleshooting the system, an action that has a highest probability of solving the problem and requires the lowest cost estimated is proposed for a user.

Herein, in the configuration of U.S. Pat. No. 6,535,865, concretely, a service center has a server for a diagnosis system, and a customer executes diagnosis of his/her printer by using the Bayesian network while connecting to the server and exchanging data via the Internet.

In this example, a customer performs troubleshooting in a way that he/she answers questions from the diagnosis program. However, in order to acquire knowledge information, adopted is a method in which a human directly examines and obtains information by looking at a printer or a printed matter and inputs the information.

Therefore, in this method, if a customer who makes an examination does not get used to this method, there is fear that input information greatly varies, that an accurate diagnosis cannot be executed, and that serious false diagnosis may be caused. Furthermore, since many actions are assigned to a user, the user may feel a great deal of stress.

SUMMARY OF THE INVENTION

According to one embodiment of the invention, a failure diagnosis method diagnoses a failure occurring in a diagnosis target apparatus including a drive mechanism having a drive member that receives power supply to operate and a power transmission member that transmits drive force of the drive member to another member. The method includes automatically acquiring by a sensor an operation state signal indicating an operation state during the drive mechanism operating for a predetermined period; and analyzing the automatically acquired operation state signal based on a failure probability, which is obtained by modeling a cause of failure occurring in the diagnosis target apparatus with using probabilities, model to execute failure diagnosis with respect to each of constituent members of the drive mechanism.

A failure diagnosis apparatus according to one embodiment of the invention is one suitable for executing the above-mentioned failure diagnosis method. The failure diagnosis apparatus includes a failure diagnosis section that analyzes an operation state signal, which is automatically acquired in the diagnosis target apparatus, based on a failure probability model, which is obtained by modeling a cause of failure occurring in the diagnosis target apparatus with using probabilities, to execute failure diagnosis with respect to each of constituent members of the drive mechanism.

A conveyance apparatus and an image forming apparatus according to one embodiment of the invention are configured to have functional components, which are similar to those included in the failure diagnosis apparatus.

A program and a computer readable storage medium storing the program according to one embodiment of the invention are suitable for implementing the failure diagnosis method and the failure diagnosis apparatus by means of software with using an electrical computer. The program may be provided with being stored in a computer-readable storage medium, or may be provided by distribution through wired or wireless communications means.

BRIEF DESCRIPTION OF THE DRAWINGS

A embodiment of the invention will be described in detail based on the following figures, wherein:

FIG. 9 is a functional block diagram showing a configuration example of the failure diagnosis section;

FIG. 17 shows an example of a probability table set for a "state of a feed motor" node;

FIG. 18 shows an example of a probability table set for a "vibration due to the feed motor" node;

FIG. 19 shows an example of a probability table set for a "ON signal of the feed motor" node;

FIG. 20 show examples of probability tables set for a "sheet information" node;

DETAILED DESCRIPTION OF THE PREFERRED EMBODIMENTS

Hereinafter, embodiments of the invention will be described in detail with reference to the drawings.

<<Configuration Example of Image Forming Apparatus Equipped with Failure Diagnosis Apparatus>>

Figure 1:
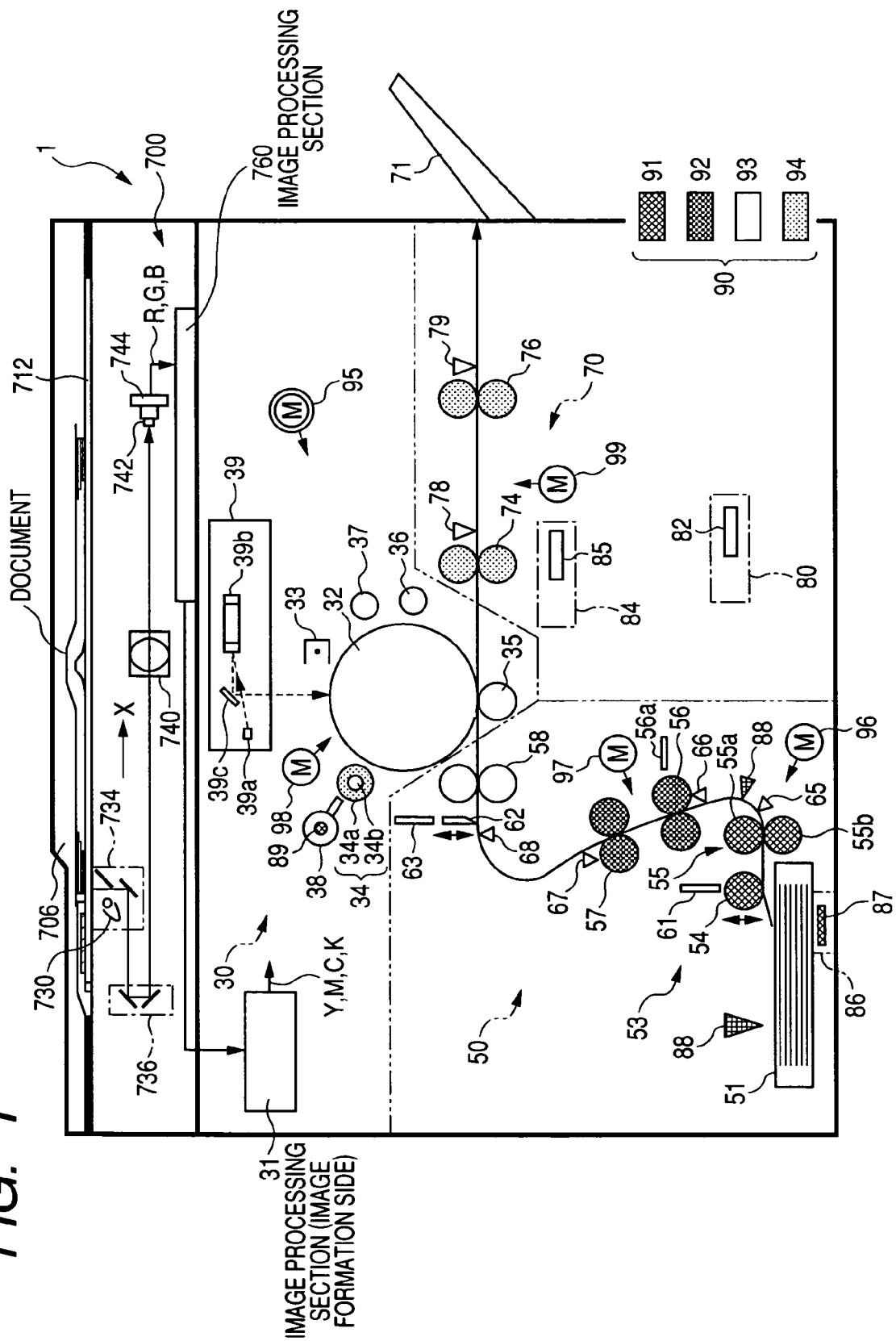
FIG. 1 is a drawing showing a configuration example of an image forming apparatus equipped with the failure diagnosis apparatus according to an embodiment of the invention.

FIG. 1 shows a configuration example of an image forming apparatus equipped with a failure diagnosis apparatus according to an embodiment of the invention. This image forming apparatus 1 has an image reading section (scanner section) for reading an image on, for example, a document. The image forming apparatus 1 is a complex machine having a copying machine function for printing an image corresponding to a document image on the basis of image data read by the image reading section, a printer function for printing-out on the basis of printing data (data representing an image) input from a personal computer, and a facsimile transmission and reception function which can print out a facsimile image. The image forming apparatus 1 is configured as a digital printing unit.

FIG. 1 shows a sectional view of a mechanical part (hardware configuration), focusing on a functional part for transferring an image onto a printing sheet, which is one example of a member to be conveyed and a recording medium, and a functional part for reading a document image.

The illustrated image forming apparatus 1 mainly has an image forming section 30, a paper-feed conveyance mechanical section 50, a paper-discharge conveyance mechanical section 70, and an image reading section 700. The image forming section 30 has a function for forming (printing out) an image on a printing sheet on the basis of input image data. The paper-feed conveyance mechanical section 50 feeds a printing sheet to a printing section of the image forming section 30. The paper-discharge conveyance mechanical section 70 discharges a printing sheet on which an image has been formed to the outside of the image forming apparatus 1. The image reading section 700 reads an image on a document. The image forming section 30, the paper-feed conveyance mechanical section 50, and the paper-discharge conveyance mechanical section 70 are collectively referred to as an image output section.

Each section is configured to have a roll member for moving a printing sheet, which is an example of a member to be conveyed, in a predetermined direction by a rotating force.

The image forming section 30 has an image processing section 31 and a function section. The image processing section 31 converts acquired image data (for example, a color space of red R, green G, and blue B) into image data in another color space (for example, yellow Y, magenta M, cyan C, and black K) used for output processing on the image forming section 30 side, corrects image density (contrast) and sharpness, and performs other image processings. The functioning section forms a visible image on a printing sheet such as a regular paper or a thermal recording paper on the basis of image data input from the image processing section 31 by using conventional electrophotographic, thermal, heat-transfer, ink-jetting, or other similar image forming processing.

Hereinafter, description is given with assuming that the image forming apparatus 1 has a raster output scanning (ROS) based print engine as the function section for printing-out in order to operate the image forming apparatus 1 as a digital printing system.

In this case, at the center of the image forming section 30, for example, a photoconductor drum roll 32 is disposed. Around the photoconductor drum roll 32, a primary charger 33, a developing device 34 including a developing roll 34a and a developing clutch 34b, a transfer roll 35, a cleaner roll 36, and a lamp 37 are disposed. Near the developing device 34, a coloring material cartridge 38 for supplying coloring materials (for example, toner) to the developing device 34 is disposed. The transfer roll 35 is disposed to face the photoconductor drum roll 32 so that they form a pair structure for conveying a sheet while nipping the sheet.

The image forming section 30 has a writing scanning optical system (hereinafter, referred to as laser scanner) 39 for recording a latent image onto a photoconductor drum roll 32 on the basis of image forming data. The laser scanner 39 has optical systems including the laser 39a for modulating and outputting a laser beam L on the basis of image data input from a host computer not shown, a polygon mirror (rotating polygonal mirror) 39b for scanning the laser beam L output from the laser 39a on the photoconductor drum roll 32, and a reflection mirror 39c.

The paper-feed conveyance mechanical section 50 has a paper feed tray 51, plural rolls, and a paper timing sensor. The paper feed tray 51 conveys a printing sheet to the image forming section 30. The plural rolls form a conveyance path 52 of the sheet feeding system. The rolls of the paper-feed conveyance mechanical section 50 may be a single-member structure and a paired structure in which two rolls are disposed to face each other and convey a sheet while nipping it.

For example, as roll members, in order from the paper feed tray 51 side toward the image forming section 30, provided on the conveyance path 52 are a pickup roll (nudger roll) 54, a pair of paper feed rolls 55 consisting of a feed roll 55a and a retard roll 55b, a pair of first conveyance rolls (a pair of take-away rolls) 56, a pair of second conveyance rolls (a pair of pre-regulation rolls) 57, and a pair of third conveyance rolls (a pair of regulation rolls) 58.

A nudger solenoid 61 for operating the pickup roll 54 is provided near the pickup roll 54. A feed section 53 includes the pickup roll 54, the pair of paper feed rolls 55, and the nudger solenoid 61.

A stopping claw 62 and a regulation gate solenoid 63 are disposed on the upstream side (left side of FIG. 1) on the conveyance path 52 near the pair of third conveyance rolls 58. The stopping claw (regulation gate) 62 temporarily stops a conveyed printing sheet on the conveyance path 52 and a regulation gate solenoid 63 operates the stopping claw 62.

Furthermore, in order to use one motor effectively, a drive mechanism section 90 of the image forming apparatus 1 (blocks 91 through 94) is configured to transmit a driving force of the motor in several directions by using gears, shafts, bearings, belts, and rolls. In the image forming apparatus 1, the drive mechanism section 90 having such structure are divided into several blocks in operation units, which correspond to drive motors (in this embodiment, motors 96 to 99 except for a main motor 95) serving as a base (master, source of power) of the drive mechanism. The drive mechanism section 90 is configured so that each block operates independently.

The solenoid and clutch are examples of driving members that operate upon receiving a power supply. However, they also serve as switching mechanisms for other members to which driving forces of the driving motors are transmitted. Therefore, the solenoid and the clutch have a relationship as slaves with respect to the driving motors. In this regard, the solenoid and the clutch are also examples of power transmission members as with the gears, shafts, bearings, and belts. This is the reason for block division with setting operation units on the basis of the drive motors.

For example, in the illustrated image forming apparatus 1, the four blocks 91 to 94 corresponding to the motors 96 to 99 operate separately. Specifically, the first block 91 includes the pickup roll 54, the pair of paper feed rolls 55, the nudger solenoid 61, the motor 96 and gears and clutches not shown. The pickup roll 54 and the pair of paper feed rolls 55 are driven by the motor 96 via a gear. The pair of first conveyance rolls 56 and the pair of second conveyance rolls 57 are driven by the motor 97 via a gear.

The second block 92 has the pair of first conveyance rolls 56, the pair of second conveyance rolls 57, the motor 97 and gears and clutches not shown. The third block 93 has the regulation gate solenoid 63, the pair of third conveyance rolls 58, the transfer roll 35, the photoconductor drum roll 32, the cleaner roll 36, the motor 98, and gears, belts, and pulleys not shown. The fourth block 94 has the developing roll 34a, a pair of fixing rolls 74, a pair of discharge rolls 76, the motor 99, and gears, solenoids, belts, and pulleys not shown.

Furthermore, the image forming apparatus 1 also has a mechanism for automatically acquiring operation state signals during operation of the image forming apparatus 1 as observation data. The operation state signals are required to diagnose the image forming apparatus 1. Examples of the observation data may include drive current, vibration, operation sound, temperatures of a particular part, change in a light amount of the lamp 37 near the photoconductive drum roll 32, timing of sheet passing when components (motors, solenoids, and clutches) inside the image forming apparatus 1 are operated singly.

For example, a first sensor 65, a second sensor 66, a third sensor 67, and a fourth sensor 68 are provided on the conveyance path 52 as sensor members for acquiring sheet passing time information in the image forming apparatus 1. The first sensor (feed-out sensor) 65 is provided near the pair of paper feed rolls 55 between the pair of paper feed rolls 55 and the pair of first conveyance rolls 56. The second sensor (feed-out sensor) 66 is provided near the pair of first conveyance rolls 56 between the pair of paper feed rolls 55 and the pair of first conveyance rolls 56. The third sensor (pre-regulation sensor) 67 is provided near the pair of second conveyance rolls 57 between the pair of second conveyance rolls 57 and the pair of third conveyance rolls 58. The fourth sensor (regulation gate sensor) 67 is provided near the stopping claw 62 between the pair of second conveyance rolls 57 and the pair of third conveyance rolls 58.

The pair of paper feed rolls 55 have a role of handling sheets for preventing overlapping feeding (feeding of two or more sheets) as well as the role of guiding sheets to the first sensor 65, the second sensor 66, and the pair of first conveyance rolls 56. The pair of first conveyance rolls 56 and the pair of second conveyance rolls 57 perform the role of guiding sheets to the photoconductor drum roll 32.

The first sensor 65 monitors the sheet conveying time, so that it can be judged whether or not the conveyance abnormality (for example, jamming in sheet feeding-out) of the first block 91 to which the feed section 53 belongs has occurred. Furthermore, the second sensor 66 monitors the sheet conveying time, so that it can be judged whether or not the conveyance abnormality (for example, jamming in sheet taking-in) of the second block 92 to which the pair of first conveyance rolls 56 belong has occurred.

Furthermore, the third monitor 67 monitors the sheet conveying time, so that it can be judged whether or not the conveyance abnormality (for example, jamming in sheet feeding-out) of the second block 92 to which the pair of second conveyance rolls 57 belongs has occurred. Furthermore, the fourth sensor 68 monitors the sheet conveying time, so that it can be judged whether or not a conveyance abnormality (for example, jamming in sheet taking-in) of the third block 93 to which the pair of third conveyance rolls 58 belongs has occurred.

The regulation gate solenoid 63 is used for temporarily stopping the sheet after a predetermined period of time elapses since the second sensor 66 is turned on. The purpose thereof is for matching timing to position a writing start position within the sheet with a position of an image on the photoconductor drum roll 32.

The paper-discharge conveyance mechanical section paper-discharge conveyance mechanism section 70 has an discharge tray (external tray) 71 for receiving outside the image forming apparatus 1 a printed sheet that is a printing sheet on which an image has been formed by the image forming section 30, and a plurality of rolls and sensors that form a conveyance path 72 of a paper discharge system. Rolls of the paper-discharge conveyance mechanical section 70 are of a paired structure in which two rolls are disposed to face each other and convey a sheet while nipping the sheet. For example, on the conveyance path 72, a pair of fixing rolls (fusers) 74 and a pair of discharge rolls (exit rolls) 76 are provided as roll members in order from the transfer roll 35 side of the image forming section 30 toward the paper discharge tray 71.

A fifth sensor (fixing sensor) 75 and a sixth sensor (discharge sensor) 76 are provided on the conveyance path 72 as sensor members for acquiring sheet passing time information in the image forming apparatus 1. The fifth sensor 78 is provided between the pair of fixing rolls 74 and the pair of discharge rolls 76. The sixth sensor 79 is provided between the pair of discharge rolls 76 and the paper discharge tray 71.

The fifth sensor 78 monitors the sheet conveying time, so that it can be judged whether or not a conveyance abnormality (for example, jamming in sheet taking-in) of the fourth block 94 to which the pair of fixing rolls 74 belong has occurred. Furthermore, the sixth sensor monitors the sheet conveying time, so that it can be judged whether or not a conveyance abnormality (for example, jamming in sheet taking-in and sheet feeding-out) of the fourth block 94 to which the pair of discharge rolls 76 belongs has occurred. Furthermore, the fourth sensor 68 and the fifth sensor 78 interlock with each other to monitor the sheet conveyance times, so that it can also be judged whether a conveyance abnormality (for example, jamming in sheet drawing-in and sheet feeding-out) in the third block 93 to which the photoconductor drum roll 32 belongs.

Each of the sensors 65, 66, 67, 68, 78, and 79 (hereinafter, collectively referred to as sheet timing sensors 69), which is a sensor member for acquiring sheet passing time information, serves as a sheet detection member (sheet timing sensor) forming a sheet passing time detection section for acquiring sheet conveying time information. Each of the sheet timing sensors 69 is provided to detect whether or not a printing sheet, which is an example of the member to be conveyed, is conveyed at a predetermined timing. Detection signals obtained by the sheet timing sensors 69 are input into a measurement section (not shown, see FIG. 6 described later) for measuring conveyance timing and conveyance time (sheet passing time) of the printing sheet.

For each sheet timing sensor 69 forming a sheet detection member may be various sensors having various forms and characteristics in accordance with the installation site. Basically, a sensor having a pair of a light emitting element (for example, an emission diode) and a light receiving element (for example, a photodiode or a phototransistor) may be used. Alternatively, a photo interrupter formed by integrating a light emitting element and a light receiving element may be used.

The sheet timing sensors 69 may be either a transmission type (called blocking type, also) or a reflection type. In the transmission type sensor, a light emitting element and a light receiving element are disposed to face each other. When no printing sheet is conveyed therebetween, the light receiving element is turned on upon receiving light from the light emitting element. On the other hand, in the state where a printing sheet passes therebetween, the printing sheet blocks the light from the light emitting element and thus, the light receiving element is turned off.

On the other hand, a reflection type sensor is disposed so that the light from the light emitting element is reflected by the printing sheet and that the reflected light enters the light receiving element. In the condition where no printing sheet is conveyed, the light receiving element is turned off without receiving light from the light emitting element. On the other hand, in a state where a printing sheet passes, light from the light emitting element is reflected by the printing sheet and enters the light receiving element. Thereby, the light receiving element is turned on. In the configuration of this embodiment shown in FIG. 1, a reflection type photo interrupter is used for all the sheet timing sensors 69.

A failure diagnosis section (not shown, described later in detail) provided in the image forming apparatus 1 determines failure probabilities of parts on the basis of the acquired passing time information. Then, the failure diagnosis section determines failure probabilities of parts and executes failure diagnosis on the basis of the passing time information acquired by using these sheet timing sensors 69. For example, there are observable nodes (nodes of passing time and standard deviation) observable as resultant nodes of states of the pickup roll (nudger roll) 54 and the pair of paper feed rolls (feed rolls) 55. With regard to the failure probabilities, average times at which a sheet passes through sensors and standard deviations thereof are observed, and when the values are larger than a reference value, it is concluded that failure probability is high.

Furthermore, with regard to the passing timings of the printing sheet, when time from the conveyance start of the printing sheet to a time point at which a printing sheet passes through each sensor deviate from a predetermined time range, the image forming apparatus 1 concludes that normal printing is impossible and then stops the paper conveyance at a position at that instance. This is normally called jamming (JAM).

Furthermore, the image forming apparatus 1 has a drive mechanism vibration detection section 80 for detecting vibration of the drive mechanism section 90 (blocks 91 through 94). The drive mechanism section 90 includes constituent members such as (a) drive members, e.g., motors and solenoids that operate upon receiving a power supply; and (b) power transmission members for transmitting driving forces from the driving members to other members, as constituent components. The drive mechanism vibration detection section 80 has, for example, a vibration sensor 82 for detecting vibration occurring in each block inside the image forming apparatus 1. An acceleration sensor that detects acceleration or an acoustic sensor that detects sound generated from a machine may be employed as the vibration sensor 82.

In this embodiment, the vibration sensor 82 is fixed to a main body chassis (not shown), immediately under the photoconductor drum roll 32. A position where this vibration sensor 82 is attached is not especially limited. The vibration sensor may be attached at any position as long as it can efficiently detect accelerations and/or operation sound of the drive mechanism section 90 of the blocks 91 to 94, inside the image forming apparatus 1. The position where the vibration sensor 82 is attached is not limited to the position immediately under the photoconductor drum roll 32.

Furthermore, the image forming apparatus 1 has functional elements for acquiring environment information concerning operations of the drive mechanism section 90 included therein. For example, first, the image forming apparatus 1 has a working temperature detection section 84 for detecting temperature inside the image forming apparatus 1. In this embodiment, the working temperature detection section 84 has a temperature sensor 85, and detects temperature at a desired position inside the image forming unit by using the temperature sensor 85. For example, the temperature sensor 85 is disposed so as to detect temperature near the pair of fixing rolls 74.

It is preferable that an electronic sensor having, for example, a platinum resistance thermometer bulb, thermistor, or thermocouple is used as the temperature sensor 85. Alternatively, a non-contact type such as thermopile, which measures infrared rays radiated from an object and measures temperature of the object from an amount of the infrared rays, may be used.

A temperature rise occurs in a case where the temperature inside the image forming apparatus 1 is abnormally high due to heating caused by a failure and in a case where the temperature inside the image forming apparatus 1 rises due to high ambient temperature around a location where the image forming apparatus 1 is placed. The former case is set so that the failure probabilities of related individual parts have great dependent relation, for example, the temperature control concerning the pair of fixing rolls 74 fails or the circuits fail and abnormally heat.

In the latter case, if the image forming apparatus 1 is placed under such circumstances for a long period of time even in use within the specifications of the image forming apparatus 1, deterioration of rolls accelerates and the coefficient of friction between the rolls and sheet changes, resulting in a temporal change during sheet conveyance. In this case, failure probabilities of related parts are also set to increase.

The image forming apparatus 1 has a working humidity detection section 86 for detecting humidity inside the image forming apparatus 1. The working humidity detection section 86 is an example of the functional element for acquiring the environment information concerning the operations of the drive mechanism section 90 of the image forming apparatus 1. In this embodiment, the working humidity detection section 86 has a humidity sensor 87, and detects humidity at a desired position inside the image forming apparatus 1 by using this humidity sensor 87. For example, the humidity sensor 87 is disposed so as to detect humidity near a sheet and the paper feed tray 51. This is because a sheet is greatly influenced by humidity.

Various sensors are available as the humidity sensor 87, for example, an electronic sensor mainly using changes in electrical properties due to humidity adsorption and desorption of the ambient moisture. For example, a dry and wet bulb humidity sensor, hair humidity sensor, crystal oscillation humidity sensor, and a humidity sensor using a macromolecule sensor, and a metal oxide sensor may be adopted. Particularly, the macromolecule type and the metal oxide type are small-sized sensors compatible with circuits, and are preferably applied to this embodiment.

It has been known that the humidity influences the coefficient of friction between a roll and a sheet and between sheets. As humidity becomes higher, the coefficient of friction between sheets gets increasing and it becomes more difficult to convey a sheet, and probability of misfeeding (conveyance disturbance) becomes higher, resulting in jamming at the feed section 53. Even during conveyance, the coefficient of friction between a sheet and rolls varies, so that the sheet conveying time changes and the jamming probability is also high.

Furthermore, the image forming apparatus 1 has a consumable detection section serving as a functional element for detecting a state of consumables used in the image forming apparatus 1. In this embodiment, as an example of the consumable detection section, first, a sheet information acquisition section 88 is provided at a predetermined position near the paper feed tray 51 or on the conveyance path 52. The sheet information acquisition section 88 has a reflected light detecting optical sensor or a transmitted light detecting optical sensor, to detect sheet information such as thickness of a printing sheet (expressed by basis weight) and a sheet type by using each detecting optical sensor.

When a sheet is thicker (or thinner) than a regulated value (for example, 50 to 100 g/m$^2$) or is a coated sheet, the sheet is more likely to cause the jamming, so that the sheet information is detected and used for calculation of the failure probabilities. The consumable detection section serving as the sheet information acquisition section 88 for detecting thickness of a sheet (expressed by basis weight) and a sheet type will be described in detail later.

Furthermore, as another example of the consumable detection section, a color-material remaining-amount detection section 89 for detecting a remaining amount of toner (coloring material) is provided on the color material cartridge 38 disposed near the developing device 34. A mechanism for monitoring the coloring material remaining amount has been known to a person skilled in the art, so that illustration and detailed description thereof are omitted herein.

An example of observation data used in judgment of the failure diagnosis is described above. However, the observation data shown herein is mere an example, and is not limited to the above-mentioned data. For example, in order to monitor the state of the engine section mainly having the photoconductor drum roll 32, a mechanism for monitoring applied voltage, which is supplied to the primary charger 33, is provided. This monitoring mechanism has been known to a person skilled in the art, so that illustration and detailed description thereof are omitted herein.

When jamming occurs in the image forming apparatus 1, it is estimated that the drive mechanism section up to a sensor that has detected the jamming are involved in the cause of jamming. Jamming occurs when a sheet does not pass through the sheet timing sensors 69 in predetermined time ranges. Therefore, for example, when a printing sheet stops at the second sensor 66, jamming is attributable to the drive mechanical section from the first sensor 65 to the second sensor 66 and/or the pair of conveying rolls 56 serving as the drive mechanical section of the second block 92 disposed immediately after the former drive mechanical section.

According to a similar idea, if a sheet stops at the first sensor 65, the drive mechanism section of the first block 91 is failed. If a sheet stops at the fourth sensor 68, the drive mechanism section of the third block 93 is failed. If a sheet stops at the fifth sensor 78 or the sixth sensor 79, the drive mechanism section of the fourth block 94 is failed. As described above, since a failure is judged in the block units with using the sheet timing sensors 69 for detecting jamming, the block in which failure occurs can be limited.

However, in some cases, the cause of jamming ranges a plurality of blocks when the detection time gradually delays and a sensor finally detects the jamming. In this case, if the second sensor 66 detects, the drive mechanism sections of the first block 91 and the second block 92 are set as diagnosis targets.

In actuality, there is no means for detecting in advance whether or not failure ranges across a plurality of blocks. Therefore, in this embodiment, when the failure diagnosis is performed with using the Bayesian network and focusing on the sheet conveyance process as a failure diagnosis flow as described later, serial connection by arcs in order of sensing of a sheet on the basis of timings at which a sheet passes through the sensors. This serial connection is based on this. For example, a method may be employed in which a drive mechanism section of a block being closest to a sensor that has detected a failure is diagnosed first, and if no abnormality is found, then diagnosis sequentially shifts to the next block.

Herein, described is the blocks are divided in units of the drive mechanism sections so as to correspond to the manner of diagnosing failure in the drive mechanism section system caused by motors and solenoids. However, when a failure diagnosis is executed for the whole of the image forming apparatus 1, it is also possible that a failure diagnosis is executed with using block division performed on the basis of another viewpoint.

For example, when a failure diagnosis is executed by automatically acquiring internal-state information, history information, and surrounding environment information of the image forming apparatus 1 based on defective detection of an image and characteristic amounts of the image, this block division is also effective for finding whether black lines have been caused by "flaws on the photoconductor drum roll 32" or "deterioration of the pair of fixing rolls (fusers) 74."

This block division is also effective for specifying a point of causing black lines on the basis of a place where black lines appear in image formation. For example, black lines are caused not only by the image output section side such as "flaws on the photoconductor drum roll 32" or "deterioration of the pair of fixing rolls 74" but also by the image reading section side such as flaws on the platen glass. Thus, there may be a case where it is difficult to distinguish causes of failures only by automatic diagnosis.

In such a case, additional information by customer's operations is obtained and failure occurrence possibility is recalculated, in accordance with results obtained by changing output conditions such as such as changing an orientation of a document and/or an orientation of a printing sheet and performing processing. Thereby, location dependency (that is, block dependency) of black line appearance is judged. Accordingly, failure occurrence point can be specified in the units of blocks. For example, the failure occurrence point is on the image reading section side or on the image output section side.

As a matter of course, the way of dividing is not limited to block division of the mechanical system such as division into the drive mechanism section system and the image reading section side/image output section side. Division into either the image processing (pure electrical) system or the mechanical system is also adoptable.

<Configuration and Operation of the Image Reading Section>

The image reading section 700 optically reads, from a sheet-like document serving as a reading target, an image drawn on the document, and has a platen cover 706. Furthermore, the image reading section 700 has a platen glass (document placing base) 712 slightly larger than A3 paper, on which a document serving as the reading target is placed. The image reading section 700 also has, below the platen glass 712, an optical system including a light reception section 742 for reading a document, and an image processing section 760 of the image reading section side.

Below the platen glass 712 inside a casing, the image reading section 700 has a full-rate carriage (F/R-CRG) 734 including a light source 730, a roughly concave reflection cap, and a reflection mirror. The light source 730 irradiates light toward a surface (back surface) opposite to the document placing surface of the platen glass 712. The reflection cap reflects light emitted from the light source 730 toward the platen glass 712 side. The reflection mirror deflects the light reflected from the platen glass 712 side in a direction roughly parallel to the platen glass 712.

A fluorescent lamp having its longitudinal direction in the main scanning direction (direction orthogonal to the paper surface of the drawing) may be used as the light source 730. Colors of illumination light emitted from the light source 730 are ones adapted to the spectral optical characteristics of line sensors forming the light reception section 742 For example, white light or green light is used.

Furthermore, the image reading section 700 has a half-rate carriage (H/F-CRG) 736, which has two reflection mirrors disposed to form almost a right angle therebetween inside the casing. The half-rate carriage 736 successively deflects reflected light deflected by the full-rate carriage 734 by each 90 degrees. The full-rate carriage 734 and the half-rate carriage 736 are interlocked by a stepping motor (not shown), and are configured to be movable reciprocally in the sub-scanning direction (an arrow X direction in FIG. 1) and an opposite direction thereto.

Furthermore, the image reading section 700 has a lens 740 for condensing the reflected light deflected by the reflection mirrors of the half-rate carriage 736 to a predetermined focal position. The light reception section 742 receives the reflected light that has been converged by the lens 740 and reads an image in the main scanning direction (the depth direction of the paper surface of FIG. 1) roughly orthogonal to the sub-scanning direction, and successively outputs image signals corresponding to density (analog electrical signal).

The image signal output from the light reception section 742 are processed by unillustrated line sensors (described in detail later) and a read signal processing section, and then transmitted to the image processing section 760. The line sensor is disposed on a substrate 744 and has a photoelectric conversion element such as a photodiode, and a CCD (Charge Coupled Device) or a CMOS (Complementary Metal-Oxide Semiconductor). The read signal processing section is also disposed on the substrate 744 and has a drive control section such as a CCD driver for the driving line sensors.

Furthermore, although not shown, the image reading section 700 further has wires and drive pulleys for moving the reading optical system and the light reception section 742 below the platen glass 712 inside the casing. The drive pulley is rotated back and forth by a driving force of a drive motor, and winds the wire there around as a result of this rotational driving. Thereby, it is possible to move the reading optical system having the full-rate carriage 734 including the light source 730, the half-rate carriage 736, and the lens 740 at a predetermined speed.

In the above-mentioned configuration, the full-rate carriage 734 of the image reading section 700 forming the reading optical system is normally located at a home position below the platen glass 712. Therefore, even without moving the light reception section 742 in the sub-scanning direction before starting reading, size of the document placed on the platen glass 712 in the main scanning direction can be detected by the line sensors of the light reception section 742.

On the other hand, when a fixed reading method in which a document is placed on the platen glass 712 and read is employed, a document is placed on the platen glass 712 serving as a document placing base by user's hand. In a state where the document is placed at an arbitrary position on the platen glass 712, the fixed reading image front position is set as a front end reference and the reading optical system is scanned at a constant speed in the direction of the arrow X to exposed the document and read an image. Thereby, an analog capturing image signal containing spectral components of red, green, and blue is obtained.

At this time of reading, the document is entirely irradiated with illumination light from the light source 730. In order for the light reception section 742 to read an entire input image via the reading optical system such as the lens 740, the reading optical system including the full-rate carriage 734 having the light source 730, the half-rate carriage 736, and the lens 740 and the light reception section 742 are relatively moved at a constant speed rightward (sub-scanning direction) from the left side of FIG. 1 as shown by the arrow X. In other words, the image reading device 3 reads an image on a document while moving the optical system at a constant speed.

The light reception section 742 transmits the capturing image signal containing the spectral components obtained by capturing a document image by line sensors to the read signal processing section (not shown), which is provided on the substrate 744 as well as the light reception section 742. The read signal processing section applies desired analog signal processing to the capturing image signal obtained by reading, and then converts the signal into digital image data containing color components of red (R), green (G), and blue (B), and transmits the digital image data of red, green, blue to the image processing section 760.

<Outline of Operations of the Image Output Section>

In the image forming apparatus 1 configured as described above, when the image output section is operated and an image is to be formed on a printing sheet serving as the member to be conveyed, a sheet is fed out from the paper feed tray 51 by the paper-feed conveyance mechanical section 50, and the printing sheet is conveyed to a predetermined position of the image forming section 30, and then an image is formed on the printing sheet.

For example, first, the nudger solenoid 61 operates and pushes the pickup roll 54 down with starting the printing processing. Almost simultaneously, the motors 96 to 99 for rotating various rolls (pairs) inside the image forming apparatus 1 start rotating. The pickup roll 54 pushed down by the nudger solenoid 61 comes into contact with the top printing sheet on the paper feed tray 51, and guides one printing sheet to the pair of paper feed rolls 55.

The regulation gate solenoid 63 temporarily stops the printing sheet by the stopping claw 62 after a predetermined period elapses since the second sensor 66 is turned on. Thereafter, at a predetermined timing at which the writing start position within the printing sheet and the position of the image on the photoconductor drum roll 62 match each other, the regulation gate solenoid 63 releases the stopping claw 62. Thereby, the stopping claw 62 returns and the pair of third conveyance rolls 58 feed the printing sheet between the photoconductor drum roll 32 and the transfer roll 35.

In the image forming section 30, first, the laser 39*a* serving as a light source forming a latent image is driven according to image generation data from a host computer (not shown) to convert the image data into an optical signal. Then, the laser 39*a* irradiates the converted laser beam L toward the polygon mirror 39*b*. The laser beam L scans on the photoconductor drum roll 32 charged by the primary charger 33, via an optical system such as the reflection mirror 39*c*. Thereby, an electrostatic latent image is formed on the photoconductor drum roll 32.

This electrostatic latent image is made into a toner image (developed) by the developing device 34 to which toner of a predetermined color (for example, black) is supplied. This toner image is transferred onto the printing sheet by the transfer roll 35 while the sheet that passed through the conveyance path 52 passes between the photoconductor drum roll 32 and the transfer roll 35.

Then, the toner and latent image remaining on the photoconductor drum roll 32 are cleaned off and erased by the cleaner roll 36 and the lamp 37. The developing roll 34*a* has a developing clutch 34*b*, and adjusts the developing timing by using this developing clutch 34*b*.

The printing sheet on which toner has been transferred is heated and pressurized by the pair of fixing rolls 74, so that the toner is fixed to the printing sheet. Lastly, the pair of discharge rolls 76 discharges the printing sheet onto the discharge tray 71 outside the image forming apparatus 1.

The configuration of the image forming section 30 is not limited to one described above. For example, an IBT (Intermediate Belt Transfer) system having one or two intermediate transfer belts may be employed. In the figure, the image forming section 30 for monochromic printing is shown. However, it may be a color image forming section 30. In this case, configuration of the engine section may be one in which a color image is formed by repeating the image forming process for each output color of K, Y, M, and C. For example, a multi-pass type (cycle type/rotary type) may be used in which images in the respective colors are formed by a single engine (photoreceptor unit) and these are overlap-transferred onto an intermediate transfer body color by color to form a color image. Alternatively, configuration of the engine section may be a tandem type in which a plurality of engines corresponding to the respective output colors are arranged in line in order of K, Y, M, and C and K, Y, M, and C images are processed parallel (simultaneously) by the four engines.

<Configuration Example of the Drive Mechanism>

Figure 2:
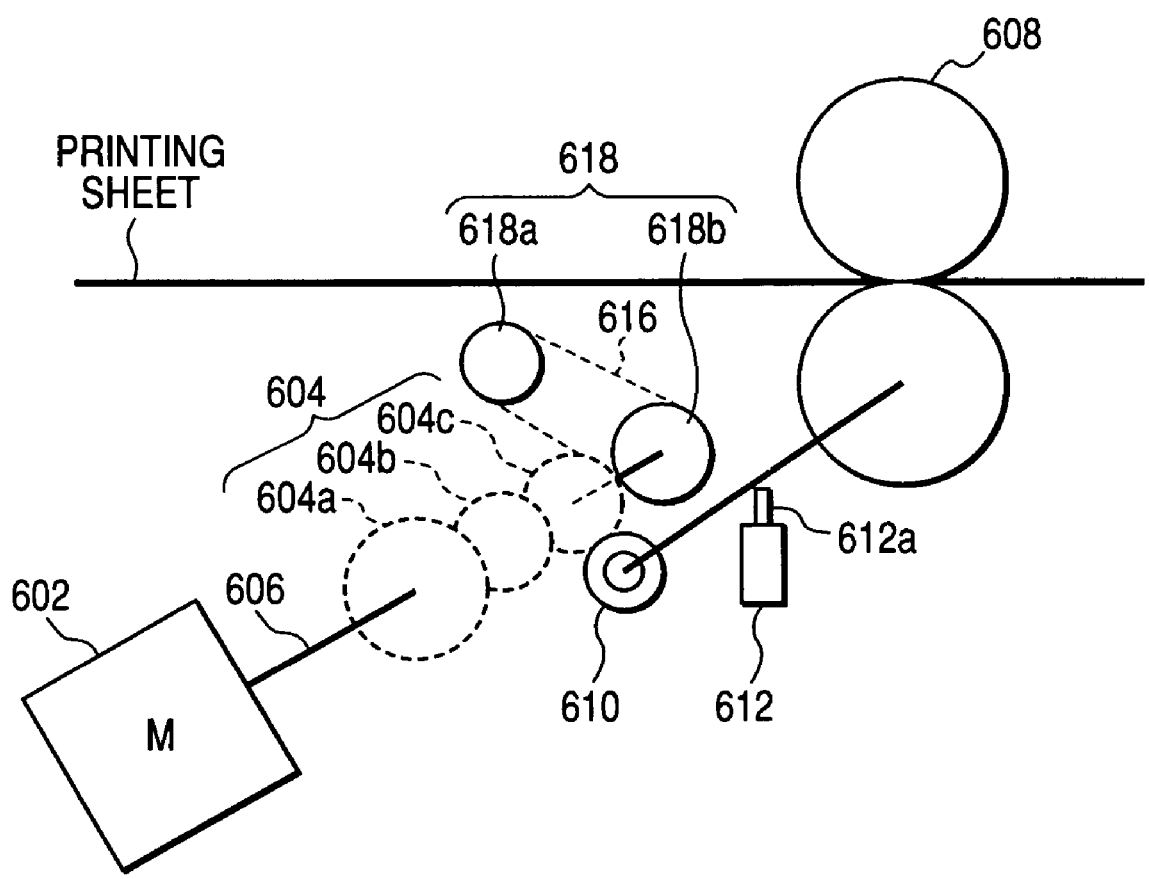
FIG. 2 is a drawing showing a configuration example of the drive mechanism section used in the image forming apparatus.

FIG. 2 is a drawing showing a configuration example of the drive mechanism section 90 used in the image forming apparatus 1 shown in FIG. 1.

In order to utilize one motor as effectively as possible, the drive mechanism section 90 of the image forming apparatus 1 is configured so as to transmit a driving force in several directions by using a motor 602, a gear 604 (including gears 604*a*, 604*b*, and 604*c* in the figure), a shaft 606, a roll or a pair of rolls 608, a clutch 610, and a bearing not shown. The motor 602 corresponds to the motors 96 to 99 of FIG. 1. The roll or pair of rolls 608 correspond to the pickup roll 54 or the pair of paper feed rolls 55 of FIG. 1, the pairs of conveying rolls 56 to 58, the photoconductor drum roll 32, the transfer roll 35, the pair of fixing rolls 74, and the pair of discharge rolls 76. This configuration is applied to the first block 91 and the second block 92 shown in FIG. 1.

Depending on the circumstances, in addition to the above-mentioned parts, the solenoid 612 having a combination of the plunger (iron core) 612*a* and an unillustrated electromagnet, the belt 616, and the pulley 618 (having pulleys 618*a* and 618*b* in the figure) are also used so as to enable more complicated motions. This configuration is applied to the third block 93 and the fourth block 94 shown in FIG. 1.

<Details of the Sheet Information Acquisition Section>

Figure 3:
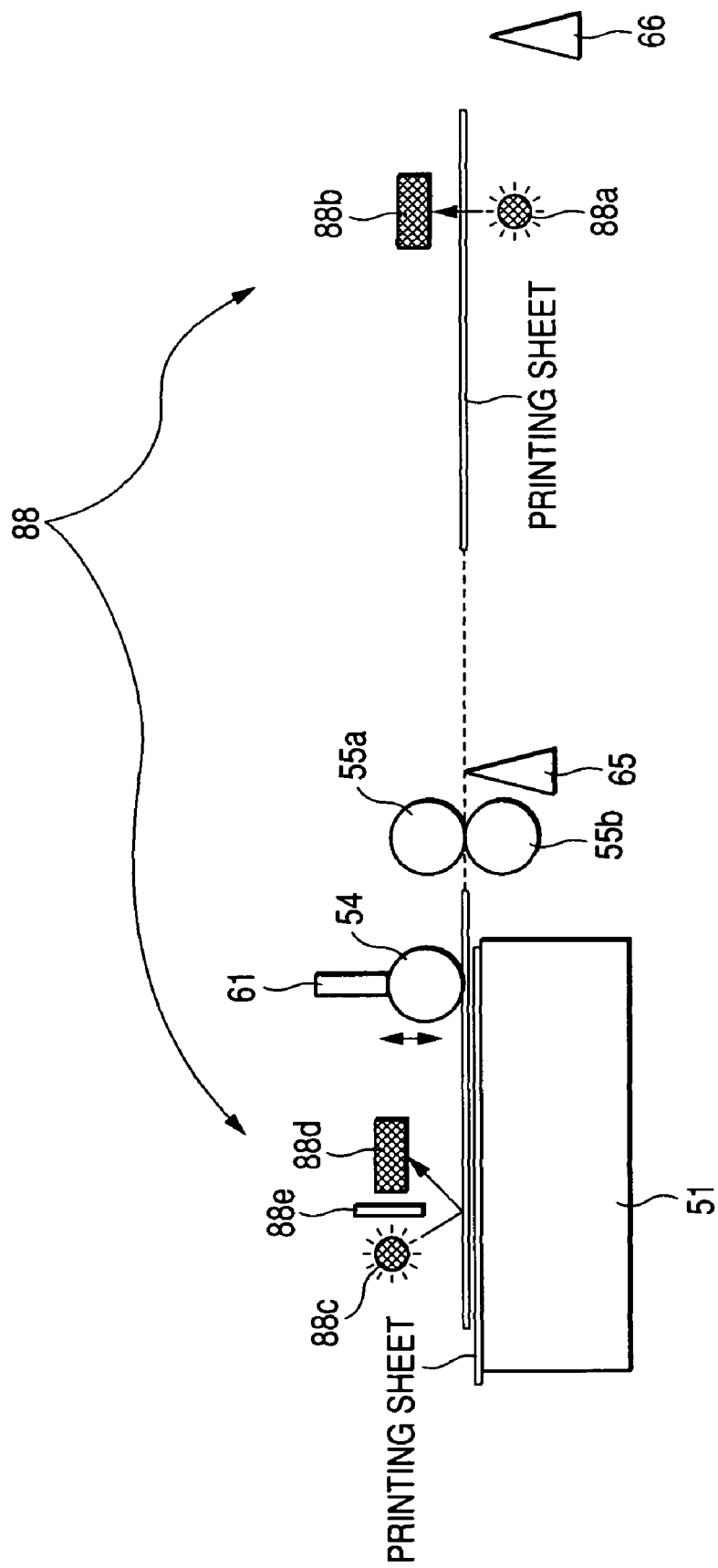
FIG. 3 is a drawing describing a configuration and an operation of a sheet information acquisition section.

FIG. 3 is a diagram describing configuration and operation of the sheet information acquisition section 88. First, the sheet information acquisition section 88, which is one example of the consumable detection section, has a lamp 88*a* and a transmittance detection optical sensor 88*b* on the conveyance path 52 between the first sensor (pre-feed sensor) 65 and the second sensor (feed-out sensor) 66 as a sensor mechanism for acquiring information of sheet thickness. The lamp 88*a* irradiates light toward the printing sheet in the conveyance process. The transmittance detecting optical sensor 88*b* receives light that has been emitted from the lamp 88*a* and transmitted through the printing sheet.

The transmittance detecting optical sensor 88*b* detects the sheet thickness (expressed by basis weight). A light amount transmitted through a sheet is almost in proportion to the basis weight of the sheet. Therefore, it is possible to detect thickness of a sheet by detecting the transmitted light amount.

The sheet information acquisition section 88 further has a lamp 88*c* and a reflectance detection sensor 88*d* above the paper feed tray 51 as a sensor mechanism for acquiring sheet type. The lamp 88*c* irradiates light toward printing sheets accumulated in the paper feed tray 51. The reflectance detection sensor 88*d* receives light that has been emitted from the lamp 88*c* and reflected by the printing sheets. A shield plate 88 is provided between the lamp 88*c* and the reflectance detecting optical sensor 88*d*. The shield plate 88*e* prevents the light of the lamp 88*c* from directly entering the reflectance detecting optical sensor 88*d*.

It is judged whether or not a printing sheet is a coated sheet by the reflectance detecting optical sensor 88*d*. Normally, a coated sheet has a reflectance higher than that of a regular sheet. Therefore, it can be judged whether or not a sheet is a coated sheet by properly setting a threshold for the reflected light amount. In the case of a coated sheet, friction between a roll and the sheet and friction between the sheets are greater than in the case of a non-coated sheet. The coated sheet is more easily influenced by the ambient temperature and humidity. As a tendency, as temperature and humidity get higher (30° C. and 90% or more), a coated sheet jams more frequently.

<<Failure Diagnosis Function in the Image Forming Apparatus>>
<Outline of the Failure Diagnosis Function>

Figure 4:
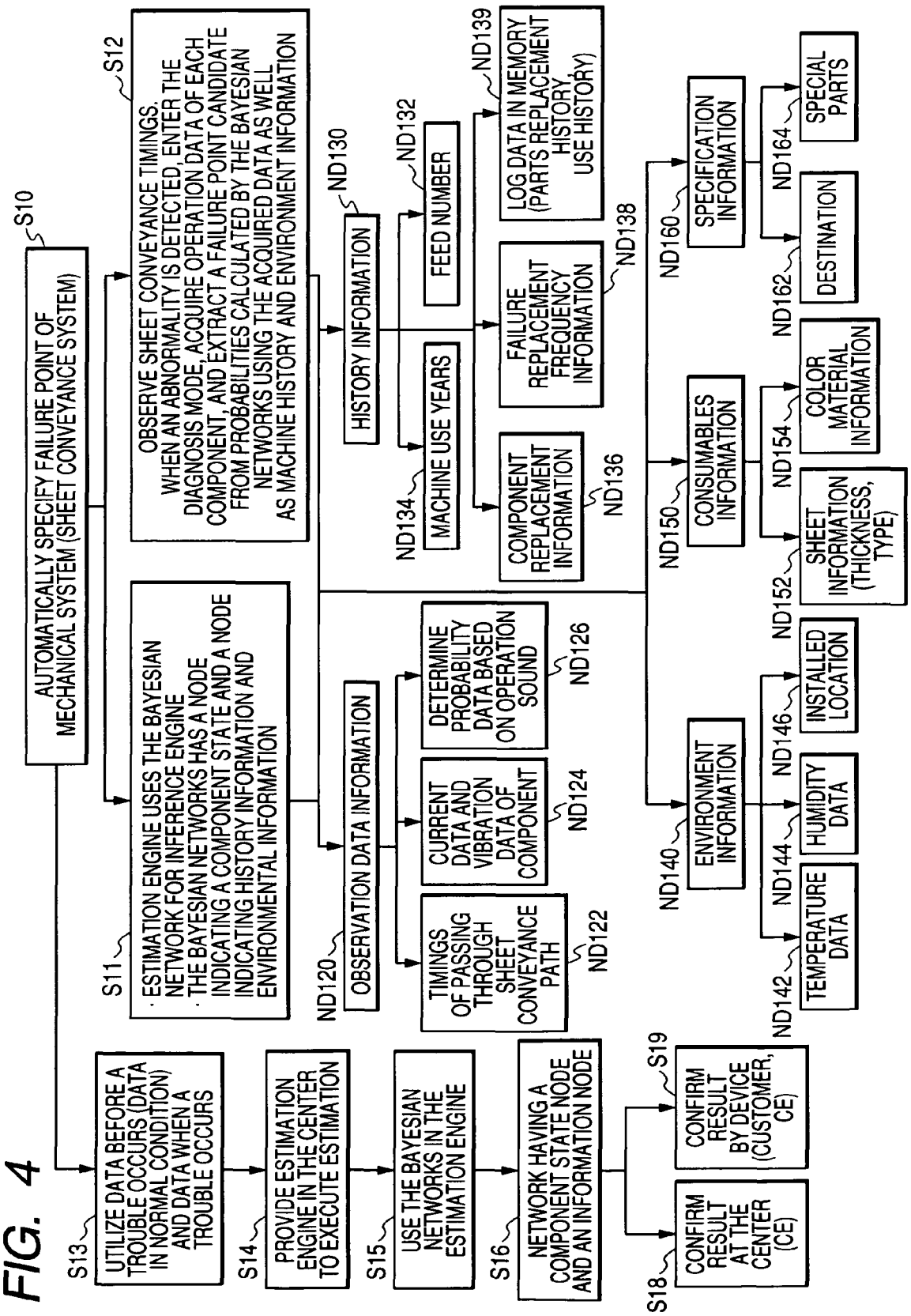
FIG. 4 is a diagram describing functional outline of the failure diagnosis apparatus.

FIG. 4 is a drawing describing outline of functions of a failure diagnosis apparatus provided in the image forming apparatus 1.

When the failure diagnosis apparatus automatically executes failure diagnosis for specifying a failure point of a mechanical system (sheet conveyance system) (S10), the failure diagnosis apparatus, as a diagnosis architecture, acquires normal data before a trouble occurs, acquires data on state of an apparatus during operation and environmental conditions (collectively referred to as working data), and executes diagnosis with utilizing these pieces of information and referring to failure probabilities calculated by an estimation engine (S13). The failure diagnosis mentioned in this embodiment includes not only judgment on occurrence of failure but also predicting diagnosis for predicting future failures.

A function portion of the estimation engine and a function portion for executing failure diagnosis are not limited to a configuration installed in a main body of the image forming apparatus. For example, the function portions may be provided in an administration center network-connected to the image forming apparatus 1 (S14). In this case, the normal data and the working data are transmitted to the administration center via a network and diagnosis is executed at the administration center. Alternatively, it is also possible that only the estimation engine is placed in the administration center, and only calculation of failure probabilities is executed at the administration center.

The results of diagnosis may be confirmed by a customers engineer (CE) at the administration center, or confirmed by a customers engineer or a customer (client/user) on the image forming apparatus 1 side by transmitting the results of diagnosis to the image forming apparatus 1.

In this embodiment, the Bayesian network is used as the estimation engine for calculating the failure probabilities (S11, S15). The failure diagnosis using the Bayesian network utilizes a stochastic model genetic algorithm for generating searching points with using statistical information of preferable individuals in a population, which is an optimization approach in which dependency among nodes (variables) are probabilistically grasped, and distribution is estimated by using a graph structure (called the Bayesian network or causal networks).

The Bayesian network use a probabilistic modeling genetic algorithm that generates search points with using statistical information on individuals of the population, and is an approach for estimation of distribution by using a graph structure (called the Bayesian network or causal network) through probabilistic grasping of the dependency among nodes (variables).

More specifically, first, random variables (X: {true, false}/{Mon, Tue, . . . })/continuous variable) are provided for nodes. Then, with respect to an effective link having dependency between a parent node and a child node, a graph structure is given concerning qualitative dependency. With regard to quantitative dependency, a conditional probability (table/parameric model) is given.

Then, in the failure diagnosis, the automatically acquired information is analyzed to specify failure probability of anode forming the model such as the Bayesian network model used when modeling the cause, which causes failure of the diagnosis target apparatus and analyzing. Candidates of a failure point or a point where failure would occur are extracted based on the failure probability.

As described in detail later, when failure diagnosis of the image forming apparatus 1 is executed by using the Bayesian network, the Bayesian network is formed to have a network configuration including, as constituent components of the Bayesian network, a component state node having a state indicating whether or not a component is in failure and plural information nodes, which are connected to the component state node and have a causal relationship with the component states (S16).

For example, the Bayesian network is configured to have nodes indicating the component states and nodes indicating history information and environment information (S11). Then, when the timings of sheet conveyance are observed and an abnormality is detected, a failure diagnosis mode is entered and operation data of the respective components is acquired, failure probabilities are calculated through the Bayesian network based on the operation data and the history and environment information of the image forming apparatus 1, and candidates of failure points are extracted on the basis of the calculated failure probabilities (S12).

Therefore, the failure diagnosis apparatus directly acquires, for example, observation data information (ND120), history information (ND130), environment information (ND140), consumables information (ND150), or specification information (ND160) of the image forming apparatus 1 as information (variables: nodes) for determining parts failure probabilities, by using data acquisition application software.

The observation data information (ND120) corresponds to a component observation information node ND2 of the Bayesian network, and gives apparatus operation state variables. Specifically, the observation data information is acquired on the basis of information on current, vibration, and time representing component operation states acquired by using sensors (component information). In this embodiment, this component information is automatically acquired by providing various sensors inside the image forming apparatus 1.

For example, the observation data information may have the timings (ND122) of passing through the sheet conveyance path on the basis of sheet conveyance time information acquired by the sheet timing sensors 69; current information showing operation states of components (parts), in particular, the drive members such as motors, solenoids, and plungers; vibration data (ND124) acquired by an acceleration sensor used as the vibration sensor 82 of the drive mechanism vibration detection section 80; or operation sounds (ND126) acquired by an acoustic sensor used as the vibration sensor 82 of the drive mechanism vibration detection section 80. For example, probability data may be determined on the basis of acquired operation sounds.

The current information showing operation states of the drive members is acquired in the way where a component (motor, solenoid, and clutch) inside the image forming apparatus 1 is operated singly and drive current at that time is acquired (described in detail later, see FIG. 6).

The history information (ND130) corresponds to history information node ND3 of the Bayesian network and represents use state of the image forming apparatus 1. The history information has a function of reinforcing the component information that provides the apparatus operation state variables. In this embodiment, this history information is automatically acquired by disposing various sensors inside the image forming apparatus 1 and storing acquired information in a storage medium.

For example, the history information may have a sheet fed number (ND132) corresponding to number of printing sheets fed out to the conveyance path 52 from the paper feed tray 51, number of used years (ND134) of the image forming apparatus 1 (machine) since the installation of the image forming apparatus 1, use frequency (ND135) calculated from the sheet fed number in a unit period, component replacement information (ND136), failure and replacement frequency information (ND138), and log data (ND139) including parts replacement history and use history stored in a nonvolatile storage medium (semiconductor memory or hard disk) provided inside the image forming apparatus 1.

For example, the sheet fed number indicating the number of times of conveyance of the printing sheets, which is one example of the member to be conveyed, directly influences wearing of rolls, wearing of gears, or wearing of bearings of motors, and influences the states of components. Therefore, it is effective that failure diagnosis is executed with reference to information (sheet fed number: ND132) as to how many sheets the feed section fed since installation of the image forming apparatus 1 at a predetermined location or replacement of a component as history information.

If data in which apparatus history (use conditions) and apparatus installation environments that influence the states of components are taken into account in addition to the component information are automatically acquired and incorporated into the Bayesian network to execute failure probabilities, it is possible to perform accurate failure diagnosis with requiring easy operations but not requiring advance knowledge. Even a serviceman who has no advance knowledge or is inexperienced can perform accurate failure diagnosis with easy operations.

Number of fed sheets since new installation of the image forming apparatus 1, consumables replacement, or parts replacement is used as the sheet fed number (ND132). This sheet fed number involves wearing, so that it influences lives of all movable parts (motors, solenoids, clutches, rolls, gears, and belts). A threshold value serving as criteria of deterioration of each part such as motors and solenoids is, for example, 500,000 sheets (this number differs depending on the unit type and parts types). Probability is set based on this threshold value. The accumulated sheet fed number, which a customer has used since new installation, consumables replacement, or parts replacement, is successively recorded in a nonvolatile storage medium provided inside the image forming apparatus 1 for each part. Thereby, this value is used as the observation information at a time of diagnosis.

The sheet fed number of each part is reset to zero when the part is replaced. Therefore, although the accumulated fed numbers of all parts are zero at the time of new installation, the fed number stored in a nonvolatile recording medium differs among parts, depending on maintenance of the image forming apparatus.

The environment information (ND140) corresponds to environment information node ND4 of the Bayesian network and shows operation environments of the image forming apparatus 1. The environment information is surrounding environmental conditions that influence the component states. In this embodiment, the environment information shows operation environments regarding the operations of, in particular, the drive mechanism section 90. For example, the environment information includes temperature data (ND142) acquired by the temperature sensor 85 of the working temperature detection section 84, humidity data (ND144) acquired by the humidity sensor 87 of the working humidity detection section 86, and installed location (address and building) (ND146) of the image forming apparatus 1, which influences the temperature data and the humidity data.

The temperature and humidity influence the coefficient of friction between the feed roll 55a of the pair of paper feed rolls 55 and a printing sheet and the coefficient of friction between sheets, and influence the sheet conveyance time. Therefore, it is effective that failure diagnosis is made with using the temperature data and the humidity data.

Furthermore, the consumables information (ND150) corresponds to consumables information node ND5 of the Bayesian network. The consumables information is information on consumables used in the image forming apparatus 1 such as the printing sheet thickness (sheet thickness information) and the sheet type (ND152), the color type of the coloring material, the type of dye/pigment, and a remaining amount thereof (ND154), which are acquired by the consumable detection section.

Furthermore, the specification information (ND160) corresponds to specification information node ND6 of the Bayesian network. The specification information is information for specifying whether or not the image forming apparatus 1 is regular one. For example, the specification information may include destination (ND162) and use of special parts (ND164) at customer's request.

<<Configuration Example of Failure Diagnosis Apparatus>>

Figure 5:
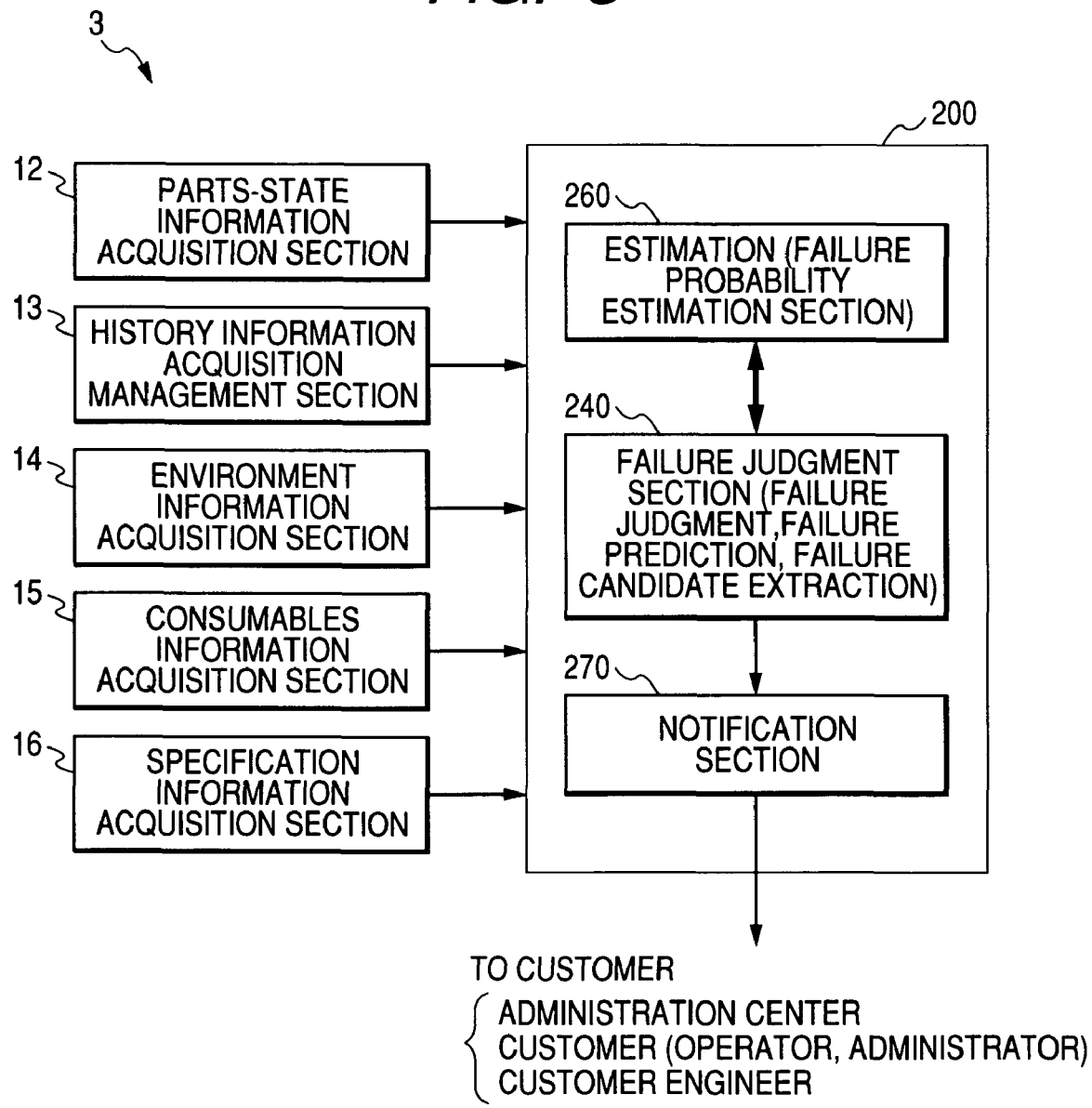
FIG. 5 is a block diagram showing a configuration example of the failure diagnosis apparatus provided in the image forming apparatus.

FIG. 5 is a block diagram showing a configuration example of the failure diagnosis apparatus 3 provided in the image forming apparatus 1. The failure diagnosis apparatus 3 is configured so as to acquire the above-mentioned pieces of information shown in FIG. 2 and execute failure diagnosis. For example, the failure diagnosis apparatus 3 has a parts-state information acquisition section 12 for acquiring component information indicating operation states of components as the observation data information, and a history information acquisition management section 13 for monitoring the use condition of the image forming apparatus 1 and registering/holding monitoring results in the nonvolatile storage medium to manage the history information.

The failure diagnosis apparatus 3 has an environment information acquisition section 14, a consumables information acquisition section 15, a specification information acquisition section 16. The environment information acquisition section 14 acquires surrounding environmental conditions, such as temperature and the humidity that influence the states of the components, as the environment information on the basis of information detected by the working temperature detection section 84 and the working humidity detection section 86. The consumables information acquisition section 15 acquires information on consumables used in the image forming apparatus 1, such as the printing sheet thickness, color of coloring material, type of the coloring material, and remaining amount of the coloring material on the basis of information detected by the consumable detection section. The specification information acquisition section 16 acquires the specification information of the image forming apparatus 1.

Furthermore, the failure diagnosis apparatus 3 has a failure diagnosis section 200 including a failure judgment section 240, an estimation engine (failure probability estimation section) 260, and a notification section 270. The failure judgment section 240 makes failure judgment and failure prediction on the basis of various information acquired by the parts-state information acquisition section 12 and the history information acquisition management section 13. The estimation engine (failure probability estimation section) 260 estimates failure probabilities to be used for failure judgment or failure prediction of the failure judgment section 240. The notification section 270 notifies a customer of results of the failure judgment and details of inspection.

The failure judgment section 240 has a function of a failure candidate extraction section for narrowing down the failure candidates by using the estimation engine 260. The failure judgment section 240 notifies the notification section 270 of the narrowed failure candidates, the results of failure judgment (occurrence of failure, failure point, and details of failure), the results of failure prediction (failure possibility, failure point, and details of failure), or details of inspection and acquired operation state signals.

The notification section 270 notifies of the results of failure judgment received from the failure judgment section 240 a customer (an operator or owner of the image forming apparatus 1), a customer engineer who performs maintenance (maintenance, support, management) of the image forming apparatus 1 or a customer engineer and a customer of an administration center administering the image forming apparatus 1.

For example, in the case of directly notifying a customer, notification may be implemented by using an alarm, for example, a display panel or a speaker on the image forming apparatus 1. A customer looks at or listens such a notification and can tell a service center the failure point and details. In the case of directly notifying a customers engineer who maintains the image forming apparatus 1, failure may be informed by using a mobile terminal such as a public phone line, a PDA (Personal Digital Assistant), a portable phone, or a PHS (Personal Handy-phone System). Also, it is possible to transmit a failure point and details of the failure to a terminal that a customers engineer has.

In the case of informing to an administration center, which administers the image forming apparatus 1, a public phone line or a mobile terminal can also be used as with the case of directly notifying a customer engineer. Furthermore, notification by using the Internet is also possible. In these cases, it is also possible to transmit data on a failure point and details of the failure to a terminal of the administration center.

Furthermore, details of inspection in failure diagnosis executed by the failure diagnosis section 200 and data used therein such as the operation state signal may be notified the administration center. In this case, the administration center may narrow failure candidates or specify failure point and details of failure.

<Configuration Example of Acquiring the Observation Data Information>

Figure 6:
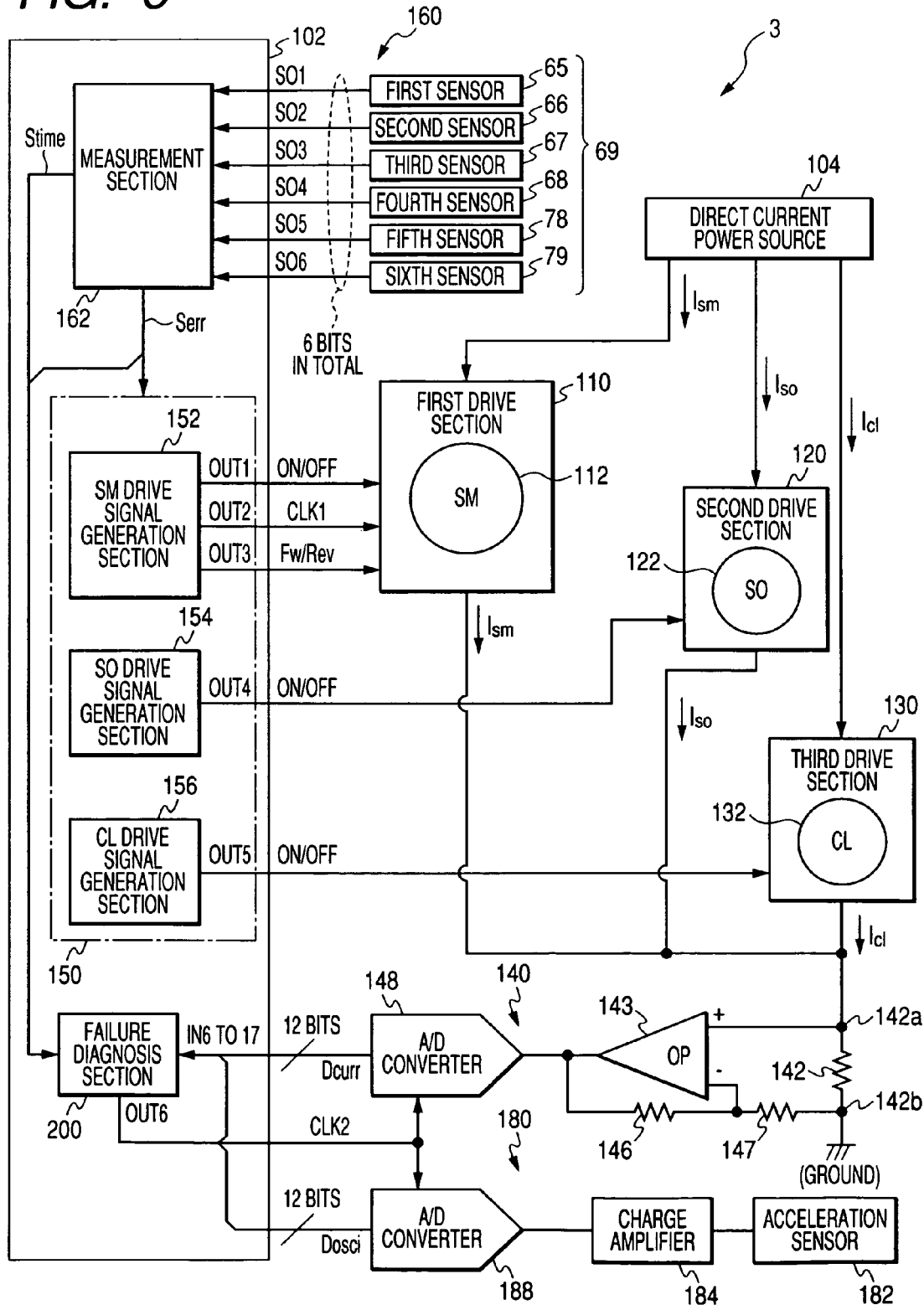
FIG. 6 is a block diagram showing a configuration example for acquiring observation data information in the failure diagnosis apparatus.
Figure 7:
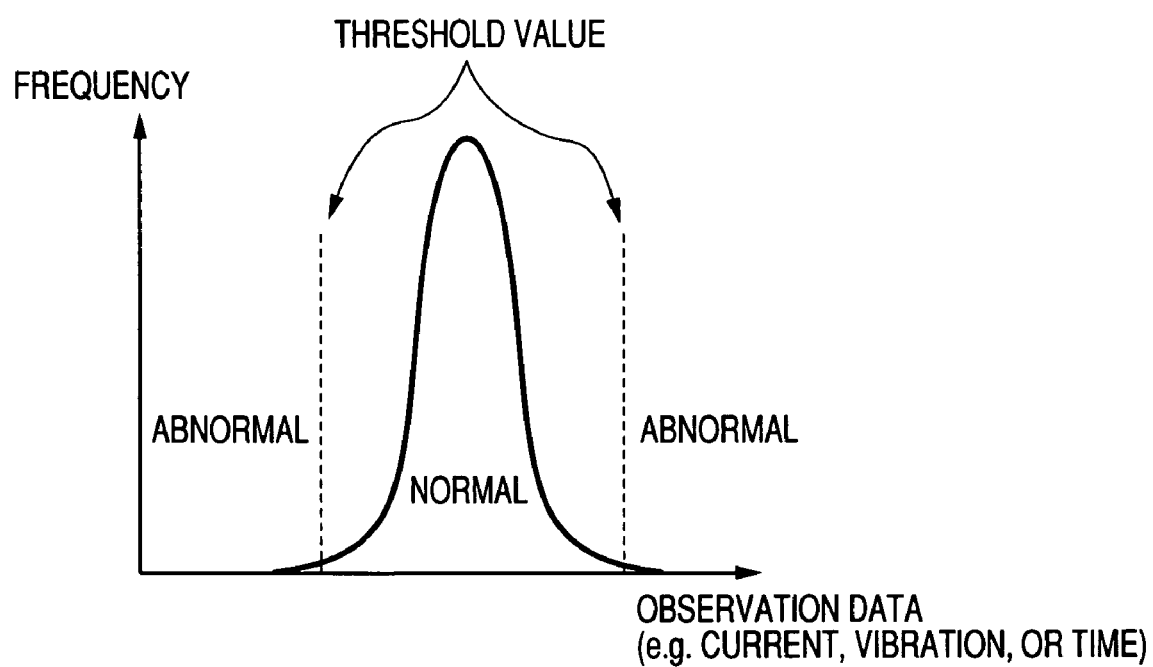
FIG. 7 is a diagram describing an example of a judgment method for judging whether or not failure has occurred on the basis of the acquired observation data.

FIG. 6 is a block diagram showing a configuration example for acquiring the observation data information in the failure diagnosis apparatus 3. FIG. 6 also shows a configuration example of the parts-state information acquisition section 12 and the failure diagnosis section 200 shown in FIG. 5. FIG. 7 is a drawing describing an example of a judgment method for judging whether or not failure occurs on the basis of the acquired observation data.

Herein, particularly, an example relating to implementation of the failure diagnosis apparatus for inspecting the operation states of the drive mechanism section 90 will be described. Specifically, description is given on an example in which stepping motors, solenoids, and clutches are used as power sources for driving the rolls, pairs of rolls, and other movable parts. For example, with focusing on functional elements, which detect operation states of drive circuits for driving the stepping motors 112, 122 and the clutch 132 (collectively referred to as drive members) inside the respective blocks 91 to 94 and detect operation states of the stepping motor 112 and the like, FIG. 6 shows circuit members forming them and connection relationships among them.

Each block of the drive mechanism section 90 are not always provided with all of the stepping motors, solenoids, and clutches. However, herein, it is assumed that each block has all of them. The stepping motor (SM) 112 corresponds to the motors 96 to 99 of FIG. 1. The solenoid (SO) 122 corresponds to the solenoid 612 of FIG. 2. The clutch (CL) 132 corresponds to the clutch 610 of FIG. 2.

The illustrated failure diagnosis apparatus 3 uses, as signals indicating the operation state of the drive mechanism section 90, both of a signal on which operation current flowing in the drive member of the motor, solenoid, and clutch are reflected, and a signal on which reflected is a vibration state of the drive mechanism section 90 (block) to which the drive member belongs when the drive members are operated. A specific example is described below.

The failure diagnosis apparatus 3 has a functional section for acquiring a signal on which an operation current flowing in a drive member such as a motor, solenoid, and clutch is reflected, as a signal indicating operation states of the drive mechanism section 90 and a control circuit 102 serving as a main functional section for controlling a failure diagnosis operation. The failure diagnosis apparatus 3 has, as the functional section, a direct-current power source 104, a first drive section 110 for driving the stepping motor 112, a second drive section 120 for driving the solenoid 122, a third drive section 130 for driving the clutch 132, and a drive-section operation current detection section 140 having an operation current detection resistor 142.

The drive-section operation current detection section 140 is one example of an operation state signal detection section for detecting a signal indicating an operation current of the drive member such as the stepping motor 112, as an operation state signal indicating an operation state for a predetermined period in which the drive mechanism section 90 operates. The operation current detection resistor 142 is one example of a current detection member.

A predetermined voltage (for example, +24V) of the direct-current voltage is applied from the direct-current power source 104 to predetermined terminals (112*c*, 122*a*, 132*a*) of the stepping motor 112, the solenoid 122, and the clutch 132.

Operation currents $I_{sm}$, $I_{so}$, and $I_{sl}$ of the stepping motor 112, the solenoid 122, and the clutch 132 are input to one terminal 142a of the operation current detection resistor 142. The other terminal 142b thereof is grounded. Namely, one operation current detection resistor 142 is commonly used for the plurality of drive members such as the stepping motor 112 and the solenoid 122. Thereby, acquired is observation information of the parts (the motor, solenoid, and clutch, etc.) during driven that are driven upon receiving a power supply.

The motor, solenoid, and clutch often use a common power source (the direct-current power source 104 of this embodiment) as described in this embodiment. Therefore, with adopting this configuration, if a sensor for circuit current detection is disposed on the source side, the currents of all the driving parts can be observed by a single sensor.

Although not shown, currents for other members inside the image forming apparatus 1, for example, currents for lamps and fans also flow into the operation current detection resistor 142. Therefore, even when the operations of the stepping motor 112 and the solenoid 122 are stopped (turned off), the current flowing in the operation current detection resistor 142 does not become zero.

The control circuit 102 has a drive signal generation section 150, a measurement section 162, and the failure diagnosis section 200. The drive signal generation section 150 generates various control signals for controlling the operations of the stepping motor 112, the solenoid 122, and the clutch 132. The measurement section 162 calculates conveyance timings of printing sheets. The failure diagnosis section 200 processes, according to predetermined procedures, operation state signals acquired by the drive-section operation current detection section 140 and sheet passing times acquired by the measurement section 162, to obtain predetermined characteristic amounts. The failure diagnosis section 200 also compares reference characteristic amounts in normal conditions acquired in advance with actual operation characteristic amounts in working conditions to diagnose whether or not the drive mechanism section 90 is failed (abnormal in operation).

The drive signal generation section 150 is one example of a control section for controlling operation start and operation stop of each drive member. The sheet timing sensors 69 serving as the sheet detection member and the measurement section 162 form the entirety of the sheet passing time detection section 160 that detects conveyance times of a printing sheet in predetermined sections set between the sheet timing sensors 69 as an operation state signal. The sheet passing time detection section 160 also functions as a block operation state signal detection section for detecting a block operation state signal indicating an operation state of each block.

One of output signals of the measurement section 162 (time detection signal $S_{time}$) is input into the failure diagnosis section 200. The other one (error signal $S_{err}$) is input into the drive signal generation section 150 and the failure diagnosis section 200. The failure diagnosis section 200 can judge whether or not failure occurs in the units of blocks on the basis of the sheet passing time detected by the sheet passing time detecting part 160, and can execute detailed failure diagnosis for a block (drive mechanism) judged as being in failure.

The measurement section 162 monitors times at which a sheet passes through the timing sensors 65, 66, 67, 68, 78, and 79. When a sheet passes at a time other than the scheduled times, the measurement section 162 judges that jamming has occurred and stops the drive section for sheet conveyance. This stopping operation also has meaning of preventing mechanical breakage due to abnormal printing or crushing of printing sheets themselves. The sheet timing sensors for jamming detection is attached as standard equipment to almost all copying machines offered commercially at present. Therefore, use of sheet passing times for failure judgment in the units of blocks is advantageous in terms of cost. This is because this eliminates the necessity of newly providing sensors.

The drive signal generation section 150 has a stepping motor drive signal generation section (hereinafter, also referred to as SO drive signal generation section) 152 for generating control signals (in this embodiment, ON/OFF, CLK, and Fw/Rev) for controlling the operation of the stepping motor 112, a solenoid drive signal generation section (hereinafter, also referred to as SO drive signal generation section) 154 for generating control signals (in this embodiment, ON/OFF) for controlling the operation of the solenoid 122, and a clutch drive signal generation section (hereinafter, also referred to as CL drive signal generation section) 156 for generating control signals (in this embodiment, ON/OFF) for controlling the operation of the clutch 132.

Detection signals SO1 to SO6 (1 bit each: 6 bits in total) are input from the corresponding sheet timing sensors 69 to the respective input terminals IN1 to IN6 of the measurement section 162. The measurement section 162 calculates the times at which a front end of a sheet passes through each sensor on the basis of the detection signals SO1 to SO6 input from the sheet timing sensors 69. The measurement section 162 sends the time detection signals $S_{time}$ indicating the calculating sheet passing times to the failure diagnosis section 200.

Furthermore, the measurement section 162 judges whether or not the calculated passing times are within predetermined reference time ranges (predetermined timing ranges). When they are out of the reference time ranges, the measurement section 162 concludes that failure has occurred in the recording sheet conveyance process, and notifies the drive signal generation section 150 of an error signal $S_{err}$ to stop the subsequent sheet conveyance process. In response to this, the drive signal generation sections 152, 154, and 156 in the drive signal generation section 150 stop the drive mechanism section 90 by stopping the operations of the stepping motor 112, the solenoid 122 and the clutch 132 to stop the sheet conveyance. This event is normally called occurrence of jamming.

The operation current $I_{sm}$ of the stepping motor 112 is guided to the operation current detection resistor 142 of the drive-section operation current detection section 140 through a motor driver circuit 114. Furthermore, the operation current $I_{so}$ of the solenoid 122 is guided to the operation current detection resistor 142. The operation current $I_{cl}$ of the clutch 132 is guided to the operation current detection resistor 142.

The drive-section operation current detection section 140, which is one example of the operation state signal detection section, has an amplifier circuit 143 and an A/D converter circuit 148 in addition to the operation current detection resistor 142. A clock signal CLK 2 is input from the terminal OUT6 of the failure diagnosis section 200 into the A/D converter 148. Detection data $D_{curr}$ indicating an operation current digitized by the A/D converter 148 is input into the input terminals IN16 and IN17 of the failure diagnosis section 200. As the A/D converter 148 of this embodiment, a 12-bit converter is used. The converter is not limited to the 12-bit converter. The converter may be determined by considering the resolution, memory capacity, and cost. A converter of 12 bits or more, or less may be used.

The amplifier circuit 143 has an operational amplifier (OP) 144, an input resistor 145, a negative feedback resistor 146, and a resistor 147. The input resistor 145 is disposed between the non-inverting terminal (+) of the operational amplifier 144 and the terminal 142a of the operation current detection resistor 142. The negative feedback resistor 146 is disposed between the inverted terminal (−) and the output of the operational amplifier 144. The resistor 147 is disposed between the inverted terminal (−) and the ground of the operational amplifier 144. As shown in the figure, it is preferable that the ground side of the resistor 147 is very close to a ground point of the operation current detection resistor 142.

The amplifier circuit 143 forms a non-inverting amplifier by using the operational amplifier 144, the input resistor 145, the negative feedback resistor 146, and the resistor 147. One end 142a of the operation current detection resistor 142 is connected to the non-inverting terminal (+) of the operational amplifier 144 via the input resistor 145. The amplification factor of the amplifier circuit 143 is determined by the ratio of the resistance value R146 of the negative feedback resistor 146 and the resistance value R147 of the resistor 147 (resistance ratio). In this embodiment, since a non-inverting amplifier is constructed, the amplification factor thereof is 1+R147/R146.

When detecting the operation currents of the drive mechanism section 90, the operation current detection resistor 142 provided in the middle of the power supply paths from the direct-current power source 104 to the driving members such as the stepping motor 112 and the like are used. It is desirable that a resistor with a low resistance value, for example, 1Ω or less is used As the operation current detection resistor 142. As such a resistor, a resistor excellent in temperature characteristics and in resistance value accuracy, for example, a resistor made of a copper-nickel alloy is preferably used.

When a current flows into the operation current detection resistor 142, a voltage drop (potential difference) occurs on both ends thereof (between 142a and 142b). If detecting this potential difference, the currents flowing into the drive members of the blocks 91 to 94 can be detected. The amplifier circuit 143 detects the potential difference between both ends of the operation current detection resistor 142, amplifies the potential difference, and sends the amplified potential difference to the A/D converter 148.

In order to detect the operation currents $I_{sm}$, $I_{so}$, and $I_{cl}$ (hereinafter, collectively referred to as operation currents $I_o$) with distinguishing from each other, at the time of actual current detection, an ON state of a control signal ON/OFF is individually applied from the drive signal generation sections 152, 154, and 156 to the stepping motor 112, the solenoid 122, and the clutch 132 for a predetermined period of time (for example, approximately 100 through 200 ms (milliseconds), and voltages generated during this application of the control signal on both ends of the operation current detection resistors 142 are amplified by the amplifier circuit 143, and then converted into digital signals (detection data $D_{curr}$) by the A/D converter 148 in synch with a clock signal CLK2 output from the terminal OUT6 of the failure diagnosis section 200.

For example, when a diagnosis target is set to the stepping motor 112, the A/D converter 148 converts voltages (both-end voltages of the operation current detection resistor 142) corresponding to the operation current $I_{sm}$ obtained at the operation current detection resistor 142 into the detection data $D_{curr}$ for 200 ms after the SM drive signal generation section 152 turns the control signal ON/OFF on. When the diagnosis target is set to the solenoid 122, the A/D converter 148 converts voltages (both-end voltages of the operation current detection resistor 142) corresponding to the operation current $I_{so}$ obtained at the operation current detection resistor 142 for 100 ms after the SO drive signal generation section 154 turns the control signal ON/OFF on.

A frequency of the clock signal CLK2 to be supplied to the A/D converter 148 is set so that, for example, the sampling number n becomes approximately 1365 in the case of the 200 ms period, and becomes approximately 683 in the case of the 100 ms period. Herein, the sampling number n is set to approximately 1365 in the case of the 200 ms period and approximately 683 in the case of the 100 ms period. However, the sampling number n itself is not strictly limited.

It is necessary that characteristic points required for failure diagnosis are included in a set of data vk (n data in total) of sampling points k (k=1 to n) to be taken into failure diagnosis section 200 as detection data $D_{curr}$. The sample number n may be determined with taking into consideration the characteristic points the memory capacity for storing data vk and the calculation speed when data processing. In this regard, it is preferable that the failure diagnosis section 200 is configured so as to switch the frequency of the clock signal CLK2 on the basis of the memory capacity and the calculation speed.

Herein, when a large amount of operation currents flow, remarkable voltage drops occur due to the operation current detection resistors 142, so that there arises a problem that it is impossible to supply a rated voltage to the drive members such as the stepping motor 112 and the solenoid 122. In this case, in place of the operation current detection resistors 142 formed of resistors (for example, 1Ω or less), as a current sensor having a hall element or a sensor detecting currents by integrating the induced electromotive force detected by a coil may be used as the current detection member.

Furthermore, the mechanism for detecting a current by using a hall element or a coil is a known technique, so that illustration of the configuration thereof is omitted herein as well as explanation of operation thereof. When using a hall element and a coil, almost no voltage drop occurs on both ends of the current detection member. Therefore, the above-mentioned problem can be solved. Use of a resistor is advantageous in that it can detect operation currents with a simple configuration although this has a problem of voltage drop.

The failure diagnosis section 200 sets effective values of the operation currents, impulse currents having prominent peaks on the time axis, transient responses after being turned on, or narrow band currents having prominent peaks on a frequency axis as monitoring targets on the basis of detection data Dcurr on which reflected is operation currents detected by, for example, the operation current detection resistors 142, and detects and analyses them to extract characteristic amounts preferable for failure diagnosis. For example, in addition to a method in which levels or differences in temporal change of the effective values of the operation currents is analyzed, a method in which the frequency and level of a specific peak are investigated by frequency spectral analysis by means of high-speed digital Fourier transform may be used as such an analysis.

When adopting judgment based on levels of a characteristic amount, which is the effective values of the operation current, it is comparatively easy to make the judgment. When judging the level, for example, as shown in FIG. 7, a method that uses distribution characteristics using an average value and dispersion (standard deviation) as characteristic amounts may be employed. For example, 3σ is set as a threshold value, and values ±3σ from the average value are normal and the others are regarded as abnormal.

On the other hand, when the occurrence time point of an impulse current is accurately detected, detailed information of the machine can be obtained through comparison with a timing chart, and failure detection and analysis on aging changes of the machine can be performed by grasping the current at the time of starting and transient responses of the impulse current. Furthermore, if using high-speed digital Fourier transform, it is possible to convert the current at the time of starting and the impulse current into spectra and to digitize and record these characteristics. As a result, current changes can be clearly recognized.

Furthermore, the single operation current detection resistor 142 can detect the operation currents flowing in a plurality of driving members such as the stepping motor 112 and the solenoid 122, so that the drive-section operation current detection section 140 can detect operation currents $I_o$ of all the drive members at one point. Therefore, even in a device having a plurality of drive circuits, the drive-section operation current detection section 140 can be configured compactly at low cost.

Furthermore, the failure diagnosis apparatus 3 has the drive mechanism vibration detection section 180 including an acceleration sensor 182 as a functional section for acquiring, when a drive member such as a motor, solenoid, or clutch is operated, a signal (for example, operation sound signal) on which reflected is a vibration state of a drive mechanism section 90 (block) to which the drive member belongs, as a signal indicating an operation state of the drive mechanism section 90.

The vibration detection section 180 is one example of the operation state signal detection section for detecting a signal on which vibration is reflected as an operation state signal indicating an operation state for a predetermined period in which the drive mechanism section 90 operates. The mechanical vibration detection section 180 corresponds to the drive mechanism vibration detection section 80 shown in FIG. 1.

The acceleration sensor 182 is one example of the sensor member for detecting an operation state signal, and corresponds to the vibration sensor 82 shown in FIG. 1. A single acceleration sensor 182 is commonly used for the plurality of drive members such as the stepping motor 112, and the solenoid 122.

The vibration detection section 180, which is one example of the operation state signal detection section, has a charge amplifier (integrating type amplifier) 184 and an A/D converter 188 in addition to the acceleration sensor 182. The A/D converter 188 is similar to the A/D converter 148, and its connection relationship with the failure diagnosis section 200 is also similar to that of the A/D converter 148.

The acceleration sensor 182 detects an electrical signal in proportion to the vibration acceleration of the drive member. The acceleration sensor 182 uses a general piezoelectric system, so that it converts a charge signal into a voltage signal by the charge amplifier 184.

The configuration using the acceleration sensor 182 as the vibration sensor 82 is more advantageous than in the case of using an acoustic sensor. This is because the configuration is hardly influenced by external noise. Furthermore, since the single acceleration sensor 182 detects vibrations of each drive member such as the stepping motor 112, the vibration detection section 180 can detect vibrations of all the drive members at one place. Therefore, even in a device having a plurality of drive circuits, the vibration detection section 180 can be configured compactly at low cost.

In vibration detection at the vibration detection section 180, as with the case of detection of operation currents flowing in the drive members such as the motor, solenoid, and clutch, in order to distinguish and detect vibrations during the stepping motor 112, the solenoid 122, and the clutch 132 separately, operating by distinguishing from each other, in actual vibration detection, an ON state of a control signal ON/OFF is individually applied from the drive signal generation sections 152, 154, and 156 to the stepping motor 112, the solenoid 122, and the clutch 132 for a predetermined period of time (for example, approximately 100 to 200 ms), and charge generated during this application of the control signal at the acceleration sensor 182 is converted into a voltage and amplified by the charge amplifier 184, and then converted into a digital signal (detection data $D_{osci}$) by the A/D converter 188 in synch with a clock signal CLK2 output from the terminal OUT6 of the failure diagnosis section 200.

As with the case of analysis on detection data $D_{curr}$ for example, the failure diagnosis section 200 sets an acceleration effective value, acceleration having a prominent peak on a time base, transient responses after being turned on, or prominent peaks on a frequency axis as monitoring targets on the basis of detection data $D_{osci}$ which reflected is accelerations (caused by vibrations) detected by the acceleration sensor 182, and detects and analyzes them. When using judgment based on the level of the acceleration effective value, it is easy to make judgment.

Furthermore, in place of the acceleration sensor 182, an acoustic sensor can be used as the vibration sensor 82 although not shown. A cause of sound inside the image forming apparatus 1 includes a sound produced due to collision between parts and between a printing sheet and a part in the printing sheet conveyance process such as a case where a printing sheet comes into contact with a positioning part or a case where a printing sheet warps and hits against a chute, and a sound produced when a driving member such as the stepping motor 112 or the solenoid 122 is turned on/off. Such a sound is comparatively easily detected since its production period is specified. It is possible to monitor subsequent aging changes of such sound in sound pressure.

Therefore, the failure diagnosis section 200 employs a method for detecting failure on the basis of a sound produced from the machine and detected by the acoustic sensor. For example, impact sounds having prominent peaks on a time base and narrow band sounds having prominent peaks on a frequency axis are set as monitoring targets, and they are detected and analyzed. The analysis may be a method of investigating frequency and level of a specific peak by means of high-speed digital Fourier transform frequencies or a method of investigating sound pressure levels and temporal changes.

When the occurrence time point of an impact sound is accurately found, detailed information on the machine can be acquired through comparison with a timing chart, and changes in impact sound are grasped and aging changes of the machine can be analyzed. Also, when using the high-speed digital Fourier transform, it is possible to convert the impact sound into a spectrum and to digitize and record the characteristics of the impact sound. As a result, changes in impact sound can be clearly recognized.

In some cases, an impact sound produced from the image forming apparatus 1 having a copying function and a printing function is hidden in superposition of background noise of the installation environment and normal noise of the machine main body. Furthermore, in some cases, only background noise changes although there is no change in impact sound. For example, background noise of the environments where the machine is installed changes day and night and depends on whether or not an operator is present near the machine. In these cases, such a sound may be erroneously detected as a failure, so that employment of an analysis method in which these circumstances are taken into account, that is, a method for purely detecting characteristics of only an impact sound without containing background noise is desirable. Furthermore, due to mechanical aging changes, parts collision sounds may change (for example, become louder). Therefore, employment of an analysis for accurately extracting and grasping aging changes of impact sounds themselves is desirable.

<Block Correspondence of Failure Diagnosis Apparatus>

Figure 8A:
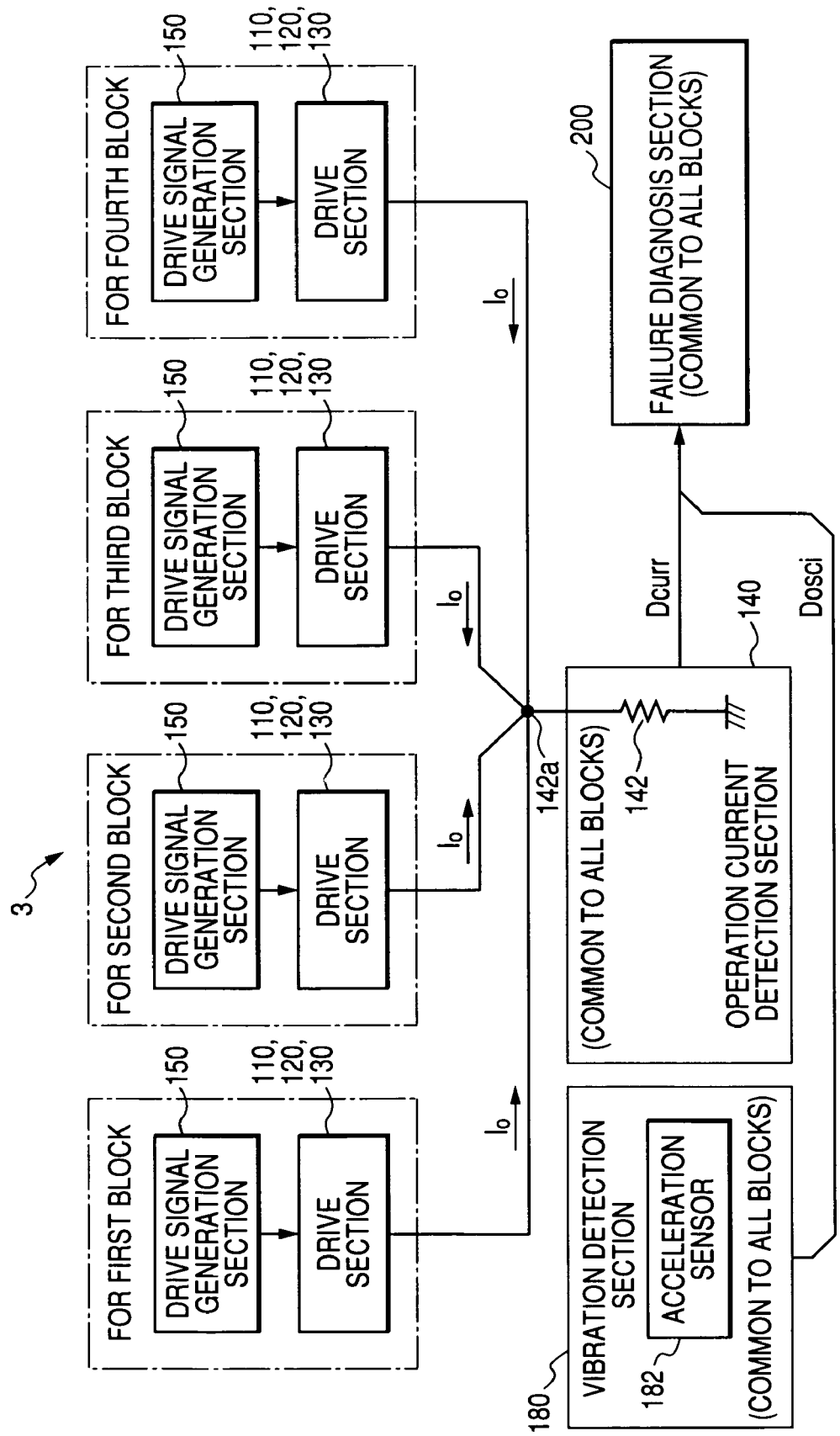
FIG. 8 are diagrams describing correspondence of the drive mechanism section to block division in a case where the failure diagnosis apparatus 3 shown in FIG. 6 is configured.

FIG. 8 are diagrams describing the correspondence of the drive mechanism section 90 to the block division in the case of configuring the failure diagnosis apparatus 3 shown in FIG. 6. First, FIG. 8A shows a first example thereof. Each functional section (for example, the drive sections 110, 120, 130 and the drive signal generation section 150) except for the drive-section operation current detection section 140 and the failure diagnosis section 200 is provided for each of the blocks 91 to 94 of the drive mechanism section 90. On the other hand, a single system including the drive-section operation current detection section 140, the vibration detection section 180, and the failure diagnosis section 200 is commonly provided for all the blocks. The direct-current power source 104 may also be commonly provided for all the blocks.

With this configuration, the operation currents $I_o$ flow from the respective blocks 91 to 94 to the operation current detection resistor 142. Therefore, the drive-section operation current detection section 140 can detect the operation currents $I_o$ of all the blocks and all the drive members at one place. As a result, the failure diagnosis apparatus 3 can be configured compactly at low cost. This is convenient for application to a small-sized image forming apparatus 1.

Figure 8B:
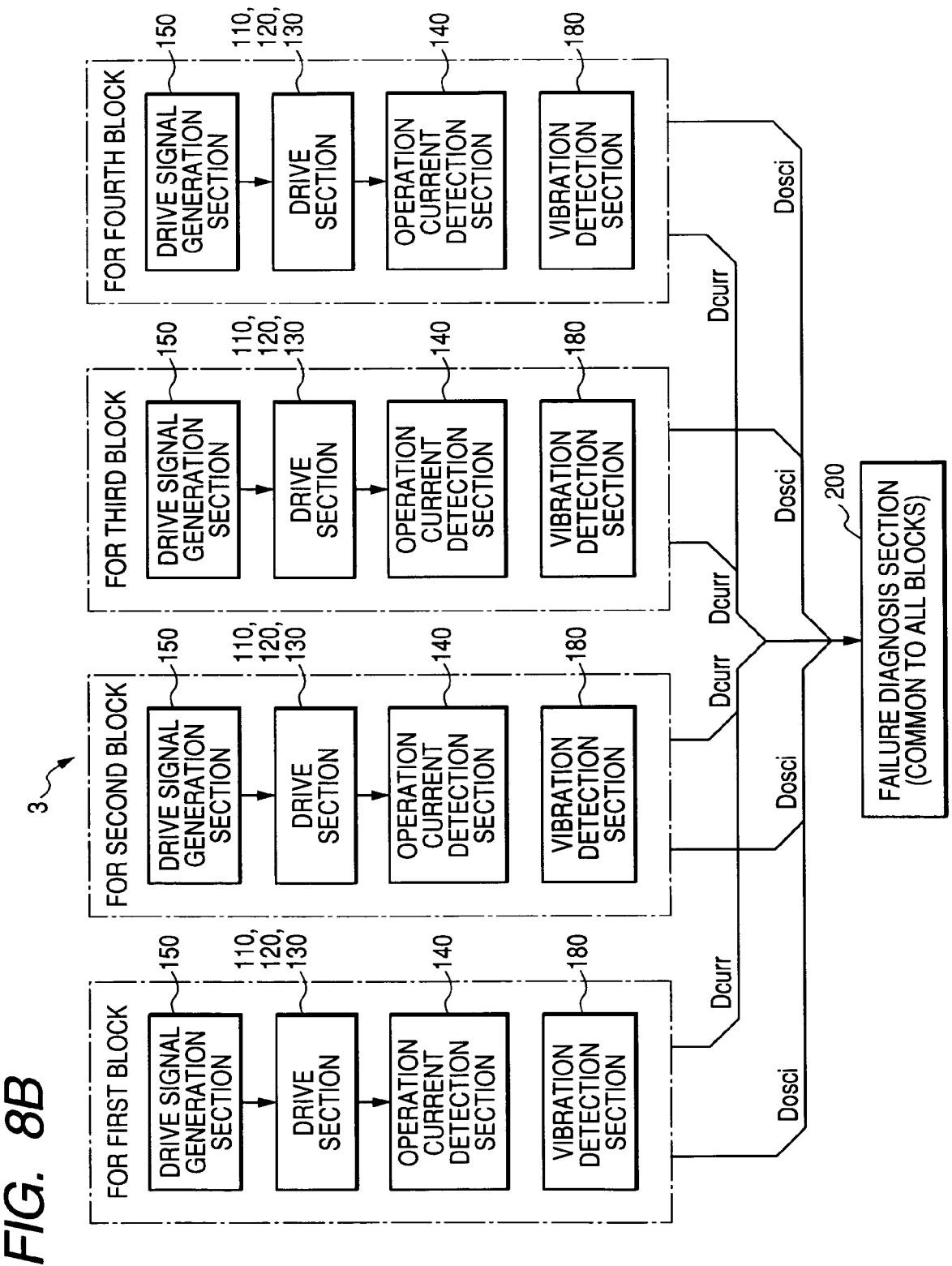

On the other hand, FIG. 8B shows a second example thereof. In addition to the configuration of the first example, the drive-section operation current detection section 140 and the vibration detection section 180 are also provided for each of the blocks 91 through 94. A single system including the failure diagnosis section 200 is commonly provided for all the blocks. In this second example, the operation current $I_o$ is detected for each of the blocks 91 to 94. The results of detection obtained for each of the blocks 91 to 94 are input into the failure diagnosis section 200.

With this configuration, although the configuration becomes slightly large, detection can be made near the detection target members by disposing the operation current detection resistor 142 for detecting operation currents $I_o$, the acceleration sensor 182 for detecting accelerations, and the acoustic sensor (not shown) for detecting operation sounds at appropriate places according to the physical arrangement of the blocks. These are analog signal systems. However, after detection for each block, the results can be converted into digital data $D_{curr}$ and $D_{osci}$ and sent to the failure diagnosis section 200 provided at one place.

In the configuration of the first example, lines of the analog signal systems tends to be extended long since the signal lines for operation currents $I_o$ of the respective blocks must be extended to the terminals 142a of the operation current detection resistors 142. Therefore, it is easily influenced by noise. On the other hand, in the configuration of the second example, operation current detection is made for each block, so that the lines of the analog signal systems can be shortened. Therefore, they are hardly influenced by noise (excellent in noise resistance).

Furthermore, in the configuration of the first example, since operation sounds and accelerations are detected at one place, in the case of a large device, a position where the vibration sensor is disposed may be far from the detection target block. Therefore, a problem may arise in detection performance such that the sensor is easily lowered in sensitivity and is easily influenced by background noise. On the other hand, in the configuration of the second example, detection is made for each block. Therefore, vibration can be detected very near the inspection target member. The second example is superior to the first example in terms of these problems. Therefore, the configuration of the second example is convenient for application to a large-sized image forming apparatus 1.

Furthermore, since an operation current and vibration are detected for each block, occurrence of failure is judged for each block on the basis of operation state signals detected for each block, and detailed failure diagnosis can be executed for a block judged as being failed. By narrowing the detailed failure diagnosis target range in the units of blocks, points for which detailed failure diagnosis is executed can be reduced. Application of the configuration in which a failure judgment in the units of blocks is made by using the sheet passing times is limited to a device having a mechanism for conveying the member to be conveyed such as an image forming apparatus. However, by using the configuration of this second example, the mechanism of failure judgment in the units of blocks can be applied to various devices.

<Configuration Example of the Failure Diagnosis Section>

FIG. 9 is a functional block diagram showing a configuration example of the failure diagnosis section 200. The failure diagnosis section 200 has the following features. A single motor is commonly used for the drive circuits; the drive members such as motors, solenoids, and clutches; and gears, bearings, belts, and rolls joined to the drive members. Ranges in which a driving force of the motor is transmitted are divided into blocks, respectively (in the units shown in FIG. 2 as a typical example) For each block, failure candidates are extracted, failure is diagnosed, and failure possibility is diagnosed (failure prediction). Therefore, one block may have a plurality of solenoids, clutches, and other driving members although its motor is always single. Hereinafter, detailed description is given.

As illustrated, the failure diagnosis section 200 has an operation state characteristic-amount acquisition section 210 and a sheet-passing-time characteristic-amount acquisition section 220. The operation state characteristic-amount acquisition section 210 processes, according to predetermined procedures, operation state signals (in the previous example, detection data $D_{curr}$ and $D_{osci}$) from the operation state signal detection section such as the drive-section operation current detection section 140 and the vibration detection section 180 shown in FIG. 8 as an example of the parts-state information acquisition section 12 for a predetermined period, to determine predetermined characteristic amounts on the basis of the processed data. The sheet-passing-time characteristic-amount acquisition section 220 processes the sheet passing times obtained by the measurement section 162 shown in FIG. 6 to determine predetermined characteristic amounts on the basis of the processed data.

The operation state characteristic-amount acquisition section 210 also acquires information from the parts-state information acquisition section 12, the history information acquisition management section 13, the environment information acquisition section 14, the consumables information acquisition section 15, or the specification information acquiring part 16.

Both of the operation state characteristic-amount acquisition section 210 and the sheet-passing-time characteristic-amount acquisition section 220 are examples of an operation state signal reception section for receiving various operation state signals automatically acquired by the drive-section operation current detection section 140 and the measurement section 162 shown in FIG. 6 by using sensor members.

The failure diagnosis section 200 further has a reference characteristic amount storage section 230 for storing reference characteristic amounts as judgment indexes for failure diagnosis in a predetermined storage medium (preferably, a volatile semiconductor memory) 232. The reference characteristic amount storage section 230 has, in addition to the storage medium 232, a write control section for writing the reference characteristic amounts into the storage medium 232 and a reading-out control section for reading-out the stored the reference characteristic amounts from the storage medium 232 although they are not shown.

The storage medium 232 has a function of a history storage section for storing history information of various operation state signals acquired by the operation state characteristic-amount acquisition section 210 and the sheet-passing-time characteristic-amount acquisition section 220 in the image forming apparatus 1.

As the reference characteristic amounts, for example, used are characteristic amounts acquired by each of the character amount acquisition sections 210, 220 in a normal condition where the mechanical members (including drive members such as motors and solenoids) forming the drive mechanism section 9 and the electrical members (including the drive signal generation section 150 and the drive circuits) for driving the mechanical members operate normally. Alternatively, instead of the characteristic amounts obtained by the characteristic amount acquisition sections 210, 220, operation currents and vibration rated values of the stepping motor 112 in the image forming apparatus 1 may be used.

Furthermore, when a failure is detected, characteristic amounts acquired by the characteristic amount acquisition sections 210, 220 at a time where each constituent member fails are used as the reference characteristic amounts for judging failure position and failure state. The reference characteristic amounts regarding the failure state may be ones detected by the characteristic amount acquisition sections 210, 220 while forcibly causing the members of the image forming apparatus to fail. Alternatively, the reference characteristic amounts regarding the failure state may be information acquired on the basis of maintenance information summarized at an administration center. It is also possible that the image forming apparatus 1 and the administration center have been connected via the network, and then information in the case of a failure stored in the storage medium 232 is periodically updated.

Furthermore, the failure diagnosis section 200 has the failure judgment section 240 and a control section 250. The failure judgment section 240 compares the reference character amounts stored in the storage medium 232 with the actual operation characteristic amounts, which are character amounts by each of the character amount acquisition section 210, 220 at a time of failure diagnosis, to execute diagnosis processing relating to failure such as whether or not failure occurs in a diagnosis target block and future possibilities of occurrence of failure. The control section 250 controls each of the functional sections inside the failure diagnosis section 200 and the drive signal generation section 150.

The failure judgment section 240 has an operation state failure judgment section 242, a sheet passing failure judgment section 244, and a sheet passing failure prediction section 246. The operation state failure judgment section 242 executes failure judgment processing on the basis of characteristic amounts regarding operation state signals acquired by the operation state characteristic-amount acquisition section 210. The sheet passing failure judgment section 244 executes failure judgment processing on the basis of characteristic amounts regarding sheet passing times acquired by the sheet-passing-time characteristic-amount acquisition section 220. The sheet passing failure prediction section 246 executes failure prediction processing on the basis of characteristic amounts regarding sheet passing times acquired by the sheet-passing-time characteristic-amount acquisition section 220.

The failure judgment section 240 also has a failure state specification section 248 which, when the operation state failure judgment section 242 or the sheet passing failure judgment section 244 judges a failure or the sheet passing failure prediction section 246 predicts a failure, specifies the state of the failure with reference to information at the time of failure stored in the storage medium 23.

The control section 250 has a diagnosis-target-block determination section 252, a first switch section (SW1) 254, and a second switch section (SW2) 256. The diagnosis-target-block determination section 252 determines a diagnosis target block in which a failure point is to be specified and processing order with using the results of failure diagnosis by the sheet passing failure judgment section 244 that uses signals from the sheet passing time detection section 160. The first switching section (SW1) 254 and the second switching section (SW2) 256 serve as switch sections for switching between acquisition of reference characteristic amounts and acquisition of actual operation characteristic amounts, and switching diagnosis modes.

The control section 250 has a system clock 258 for acquiring time information (year, date, time, minute, and second). The system clock 258 has a clock chip (not shown) and acquires time information. This system clock 258 has a backup battery so as to prevent time information from disappearing due to turning-off of the power source or power cut, and always holds the current time.

Furthermore, the failure diagnosis section 200 has the estimation engine 260 for estimating failure probabilities used in failure judgment and failure prediction made at the failure judgment section 240, and the notification section 270 for notifying a customer of the results of failure judgment and inspection details.

<<Configuration Using Electrical Computer>>

Figure 10:
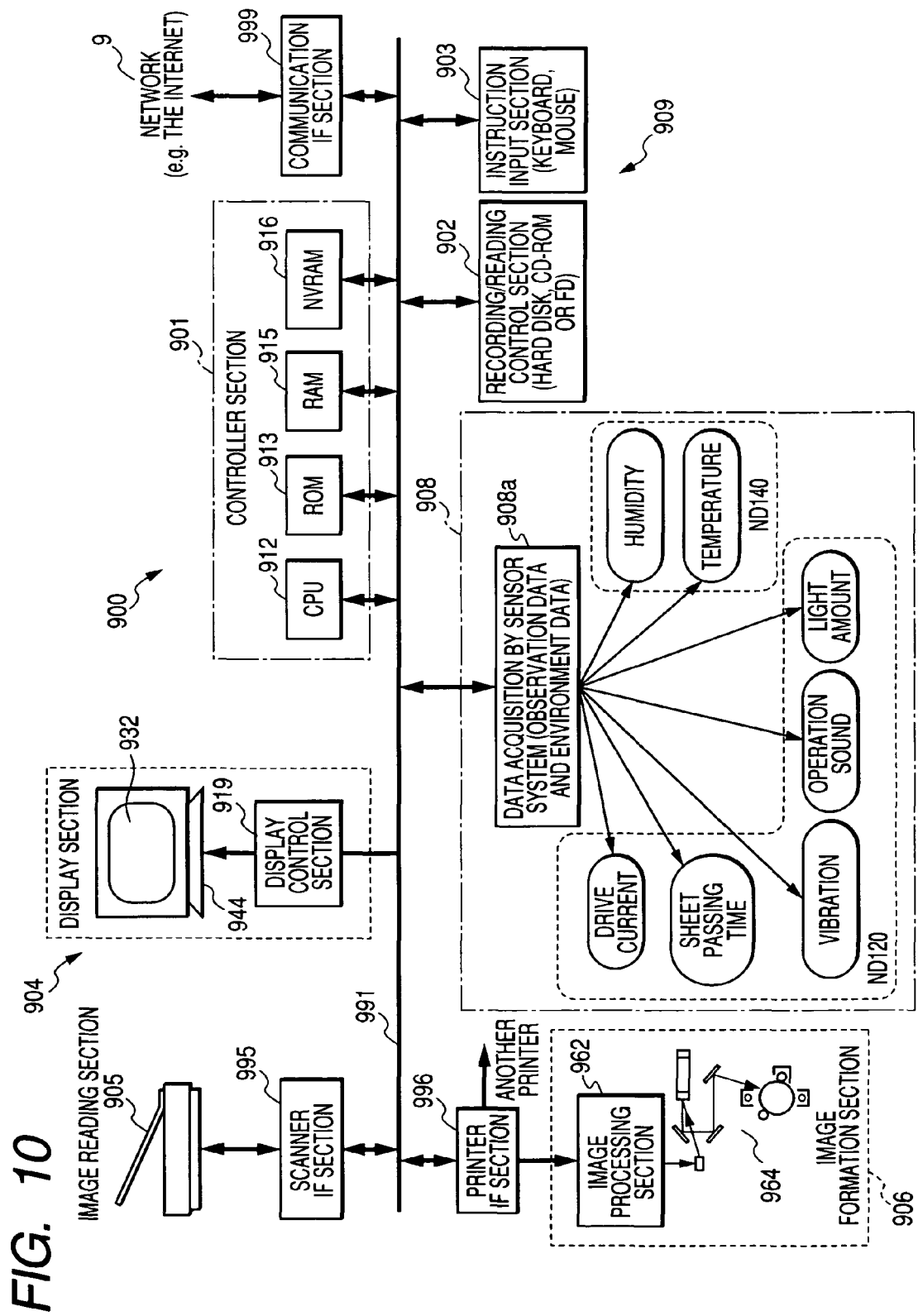
FIG. 10 is a block diagram showing an example of hardware configuration in a case where the failure diagnosis apparatus is implemented by means of software with using an electrical computer.

FIG. 10 is a block diagram showing an example of hardware configuration in a case where the failure diagnosis apparatus 3 is configured by means of software with using a CPU and a memory. That is, the failure diagnosis apparatus 3 is implemented by means of software with using functions of a computer (electrical computer) such as a personal computer.

A program preferable for implementing the failure diagnosis method and the failure diagnosis apparatus according to the embodiments of the invention to which the Bayesian network described later are applied, by means of software with using an electrical computer or a computer-readable storage medium storing, may be extracted as an invention.

As a matter of course, the failure diagnosis apparatus 3 and the failure diagnosis section 200 are not limited to such a configuration using a computer. The failure diagnosis apparatus 3 and the failure diagnosis section 200 may be configured by means of a combination of exclusive hardware that performs the functions of the functional sections shown in FIG. 5 to FIG. 9. Employment of a mechanism in which software executes processings provides an advantage in that the processing procedures can be easily changed without changing the hardware.

In order to make an electrical computer perform the failure diagnosis function using a series of the Bayesian network processings by means of software, a program forming the software is installed from a recording medium into a computer (installed microcomputer) incorporated with exclusive hardware, a SOC (System On a Chip) realizing a desired system by mounting the functions of a CPU (Central Processing Unit), a logic circuit, and a storage device on one chip, or a general-purpose personal computer, which can execute various functions by installing various programs therein.

The recording medium can transmit description contents of a program to a reading device set in hardware resources of a computer in a form of corresponding signals by causing changed states of energy such as magnetism, light, and electricity according to the description details of the program.

For example, the recording medium consists of, separately from the computer, not only a magnetic disk (including a flexible disk FD), an optical disk (including CD-ROM (Compact Disc Read-Only Memory), DVD (Digital Versatile Disc), a magnetic optical disk (including MD (Mini Disc)), or a package medium (portable recording medium) consisting of a semiconductor memory in which a program has been recorded, distributed for providing the program to customers, but also a ROM or a hard disk drive in which a program is recorded and is distributed in a pre-installed condition in the computer. Or, the program making the software may be distributed through a wired or wireless communications network.

For example, a storage medium in which program codes of software for implementing the calculation (including updating) function of failure probabilities in the Bayesian network processing is supplied to a system or a device. A computer (or CPU or MPU) of the system or the device reads the stored program codes. As a result, the same effect as in the case of configuration by hardware is also provided. In this case, the program codes themselves readout from the storage medium realize the failure diagnosis processing function using the Bayesian network.

Furthermore, by executing the program codes readout by the computer, not only the function for executing the Bayesian network is implemented, but also the OS (operating system: base software) working on the computer on the basis of instructions of the program codes may execute a part or the whole of the actual processing. By such processing, the failure probability calculation processing function and the failure point judgment processing function are implemented.

Furthermore, after the program codes readout from the storage medium is written onto a function expanding card inserted into the computer or a memory equipped in a function expanding unit connected to the computer, a CPU of the function expanding card or the function expanding unit may execute a part or the whole of actual processing on the basis of the instructions of the program codes. By such processing, the failure probability calculation processing function and the failure point judgment processing function are implemented.

In a case where the failure diagnosis apparatus 3 is installed in the image forming apparatus 1 having a copying function, installed into the electrical computer shown in FIG. 10 are software similar to that in a conventional image forming apparatus (complex machine) such as a processing program for a copying application, a printer application, a facsimile (FAX) application or other applications. In addition, a control program for data exchange with the exterior via the network 9 is also installed.

In this case, a program is provided as a file describing program codes for implementing the failure probability calculation processing function and the failure point judgment processing function by using the Bayesian network. However, in this case, form of providing the program is not limited to a lump program file. The program may be provided as individual program modules according to the system hardware configuration in the computer. For example, the program may be provided as add-in software installed in the existing copying machine control software or printer control software (printer driver).

For example, the computer system 900 forming the failure diagnosis apparatus 3 has a controller section 901, and a recording and reading control section 902 for reading data from or recording data onto a predetermined storage medium such as a hard disk drive, a flexible disk (FD) drive, a CD-ROM (Compact Disk ROM) drive, and a semiconductor memory controller.

The controller section 901 has a CPU (Central Processing Unit) 912, a ROM (Read Only Memory) 913 as a read-only storage section, a RAM (Random Access Memory) 915 that can be written or readout any time and is an example of a volatile storage section, and a RAM (referred to as NVRAM) 916, which is one example of a nonvolatile storage section. Information of parts failure probabilities weighted by used time, frequency, copied/printed sheet number is stored in the NVRAM 916.

In the above description, "volatile storage section" means a storage part which erases stored contents when the power source of the failure diagnosis apparatus 3 is turned off. On the other hand, the "nonvolatile storage section" means a storage part which continuously holds the stored contents even after the main power source of the failure diagnosis apparatus 3 is turned off. Any storage part can be used as long as it continuously holds stored contents, and the storage part is not limited to a semiconductor-made memory device which has nonvolatility by itself, and the storage part may be formed by constructing a volatile memory device so as to have "nonvolatility" by being provided with a backup battery. Furthermore, not limited to consisting of a semiconductor-made memory device, the storage part may be constructed by using a medium such as a magnetic disk or an optical disk.

Furthermore, the computer system 900 has, as functional section serving as a customer interface, an instruction input section 903 including a keyboard and a mouse, a display output section 904 for displaying an operation guidance screen or predetermined information such as results of processing to a customer, and an interface section (IF section) 909 performing an interface function between itself and the respective functional sections. When the failure diagnosis apparatus 3 is installed into an image forming apparatus 1 having a copying function and integrated together, an image reading section (scanner unit) 905 for reading an image as a processing object and an image formation section 906 for outputting a processed image to a predetermined output medium (for example, a printing sheet) are also provided.

In addition to a system bus 991, which is a transfer route for processed data (including image data) and control data, for example, a scanner IF section 995 performing an interface function for the image reading section 905, a printer IF section 996 performing an interface function for the image formation section 906 and other printers, and a communications IF section 999 for mediating exchange of communications data with the network 9 such as the Internet are provided as the interface section 909.

The display device 904 comprises, for example, a display control section 942, and a display section 944 consisting of a CRT (Cathode Ray Tube) or an LCD (Liquid Crystal Display). For example, the display control section 942 displays guidance information or a whole image taken by the image reading section 905 on the display section 944. Furthermore, it is also used as a display device for informing a customer of the results of failure judgment or inspection details. Furthermore, when the display section 944 has a touch panel 932 on the display surface, the touch panel 932 configures the instruction input section 903 for inputting predetermined information by fingertips or a pen.

The image reading section 905 has a function of an image input terminal, and for example, by irradiating light onto a document fed to a reading position by using a full-width array of a CCD solid-state image pickup device, an image on a document is read and red R, green G, and blue B analog video signals showing the read image are converted into digital signals.

The image formation section 906 forms (prints) a visible image of, for example, an image expressed by image signals obtained by the image reading section 905 onto a regular sheet or a thermal sheet by using electrophotography, the thermal method, the heat transfer method, the ink-jetting method, or similar conventional image forming processing.

Therefore, the image formation section 906 has an image processing section 962 for generating print-out data such as yellow Y, magenta M, cyan C, and black K binarized signals, and a print engine 964 of a luster output scanning base for working the failure diagnosis apparatus 3 as a digital printing system.

In this configuration, the CPU 912 controls the whole system via the system bus 991. The ROM 913 stores the control program of the CPU 912. The RAM 915 has a SRAM (Static Random Access Memory), and stores program control variables and data for various processing. The RAM 915 includes a region for temporarily storing electrical documents (including not only text data but also image data) acquired by a predetermined application program, image data acquired by the image reading section 905 equipped in this unit, and electrical data acquired from the exterior.

For example, the program for making the computer performing the failure probability calculation processing function and the failure diagnosis processing function by using the Bayesian network is distributed through a recording medium such as a CD-ROM. Alternatively, this program may be stored not in a CD-ROM but in an FD. It is also possible that a MO drive is provided and the program is stored in the MO, or the program may be stored in a nonvolatile semiconductor memory card such as a flash memory, or other recording media. Furthermore, the program may be downloaded or updated from other servers through the network 9 such as the Internet.

As a recording medium for providing the program, in addition to the FD and the CD-ROM, optical recording media such as a DVD, magnetic recording media such as an MD, optical magnetic recording media such as a PD, tape media, magnetic recording media, semiconductor memories such as IC cards or miniature cards can be used. In an FD or CD-ROM as an example of the recording medium, apart or whole of the functions for realizing the failure probability calculation processing function and the failure diagnosis processing function by using the Bayesian network can be stored.

Furthermore, the hard disk drive includes a region for storing data for various processing by the control program or temporarily storing a large amount of image data acquired by the image reading section 905 and printing data acquired from the exterior. The hard disk drive, the FD drive, or the CD-ROM drive is used for registering program data for making the CPU 12 to execute processing such as contents acquisition, address acquisition, or address setting on software.

Furthermore, a processing circuit 908 which performs processing of apart of the functional parts by exclusive hardware, rather than performing all processing of the functional parts of the failure diagnosis apparatus 3 by means of software, may be provided. The mechanism for processing by software can flexibly cope with parallel and serial processing, however, as the processing becomes complicated, the processing period is lengthened, so that lowering in processing speed poses a problem. On the other hand, by processing with a hardware processing circuit, an accelerator system aiming at an increase in speed can be constructed. The accelerator system can prevent lowering in processing speed and obtains high throughput even when the processing is complicated.

In the case of the failure diagnosis apparatus 3 of this embodiment applied to the image forming apparatus 1, a data acquisition functional section 908*a* of a sensor system for acquiring observation data information (ND120) such as the sheet passing times, drive currents, vibrations, operation sounds, and light amounts shown in FIG. 4, or environment information (ND140) such as the temperature and the humidity, corresponds to the processing circuit 908.

<<Details of the Failure Diagnosis Using the Bayesian Network>>

Figure 11:
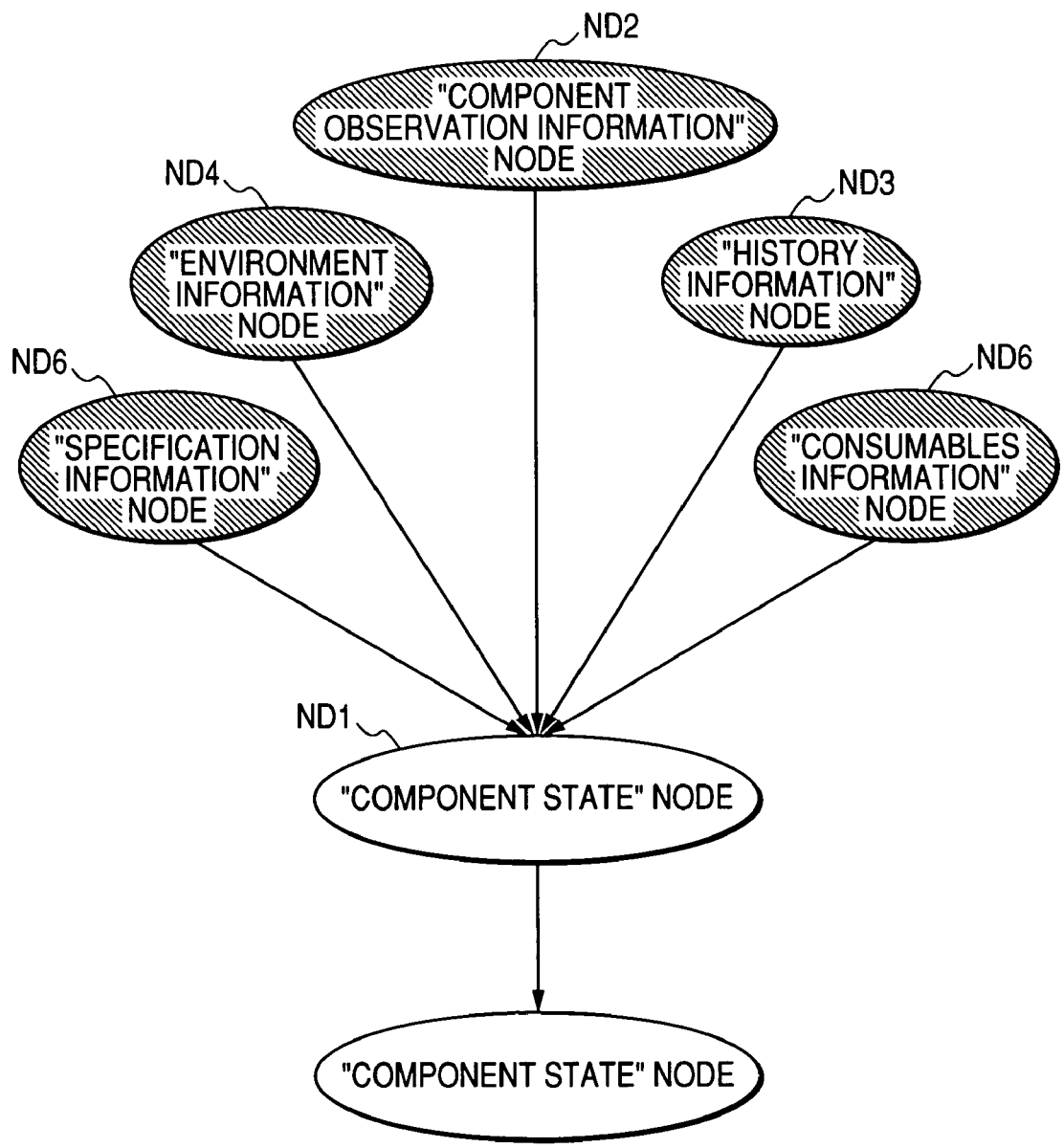
FIG. 11 is the Bayesian network model diagram showing a basic configuration example of the Bayesian network used for failure diagnosis in the failure diagnosis section.

FIG. 11 is the Bayesian network model diagram showing a basic configuration example of the Bayesian network used in the failure diagnosis in the failure diagnosis section 200.

The Bayesian network is a directed acyclic graph showing causal relationships among variables. When a parent is provided, the Bayesian network associates conditional probability distribution with the variables. The Bayesian network models an area in question using the probability theory. Assuming that other related information is given, information regarding a variable sub set is provided with using the Bayesian network expression in question.

The Bayesian network has a set of variables (nodes: expressed by ellipses) and a set of arcs (indicated by arrows) representing directed edges (connections among the variables). The arrows called as arcs represent causal relationships, and are connected from causes to results in the directions of the arrows.

Each of the nodes (variables) has sets exclusive from each other. A probability of occurrence from a cause to a result (conditional probability table) is set in each node in advance. The nodes form a directed acyclic graph (DAG) in conjunction with directed edges. Conditional probability tables $P(v|w1, \ldots, wn)$ are defined for the respective variables v having parents $w1, \ldots, wn$. When v has no parent, this table decreases to a marginal probability $P(v)$.

To a node having no arrow to enter thereinto, only an event probability of the node is set. The great feature of the Bayesian network is in that a probability of a states that cannot be directly observed (for example, occurrence of a failure) is estimated from information that can directly observed (or acquired), and that the probability (whether or not a failure occurs) of the directly unobservable states can be calculated.

Namely, in order to express an area in question including complicated causal relationships, the Bayesian network successively links causal relationships among a plurality of variables to express the area in question as a network having a graph structure. In the Bayesian network, dependency relationships among designed variables are expressed by a directed graph. Then, the Bayesian network provides a graph structure having characteristics that a set of variables form nodes of the network, that a set of links or arrows connect node pairs; and that intuitive meaning of an arrow from node X to node Y is that X directly influences Y (Y depends on X). The graph is a directed acyclic graph having no cycle in the arrow directions.

In FIG. 11, a hatched node is a directly observable node. When calculating the probability of a node shown without hatching, the state of a component (possibility of failure) can be found. For example, Bayes' theorem is used in probability calculation of each node. However, in a network configuration having a large number of nodes and a loop, calculation is substantially impossible since the calculation amount is enormous. Therefore, efficient various calculation algorithms has been invented for accurately updating probabilities in the Bayesian network. Some pieces of calculation software are distributed from manufacturers.

The Bayesian network shown in FIG. 11 corresponds to FIG. 4. Namely, for example, as shown in FIG. 11, the Bayesian network of this embodiment is configured so that the component observation information node (environment node) ND2 indicating environmental conditions, the history information node ND3, the environment information node ND4, the consumables information node ND5, the specification information node ND6 surround the component state node ND1 on the basis of their causal relationships.

The component state node ND1 is a node indicating a component state. The probability of this node is calculated to judge whether or not a failure has occurred. In each node, a probability table summarizing probability data indicating level of the causal relationship is set in advance. Past data or part MTBF (Mean Time Between Failures) may be used as an initial value of the probability data. When value is excessively small, values that are relative among parts may be used so that the levels of the failure probabilities are clear.

The component observation information node ND2 is information automatically acquired inside the image forming apparatus 1 by using sensors and is used in failure diagnosis judgment. In this embodiment, the component observation information node ND2 is sheet conveyance time information, drive current information, and vibration information.

The history information node ND3 indicates the use state of the image forming apparatus 1. In this embodiment, the history information node ND 3 is history information on the fed number. As described in FIG. 4, the fed number is information indicating how many sheets the feed section has fed after installation of the image forming apparatus 1 at a predetermined position or after component replacement. The fed number directly influences wearing of rolls, wearing of gears, and wearing of bearings of motors, and influences the states of components.

The environment information node ND4 relates to surrounding environment conditions that influence the states of components. In this embodiment, the environment information node ND4 is temperature and humidity. As described in FIG. 4, temperature and humidity influence coefficient of friction between a feed roll and a sheet and coefficient of friction between sheets, and influences sheet conveyance time.

The consumables information node ND5 is information on consumables used in the image forming apparatus 1, such as sheet thickness, sheet type, color of coloring material, type of the coloring material, and remaining amounts of the coloring material. For example, depending on sheet type and sheet thickness, friction between a roll and a sheet and friction between sheets change, and influences from the surrounding temperature and humidity also change. Likewise, if an appropriate coloring material is not used, this influences image formation. Namely, specifications of consumables influence failure diagnosis.

The specification information node ND6 is information including destination and special parts. For example, in a device for use in cold regions or for use in coastal regions, members suitable for cold regions or coastal regions are used. When failure diagnosis is executed for a device in which a part suitable for destination is used, if judgment is made without considering the original part specifications, correct judgment cannot be made even in a case where the failure probability calculated for such a part is the same. Namely, product specifications and parts specifications based on the product specifications influence failure diagnosis.

Figure 12:
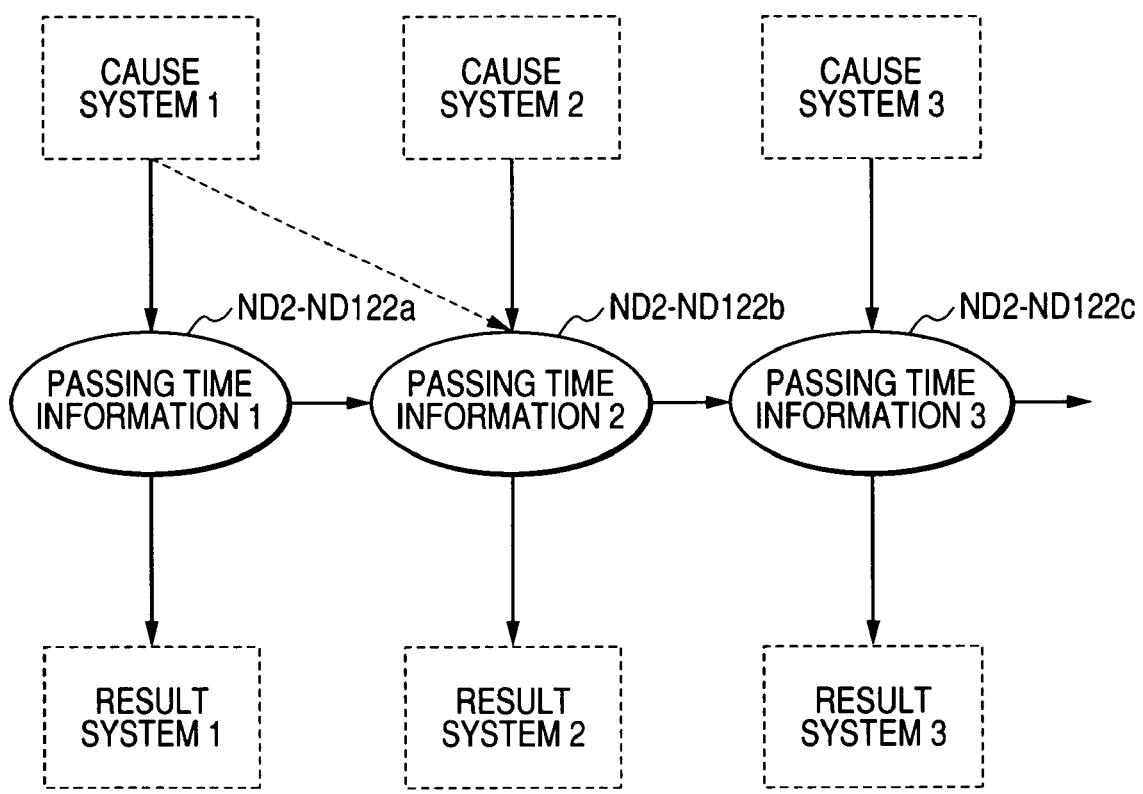
FIG. 12 is a diagram describing relationship among component observation information nodes when the Bayesian network is applied to the failure diagnosis apparatus.

FIG. 12 is a diagram describing relationship of component observation information nodes when the Bayesian network is applied to the failure diagnosis apparatus 3, that is, relationship with the sheet timing sensors 69 and the drive mechanism section 90 divided into blocks.

In this embodiment, a plurality of nodes ND2-ND122 of the sheet conveyance passing times (operation state signals showing conveyance timings and conveyance periods), which are examples of the component observation information node ND2, are connected by arcs in series in the conveying direction of a printing sheet, which is one example of a member to be conveyed. The nodes ND2-ND122 are connected to nodes indicating passing time information by arcs to create causal relationships among them. Namely, the Bayesian networks of cause systems and result systems are connected to the nodes ND2-ND122 of the sheet conveyance passing times. This corresponds to the configuration for detecting the conveyance state of the member to be conveyed successively by sensors in the conveyance system. In the diagnosis process, this configuration is advantageous in that it is easy to specify a failure point. In FIG. 12, only three sheet conveyance passing time nodes ND2-ND122a to ND2-ND122c are shown. However, any number of nodes may be provided.

In the case of the image forming apparatus 1 shown in FIG. 1, the number of the sheet conveyance passing time nodes ND2-ND122 is six that corresponds to the number of the sheet timing sensors 69. This is because a trigger for probability calculation of the Bayesian network is based on jamming.

As understood from the arrangement relationship of the sheet timing sensors 69 shown in FIG. 1, by monitoring the sheet conveyance times using the sheet timing sensors 69, occurrence of conveyance abnormalities (for example, jamming in sheet drawing-in and sheet feeding-out) in predetermined blocks divided in the units of the drive mechanism section 90 to which rollers near the positions of the sheet timing sensors 69 and drive members such as motors and plungers for driving the rollers belong can be judged.

Furthermore, each of the Bayesian networks of the cause systems and the result systems has a plurality of nodes including the component observation information node ND2, the history information node ND3, and the environment information node ND4. The Bayesian networks of the result systems include no node (for example, the result systems 2 and 3 have no node).

Furthermore, the causal relationship is not limited to one in which arc are connected to a single passing time information node from each of the cause systems and result systems, such as the sheet conveyance passing time nodes ND2-ND122a and ND2-ND122c. Arcs may be connected to two or more passing time information nodes like the sheet conveyance passing time nodes ND2-ND122b connected by a dotted line arc shown in FIG. 12.

<<Procedures of Processing for Overall Operation of the Failure Diagnosis Apparatus>>

Figure 13:
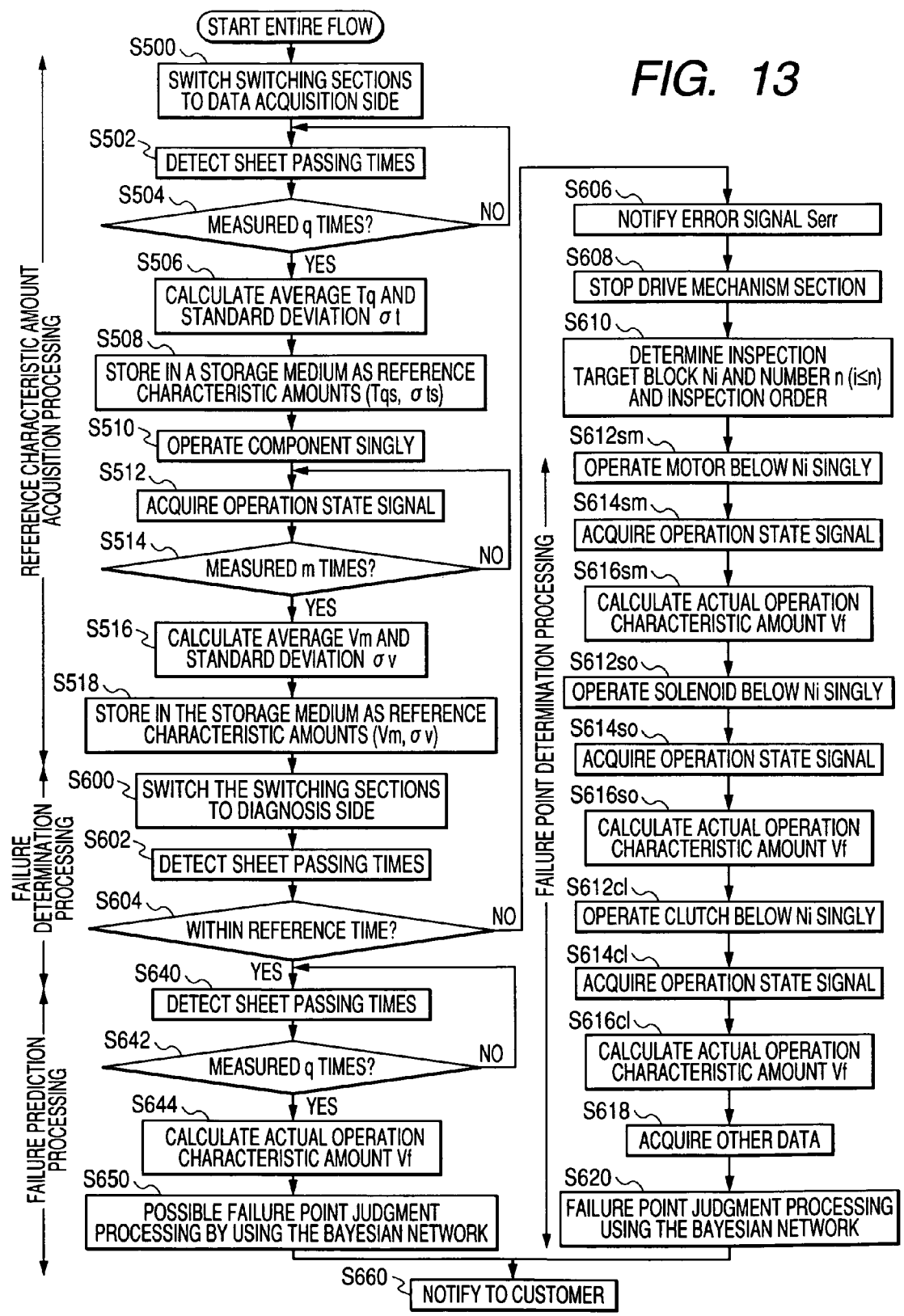
FIG. 13 is a flowchart showing outline of the entirety processing procedures relating to failure diagnosis using the Bayesian network in the failure diagnosis section shown in FIG. 9.
Figure 14:
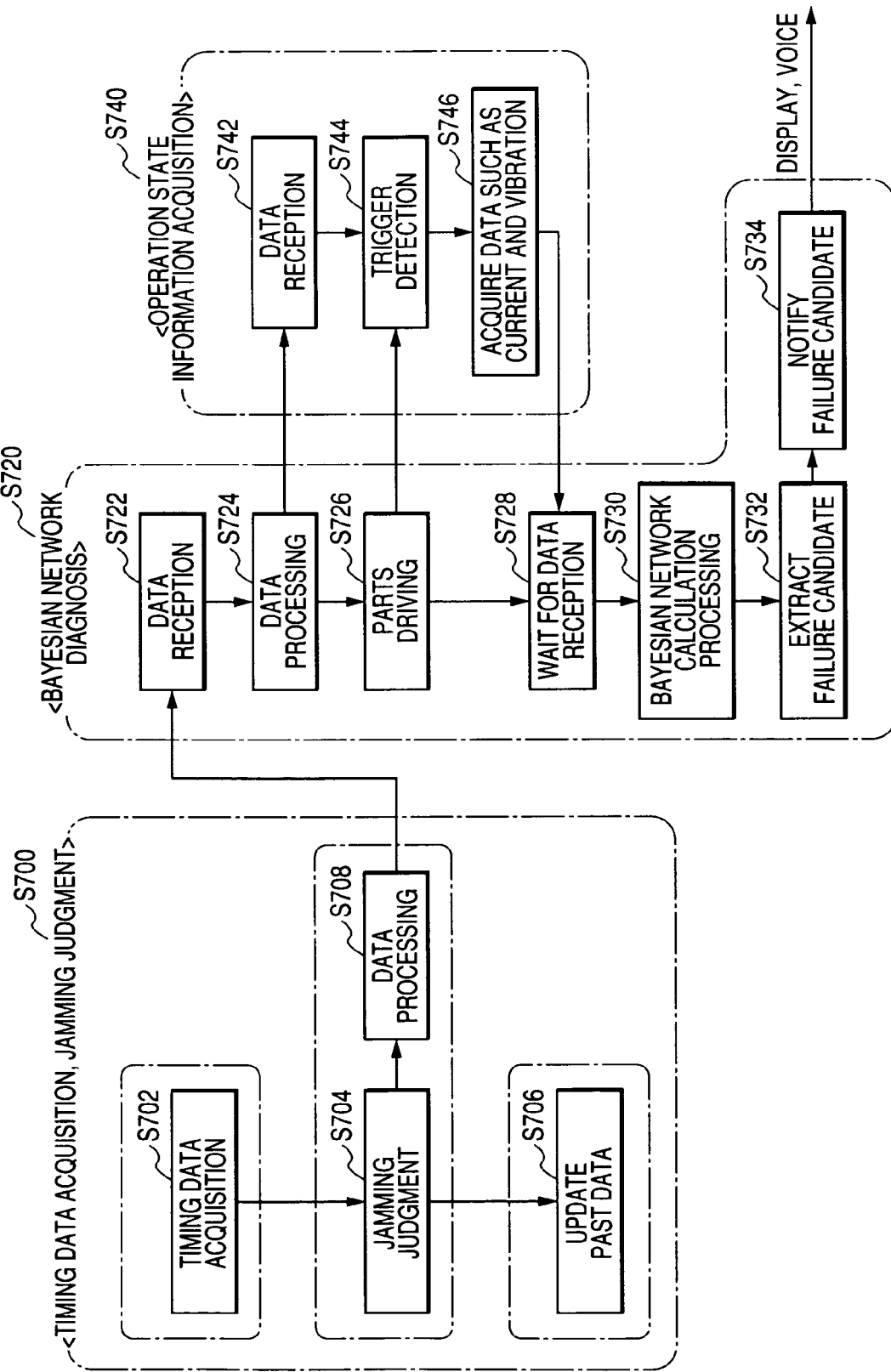
FIG. 14 is a flowchart showing an example of processing procedures for specifying a failure point by using the Bayesian network when jamming occurs.

FIG. 13 is a flowchart showing the outline of the processing procedures regarding failure diagnosis (including not only failure occurrence judgment but also failure prediction) using the Bayesian network in the failure diagnosis section shown in FIG. 9. FIG. 14 is a flowchart showing an example of processing procedures for specifying a failure point by using the Bayesian network.

In the processing procedures shown here, only when the actual operation characteristic amount Tf (sheet passing time) is out of a reference time range, that is, only when jamming occurs, processing for specifying a failure point (failure candidate) based on operation state signals is executed. On the other hand, when the actual operation characteristic amount Tf is within the reference time range, failure prediction processing is executed based on the actual operation characteristic amount Tf. Detailed description will be given hereinafter.

<Reference Characteristic Amount Acquisition Processing>

First, the failure diagnosis section 200 acquires reference characteristic amounts as basic data for failure diagnosis. For example, when the control section 250 begins reference characteristic amount acquisition processing, first, the control section 250 switches both the first switching section 254 and the second switching section 256 to the data acquisition side (S500). In the same manner as in Step S300, the sheet-passing time detection section 160 detects sheet passing times among the sheet timing sensors 69 during normal operation (for example, copying) of the image forming apparatus 1, and supplies the results of detection to the sheet-passing-time characteristic-amount acquisition section 220 of the failure diagnosis section 200 (S502). Then, such data acquisition is repeated q times (S504).

The sheet-passing-time characteristic-amount acquisition section 220 calculates an average value Tq and a standard deviation σt for each combination of sheet timing sensors 69 on the basis of sheet passing time data obtained through q times of acquisition by the sheet passing time detection section 160 (S506). The reference characteristic amount storage section 230 stores the average values Tq and the standard deviations σt as reference characteristic amounts (tqs, σts) for failure prediction diagnosis into the storage medium 232 in a manner that the combinations of the sheet timing sensors 69 can be identified (S508).

For example, regarding either the detection data $D_{curr}$ or $D_{osci}$ taken for 100 through 200 ms, the operation state characteristic-amount acquisition section 210 squares and integrates the data vk of the respective sampling points (k=1 through n) according to the equation (1) in one measurement to obtain characteristic amounts Vn necessary for failure judgment. The equation (1) is almost equivalent to calculation of a value corresponding to an actual working value of an operation current. By thus converting waveform data for a predetermined period into numerical data, failure diagnosis can be easily executed by numerical data comparison instead of waveform pattern comparison.

$$Vn = \sum_{k=1}^{n} (vk)^2 \qquad \text{[Equation 1]}$$

Herein, in this embodiment, measurement of characteristic amounts Vn based on operation state signals (either of digitized detection data Dcurr or Dosci) of the drive mechanism section 90 is made m times (for example, 10 times) to obtain reference values to be used for subsequent failure judgment.

For example, an average value Vm and a standard deviation σv of characteristic amounts obtained through each measurement are calculated, and the calculated average value Vm and the standard deviation σv are defined as reference characteristic amounts to be used as references for failure detection. The reference characteristic amount storage section 230 receives the reference characteristic amounts (Vm, σv) from the operation state characteristic-amount acquisition section 210 and stores them into the storage medium 232 (for example, a nonvolatile memory).

On the other hand, in order to acquire operation state signals, the control section 250 instructs the drive signal generation section 150 to prevent the image forming apparatus 1 from carrying out normal operations such as copying, and members of the drive mechanism section 90 within an inspection target block are made to operate singly (S510). In this single operating state, the drive-section operation current detection section 140 and the vibration detection section 180, which are examples of the operation state signal detection section, acquires operation state signals (either one of digitized detection data $D_{curr}$ or $D_{osci}$) regarding the drive members within the inspection target block (S512) as with step S101. Then, such data acquisition is repeated m times (S514).

For example, the drive signal generation sections 152, 154, and 156 of the drive signal generation section 150 successively operate all the blocks 91 to 94 inside the image forming apparatus 1 and drive members such as the stepping motors 112, the solenoids 122, and the clutches 132 in the blocks. In synch with this operation, the drive-section operation current detection section 140 and the vibration detection section 180 acquire detection data $D_{curr}$ and $D_{osci}$ for approximately 100 ms to 200 ms as described above.

The operation state characteristic-amount acquisition section 210 executes data processing as described above on the basis of the detection data $D_{curr}$ and $D_{osci}$ acquired by the drive-section operation current detection section 140 and the vibration detection section 180 to obtain characteristic amounts Vn necessary for failure judgment. The operation state characteristic-amount acquisition section 210 also obtains, on the basis of the characteristic amounts Vn obtained through m times of detection, average values Vm and standard deviations σv of the characteristic amounts Vn, which serve as reference characteristic amounts for failure judgment (S516). The reference characteristic amount storage section 230 stores the reference characteristic amounts, that is, the average values Vm and the standard deviations σv into the storage medium 232 so as to associate the blocks 91 to 94 and the drive members such as the stepping motors 112, the solenoids 122, and the clutches 132 in the blocks with the reference characteristic amounts.

With the above-mentioned processing, the reference characteristic amount acquisition is completed. Thus, the reference characteristic amount acquisition basically follows the procedures that operation state signals and sheet passing times of the image forming apparatus 1 in normal conditions are acquired, the predetermined data processings described above are executed to extract characteristic amounts, the extracted characteristic amounts are stored as reference characteristic amounts into the storage medium 232.

Normally, this reference characteristic amount acquisition is carried out at the time of shipment of the image forming apparatus 1 or the time of parts replacement of the image forming apparatus 1 put on the market. The reason for a nonvolatile memory being preferably used as the storage medium 232 is for preventing reference characteristic amounts thus acquired obtained and stored in the storage medium 232 from erasing even after the power source of the image forming apparatus 1 is turned off.

<Timing Data Acquisition and Jamming Judgment Processing>

Next, the control section 250 of the failure diagnosis section 200 activates acquisition of sheet passing time information (timing data acquisition) and jamming judgment processing (S700).

As mentioned above, the observation data to be used for failure diagnosis judgment includes drive currents, vibrations, and sounds when each component (motors, solenoids, and clutches) inside the image forming apparatus 1 is operated singly. The observation data also includes timing time such as specific part temperature, light amount changes of a lamp, and sheet passing timings. Furthermore, it is judged whether or not a failure has occurred based on distributions of data acquired in an actual operation state and data measured in advance in normal conditions. For example, values within ±3σ from the averages are judged as normal, and the others are judged as abnormal. When the state is not abnormal, that is, involves no jamming, for example, timing data of 100 times is stored as past data in the storage medium 232 such as a volatile memory.

Then, for example, when the control section 250 starts failure point judgment processing, first, the control section 250 switches the first switching section 254 to the diagnosis 1 side, and switches the second switching section 256 to the diagnosis 2 side (S600). The sheet passing time detection section 160 detects sheet passing times between the respective sheet timing sensors 69 during normal operation (for example, copying) of the image forming apparatus 1, and supplies the results of detection to the sheet-passing-time characteristic-amount acquisition section 220 of the failure diagnosis section 200 (S602).

When the sheet-passing-time characteristic-amount acquisition section 220 acquires the sheet passing time information (timing data), the sheet-passing-time characteristic-amount acquisition section 220 supplies the information to the sheet passing failure judgment section 244 (S702).

The sheet passing failure judgment section 244 (or the sheet passing time detection section 160) judges whether or not the timings at which a printing sheet passes through the sheet timing sensors 69 are within predetermined reference time ranges (S604). When they are out of the reference time ranges, the sheet passing time detection section 160 concludes that jamming has occurred (S704), and notifies the drive signal generation section 150 and the failure judgment section 240 of an error signal $S_{err}$ (S604-No, S606). Furthermore, the sheet passing failure judgment section 244 updates the past data registered in the reference characteristic amount storage section 230 (S706).

When it is concluded that jamming has occurred, the drive signal generation sections 152, 154, and 156 inside the drive signal generation section 150 stop the drive mechanism section 90 by stopping the operations of the stepping motors 112, the solenoids 122, and the clutches 132, thereby stopping sheet conveyance (S608).

<Diagnosis-target-block Specification Processing>

In addition, when jamming occurs, the control section 250 begins processing for specifying a failure occurrence point, that is, a jamming point. In other words, the control section 250 activates data processing for diagnosis-target-block specification processing (S708). For example, the diagnosis-target-block determination section 252 of the control section 250 determines a block to be failure-diagnosed by using the sheet passing time data output from the sheet passing time detection section 160 (S610).

Specifically, from the position of the sheet timing sensor 69 at which jamming has been detected by the sheet passing time detection section 160, the number of blocks to be diagnosed and an inspection order is determined. For example, with reference to FIG. 1, when the third sensor 67 detects jamming, blocks to be inspected are two blocks of the second block 92 and the first block 91. In addition, the block that is most likely to be in failure to which the third sensor 67 directly relates is the second block 92, so that the inspection order is set so that the second block 92 is inspected first.

<Failure Point Specification Processing>

Next, the failure diagnosis section 200 begins failure point specification processing using the Bayesian network (S720). At this time, the sheet passing failure judgment section 244 transmits the results of specification of a jamming point (the first through fourth blocks) (S708) and past data of the timing sensors within the corresponding blocks to the estimation engine 260 (S722).

The estimation engine 260 receives the jamming point and the sheet timing sensor passing times and executes data processing such as calculation of standard deviations from the sheet timing sensor passing times (S724). Furthermore, the estimation engine 260 determines as to whether the values are normal or abnormal, and uses these for Bayesian calculation processing (S730).

Thereafter, the failure judgment section 240 starts operation state information acquisition processing, and acquires operation state characteristic amounts in conjunction with the operation state characteristic-amount acquisition section 210 (S740). For example, the sheet passing failure judgment section 244 of the failure judgment section 240 finds parts (motors, solenoids, or the like) inside the block in question from the jamming point. At the same time, the sheet passing failure judgment section 244 notifies the operation state characteristic-amount acquisition section 210 of the jamming point. Simultaneously, the operation state characteristic-amount acquisition section 210 calculates the number of parts based on this information and sets the number of times of data acquisition.

Thereafter, from the jamming point, parts in the block in question are driven. For example, the drive signal generation section 150, the drive-section operation current detection section 140, and the vibration detection section 180 cooperate with each other to drive the stepping motor 112, the solenoid 122, and the clutch 132 in a block Ni to be inspected first in this order (S726) so that each of them operates singly as a diagnosis target drive member (S612). The failure judgment section 240 (specifically, the operation state failure judgment section 242) waits for that data indicating the operation state including currents and vibrations are taken into the operation state characteristic-amount acquisition section 210 (S728).

When the drive-section operation current detection section 140 and the vibration detection section 180 detect a drive trigger signal for the stepping motor 112, etc. (S744), they acquire, in a single operation state, operation state data including currents and vibrations of each drive member in the inspection target block Ni (either one of detection data $D_{curr}$ or $D_{iosci}$ corresponding to the reference characteristic amounts) (S746), and supplies the acquired operation state data to the operation state characteristic-amount acquisition section 210.

In addition, the operation state characteristic-amount acquisition section 210 executes data processing according to the equation (1) on the basis of the detection data $D_{curr}$ and $D_{osci}$ acquired by the drive-section operation current detection section 140 and the vibration detection section 180 to calculate the characteristic amounts Vn in the actual operation state necessary for failure judgment, and supplies the characteristic amounts to the operation state failure judgment section 242 as actual operation characteristic amounts Vf (S616). Real operation state data such as the acquired currents and vibrations may be supplied to the operation state failure judgment section 242 as actual operation characteristic amounts Vf.

In Steps S612 to S616, the reference symbol sm denotes the processing relating to the stepping motor 112, the reference symbol so denotes the processing relating to the solenoid 122, and the reference symbol cl denotes the processing relating to the clutch 132.

The operation state characteristic-amount acquisition section 210 acquires not only information on the drive members but also various data necessary for other failure diagnosis using the Bayesian network such as environment data including temperature of a specific part or temperature and humidity inside the image forming apparatus 1 in an operation state, or device specifications, etc (S618).

When the failure judgment section 240 receives data (the characteristic amounts Vn in an actual operation state or real operation state data, etc.) from the operation state characteristic-amount acquisition section 210, the failure judgment section 240 extracts candidates of failure points in conjunction with the estimation engine 260 (S620), and notifies the results of extraction to the notification section 270.

For example, the operation state failure judgment section 242 sends current data and vibration data (characteristic amounts Vn in an actual operation state or real operation state data) received from the operation state characteristic-amount acquisition section 210, to the estimation engine 260. The estimation engine 260 calculates failure probabilities based on the data, that is, begins the Bayesian network calculation processing (S730).

The estimation engine 260 determines "zero," "small," "normal," and "large" with respect to individual parts, from the received current data and vibration data. The Bayesian network calculation processing is executed based on the results of this determination, the results of determination of the timing data (either normal or abnormal) in S724, the history information and environment information.

The estimation engine 260 extracts candidates of failure points (S732) on the basis of the calculated failure probabilities, and notifies the failure state specification section 248 of the results of extraction. In this case, the estimation engine 260 adjusts the failure probabilities calculated with taking into consideration distributions of various measurement data indicated by actual operation characteristic amounts (average values, center values, or standard deviations and dispersions c). Likewise, even in a normal state, the estimation engine 260 adjusts the failure probabilities calculated with taking into consideration distributions of various measurement data indicated by reference characteristic amounts. Then, failure candidate points are judged on the basis of the degrees of deviations of the failure probabilities based on operation state signals measured in an actual operation state from normal ranges.

Namely, analysis based on the Bayesian network model is adjusted with reference to degree of deviation of an operation state signal from a normal range predetermined for this operation state signal.

For example, when the measurement data greatly varies although the average values and the center values (median) are equal, the failure probabilities are set to be high. This is effective for judgment of a failure mode having characteristic that great variation appears at the time of failure.

Furthermore, when the degrees of variation are equivalent and averages are within a predetermined range, the failure probabilities are set equal. In the case of measurement data having characteristic that numerical value itself fluctuates even if measurement data involves no failure, erroneous judgment can be avoided without widening the judgment tolerance. Since the judgment tolerance does not need to be widened, judgment accuracy hardly lowers.

The failure state specification section 248 notifies a customer of the failure point candidates extracted by the estimation engine 260 by means of a multimedia device such as a display device or a voice device through the notification section 270 (S660, S734).

Since failure judgment is made using the Bayesian network, not only the judgment as to whether or not failures have occurred in a diagnosis target drive section (specification of failure point candidates), but also details of failures of the stepping motor 112 and the like tat is monitored in operation currents and vibration, the failure possibility in other power transmission members, and details of the failures can be judged on the basis of actual operation characteristic amounts Vf and the degrees of deviations of the failure probabilities calculated on the basis of the actual operation characteristic amounts Vf from the failure probabilities in normal conditions.

<Failure Prediction Processing>

On the other hand, the failure diagnosis section 200 beings failure prediction processing when the sheet passing times in actual operation states (actual operation characteristic amounts Tf) are in normal ranges. Then, the failure diagnosis section 200 makes the image forming apparatus 1 normally operate 100 times to acquire sheet passing time data between the sheet timing sensors 69 by the sheet passing time detection section 160 (S640, S642).

The sheet-passing-time characteristic-amount acquisition section 220 executes data processing in the same manner as in the equation (1) for the sheet passing times Tf between the sheet timing sensors 69 to calculate characteristic amounts Vn in actual operation states necessary for failure prediction. The sheet-passing-time characteristic-amount acquisition section 220 sends the characteristic amounts to the sheet passing failure prediction section 246 as actual operation characteristic amounts Vf (S644). For example, the sheet-passing-time characteristic-amount acquisition section 220 calculates the standard deviation $\sigma tf$ of the sheet passing times Tf between the sheet timing sensors 69 as an actual operation characteristic amount Vf.

Instead of approximately 100 times of normal operation, the actual operation characteristic amounts Vf may be calculated from the sheet passing times Tf of 100 operations on the basis of customer's normal operations.

In this failure prediction, various data necessary for other failure diagnosis using the Bayesian network such as temperature of a specific part, environment data such as temperature and the humidity inside the image forming apparatus 1 in a operation state, or device specifications, etc., may be acquired via the operation state characteristic-amount acquisition section 210.

When the failure judgment section 240 (specifically, the sheet passing failure prediction section 246) receives data from the sheet-passing-time characteristic-amount acquisition section 220, the failure judgment section 240 extracts candidates of points where failures may occur (possibly failed points) in conjunction with the estimation engine 260 by using the Bayesian network (S650). For example, by using the Bayesian network, a failure probability at this time point is calculated, and failure prediction is carried out on the basis of a degree of change from the failure probability in normal conditions stored in the reference characteristic amount storage section 230 and change history.

Failure does not always occur suddenly. In some cases, a failure probability of a component that indicates a sign or symptom of failure gradually changes with use of the image forming apparatus 1. Herein, when the image forming apparatus does not reach failure, the change of the failure probability is within a predetermined range. However, when the image forming apparatus is to reach failure, the failure probability gradually rises (almost linearly) or the change of the failure probability suddenly increases at a certain point. Therefore, by monitoring the change in failure probability (recording the history), failures that will occur in future can be predicted.

At the time of the failure prediction processing herein, the Bayesian network is used. However, the embodiment is not limited to the Bayesian network. The failure prediction may be carried out according to whether or not the standard deviation σtf in an actual operation state is within a predetermined range with respect to the reference standard deviation σts.

For example, the sheet passing failure prediction section 246 judges whether or not the standard deviation σtf is three, four or more times the reference characteristic amount (standard deviation σts) between corresponding sheet timing sensors 69 taken out of the storage medium 232 of the reference characteristic amount storage section 230. Then, the sheet passing failure prediction section 246 concludes that failure will occur in the near future, when the standard deviation σtf in an actual operation state is out of the predetermined range (for example, three, four or more times) of the reference standard deviation σts. On the other hand, when the standard deviation σtf in an actual operation state is within the predetermined range with respect to the reference standard deviation σts, the sheet passing failure prediction section 246 concludes such a state as normal.

The notification section 270 receives notifications of the results of the above-mentioned various judgments (failure point judgment and failure prediction judgment), and notifies a customer of these pieces of information (S660).

As described above, according to the processing procedures shown in FIG. 13, occurrence of failure is judged for each block divided in the units each including a drive member and a power transmission member for transmitting driving force of the drive member to other members, and detailed failure diagnosis is executed for a block that has been judged as being in failure. Namely, the drive mechanism section 90 of the image forming apparatus 1 are divided into blocks (four blocks in this embodiment) in which the drive motor serving as a base of the drive mechanism form the operation unit, and failure judgment is made for each block in conjunction with the sheet passing time detection mechanism.

By narrowing in advance a detailed failure diagnosis target range in the block units, points to be subjected to detailed failure diagnosis can be reduced. Thereby, even in the case of a device, which has large number of drive members and power transmission members, the failure diagnosis processing time can be significantly shortened.

Furthermore, since the operations of the drive members are stopped when a jamming failure is detected, it is avoided that the power is continuously supplied to the drive members and that the drive members abnormally operate due to the failure. Therefore, safety can be achieved.

Furthermore, for processing for specifying a failure point that causes conveyance abnormality such as jamming, provided is means for automatically acquiring information of components (members), which characterize failure, such as the sheet conveyance passing time information and the driving time observation information of parts (motors, solenoids, and clutches, etc.) driven by a power supply, by using sensors. On the basis of the acquired information and characteristic amounts (information relating to distribution, in the above examples) extracted from the information, the apparatus automatically determines the failure probabilities of parts by using the Bayesian network and specifies a part in failure.

Therefore, preliminary knowledge and experience for failure diagnosis become unnecessary. It is possible to execute accurate, uniform, and quick failure diagnosis independent on skill of a person who performs maintenance. Whereby, variation as in a case of user's inputs does not occur. An action of user's input becomes unnecessary. A convenient mechanism, which does not give users stress, can be provided.

In addition, not only information on components (members) but also internal-state information including temperature, humidity of the image forming apparatus, history information, and surrounding environment information are automatically acquired. Based on the characteristic amounts thereof, failure probabilities of parts are determined by using the Bayesian network and a failed part is specified, so that more accurate failure diagnosis can be made.

For example, when a program for automatically acquiring various data necessary for troubleshooting (herein, failure diagnosis) is installed as an automatic troubleshooting mechanism, the diagnosis speed can be increased. Since dialogical data acquisition from customers is not necessary, a convenient diagnosis system, which does not cause customer to have trouble, can be realized.

Various data necessary for failure diagnosis using the Bayesian network is automatically acquired, and failure probabilities are automatically calculated and failure points and failed states are specified. Therefore, even a serviceman who does not have preliminary knowledge or experience can perform accurate failure diagnosis by easy operations.

Furthermore, when the failure probabilities are calculated, the estimation engine 260 calculates the failure probabilities by considering the distributions of various measurement data indicated by the operation characteristic amounts (average values, median values, or standard deviations and dispersions σ) and executes failure diagnosis on the basis of the calculated failure probabilities. Therefore, only by monitoring the operation state signals, it can be judged whether or not failure occurs in power transmission members such as gears, bearings, belts, and rolls for transmitting driving forces of drive members to other members and failed states as well as short circuit and disconnection failures of the drive members.

With respect to various members and various failed states, occurrence of a failure, failed states, or a failure possibility can be judged flexibly. This is because whena power transmission member fails or malfunctions, its influence appears on an operation state signal, and when large number of pieces of data are acquired and distribution thereof is investigated, the condition of the operation state can be more clearly recognized.

Furthermore, a customer is notified of the results of inspection, so that it is possible to notify countermeasure quickly. Downtime can be significantly reduced.

Furthermore, in judgment using characteristic amounts acquired on the basis of sheet passing times detected by the sheet timing sensors 69 as judgment indexes, even when operation state signals in an actual operation state are within normal ranges, the sheet passing times are measured plural times, and the reference characteristic amounts and the measured sheet passing times are compared as in the case of calculation of reference characteristic amounts, that is, operation state signals are detected plural times and distribution thereof and distribution indicating a normal range are compared. Thereby, failure prediction diagnosis is performed for the sheet conveyance roll. Therefore, failure occurrence can be predicted by easy judgment. When failure occurrence is predicted, intentional maintenance can be carried out before resulting in failure, and this reduces maintenance costs.

Thus, according to the failure diagnosis apparatus 3 of this embodiment, various failed states or failure possibilities of various members can be diagnosed accurately, uniformly, and quickly without requiring preliminary knowledge, experience, or skill of a person who performs maintenance.

<Detailed Example of Failure Diagnosis Method>

Figure 15:
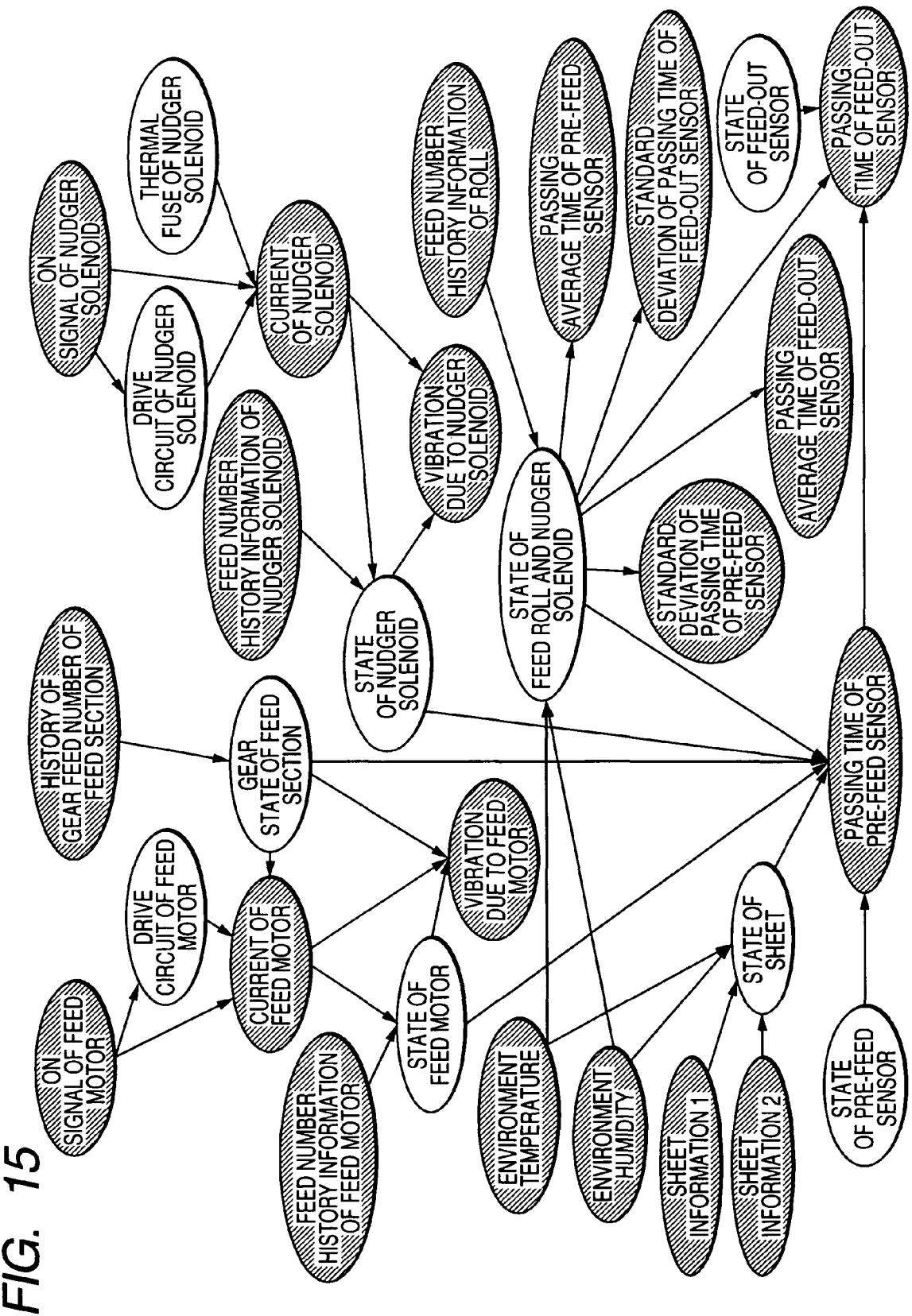
FIG. 15 is a diagram showing the Bayesian network of a first sensor and a second sensor used for monitoring a sheet conveyance by drive members belonging to the first block.
Figure 16:
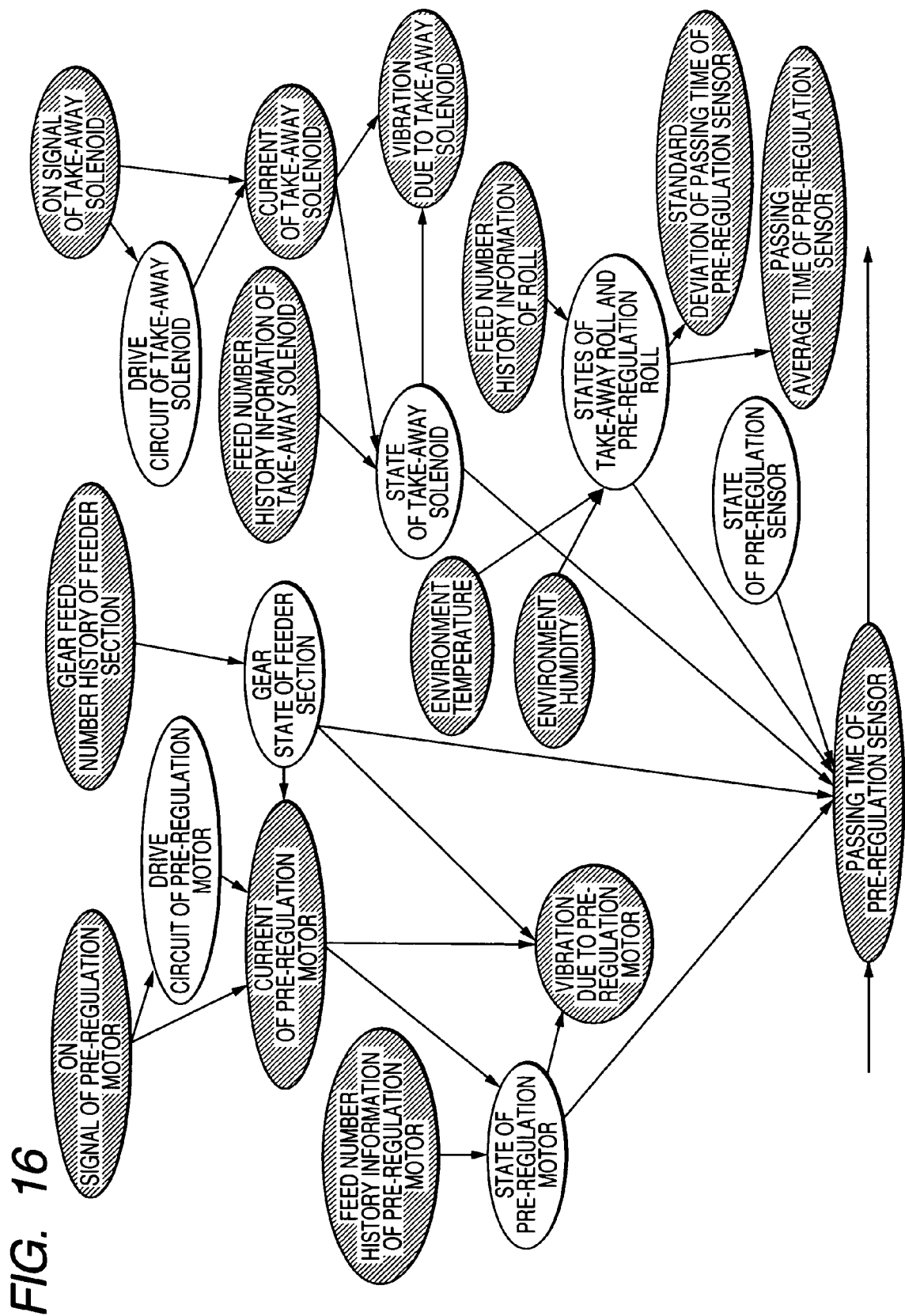
FIG. 16 is a diagram showing the Bayesian network of a third sensor used for monitoring the sheet conveyance by the drive members belonging to the second block.

FIGS. 15 and 16 are views for explaining detailed examples of operations of the failure diagnosis apparatus 3 configured as mentioned above, and are examples of the Bayesian network from the paper feed tray 51 to the third sensor (pre-regulation sensor) 67 in a configuration example of the sheet failure diagnosis. FIG. 15 shows the Bayesian network of the first sensor (feed-out sensor) 65 and the second sensor (feed-out sensor) 66, which are used for monitoring the sheet conveyance performed by the drive members belonging to the first block 91, that is, the Bayesian network of the feed section 53. FIG. 16 shows the Bayesian network of the third sensor (pre-regulation sensor) 67, which is used for monitoring the sheet conveyance performed by the drive members belonging to the second block 92.

FIGS. 17 to 20 are diagrams showing examples of probability tables, which are used in this example. For the nodes of FIGS. 15 and 16, the probability tables as shown in FIG. 17 to FIG. 20 are set in advance.

The Bayesian network of this example are based on timings at which a sheet passes through the sheet timing sensors 69. Therefore, the first sensor 65 to the third sensor 67 are connected in series by arcs in order of sensing a sheet. The networks are configured around component state nodes indicating states of the motor, solenoid, gear, and rolls. With regard to nodes connected to the sensors, cause system networks are connected by arcs. In this example, the Bayesian network of result system is not given.

A "state of the feed motor" node is conditioned by two nodes of "current of the feed motor" node and feed number history information of the feed motor as shown in FIGS. 15 and 16. A probability table as shown in FIG. 17 is set for the "state of the feed motor" node. For example, the state of the feed motor differs between 500,000 sheets or more and 500,000 sheets or less in the feed number history. In the case of 500,000 sheets or more, probability of abnormality (failure) of the state of the feed motor becomes higher than that in the case of 500,000 sheets or less.

The current condition of the feed motor is divided into four divisions of zero, low (lower than normal), normal, and large (larger than normal). In the example of FIG. 17, the probabilities of normality/abnormality (failure) of the feed motor are assigned to all cases.

For example, the feed number history information of the feed motor shows that, when the number of fed sheets is 500,000 sheets or less and the feed motor current is normal, the probability that a state of the feed motor is normal is 99%. On the contrary, the feed number history information of the feed motor shows that, when the number of fed sheets is 500,000 sheets or more and the feed motor current is zero, the probability that a state of the feed motor is normal is 1% (the probability of abnormality is 99%, that is, and there is quite large possibility that the feed motor has malfunctioned).

Such values themselves may be derived from actually measured data or may be experiential values. In terms of estimation of a part that is most likely to be in failure, the levels are more important than the absolute values themselves.

The probability table of the "state of the feed motor" node illustrated herein is stored in the nonvolatile storage medium 232 of the reference characteristic amount storage section 230 provided in the image forming apparatus 1 (failure diagnosis apparatus 3). At the time of failure diagnosis, for example, the feed number history information of the feed motor is called up.

Regarding the current data, for example, we can find which of the four divisions categorized in advance current data corresponds to, by detecting current in a single operation of the feed motor by a current sensor using the operation current detection resistor 142 shown in FIG. 9.

Furthermore, the number of divisions is not especially limited to four. In order to set more detailed probabilities, more current divisions may be set. In this case, the calculation time is lengthened.

In this example, all the cause side nodes can be observed. Therefore, information known in advance and observation information are used for calculation of failure probabilities in the Bayesian network for probability estimation of failure points.

A probability table as shown in FIG. 18 is set for the vibration node due to the feed motor. This node is conditioned by two nodes of a "gear state of the feed section" node and the "state of the feed motor" node. The "vibration of the feed motor" node is divided into four by values as with the case of the current data.

In FIG. 18, when a state of the feed motor is normal and the gear of the feed section is normal, the vibration data indicates that a probability of the normal division is 99%. On the contrary, when the both are abnormal, the probability that the vibration data becomes normal is 0%, the probability that vibration increases is 70%, the probability that vibration reduces is 20%, and the probability that the current reaches zero is 10%. In FIG. 18, the observation data (vibration data) is set on the result side differently from FIG. 17. However, in the Bayesian network, similar calculation can also be carried out in reverse from the result side.

FIG. 19 shows an example of a probability table set for the "ON signal of the feed motor" node. FIG. 20 is an example of a probability table set for a "sheet information" node. Furthermore, with regard to the probability table set for the "sheet information" node indicating sheet thickness and sheet type, probability tables may be set for each of the paper thickness and the sheet type as shown in FIGS. 20A and 20B, or a probability table summarizing both of the sheet thickness and the sheet type may be set as shown in FIG. 20C.

FIGS. 19 and 20 show examples of probability tables of nodes having no cause-side nodes. In these probability tables, occurrence probabilities are simply set without being conditioned. However, the nodes having no cause-side nodes, appearing in FIG. 15 and FIG. 16, are all observable.

In FIG. 19, judgment as to whether the ON signal of the feed motor is normal or abnormal can be made depending on whether the signal is high or low. This judgment is easily made by using electronic circuits.

Furthermore, as shown in FIG. 3, with regard to the sheet information of FIG. 20, a transmitted light detection sensor is used for the sheet thickness (expressed by basis weight), and a reflected light detection sensor is used for detection of the sheet type such as a coated sheet. At the time of starting diagnosis, the ON signal of the feed motor and information as to whether or not the sheet information is normal are acquired in advance and used for probability calculation by means of the Bayesian network.

In FIGS. 15 and 16, on hatched nodes, probabilities are determined from information acquisition means before the probability calculation by means of the Bayesian network is started. On the other hand, the probabilities of nodes without being hatched are not directly observable. The probabilities of such nodes are calculated according to probability estimation of the Bayesian network based on the probabilities of the above-mentioned determined hatched nodes.

Then, when extracting failure point candidates, it is estimated that a part belonging to a node having the highest failure probability among these nodes is in failure. When presenting a customer or a customer engineer the information on the failure point candidate extracted by the estimation, it is preferable that not only information on the position of the failure point candidate but also the probability of the failure are presented.

When diagnosing failures caused by the drive members of the conveyance system, signals indicating the operation states of the drive members (for example, the drive current and vibration) are analyzed on the basis of the Bayesian network for diagnosing failures. Thereby, not only failure diagnosis can be executed for each component forming the drive mechanism, but also failure judgment can be made from a plurality of points of view.

For example, in addition to the operation state signals, various acquired data including the sheet passing time history information, environment information such as temperature and humidity inside the image forming apparatus, and information on consumables such as a sheet and coloring materials used in the image forming apparatus, and device specification information are analyzed on the basis of the Bayesian network model. Thereby, failure judgment can be made from a plurality of points of view. As a result, a failure probability relating to one phenomenon is calculated on the basis of a plurality of characteristic amounts to make failure judgment from a plurality of points of view. Even when a plurality of failure causes exist with respect to one phenomenon, a plurality of failure causes (failure occurrence points) and failed conditions can be specified.

Figure 21:
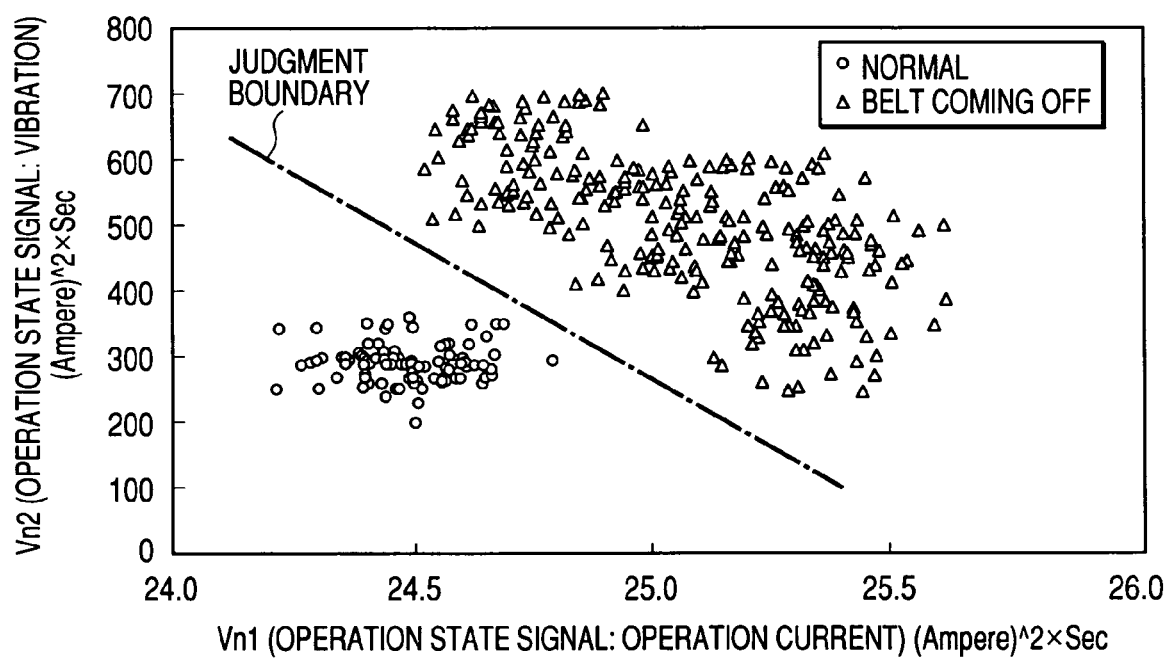
FIG. 21 is a scattering diagram showing relationship between characteristic amounts (Vn1, Vn2) in a normal condition and characteristic amounts (Vf1, Vf2) when a belt has come off, wherein both operation current $I_{sm}$ and vibration waveform of a stepping motor of the fourth block of FIG. 1 are used as operation state signals.

For example, FIG. 21 is a scattering diagram, in which operation current Ism and vibration waveform of the stepping motor 112 of the fourth block 94 (drive mechanism section 90) of FIG. 1 are both used as operation state signals, showing relationship between the characteristic amounts in normal conditions (Vn1, Vn2) and characteristic amounts (Vf1, Vf2) when the belt comes off. Herein, the histogram is omitted. However, with regard to the both of the characteristic amount Vn1 relating to the operation current Ism and the characteristic amount Vn2 relating to the vibration, distributions in the normal conditions and failed conditions partially overlap each other. Therefore, when the failure judgment method using one characteristic amount is employed, the judgment is erroneous in most cases.

On the other hand, when judging one phenomenon from a plurality of points of view, distinction between normality and abnormality can be made even if the characteristic amounts in normal conditions and the characteristic amounts in failed conditions are convoluted with each other.

As such a method, for example, linear discriminant analysis, quadratic discriminant analysis, or canonical discriminant analysis, which are general methods for multivariate analysis, may be used. However, as described in this embodiment, when executing failure diagnosis using the Bayesian network, judgment on either a normal state or a failure state and discrimination of failure occurrence points can be made accurately and easily without using these methods.

Figure 22A:
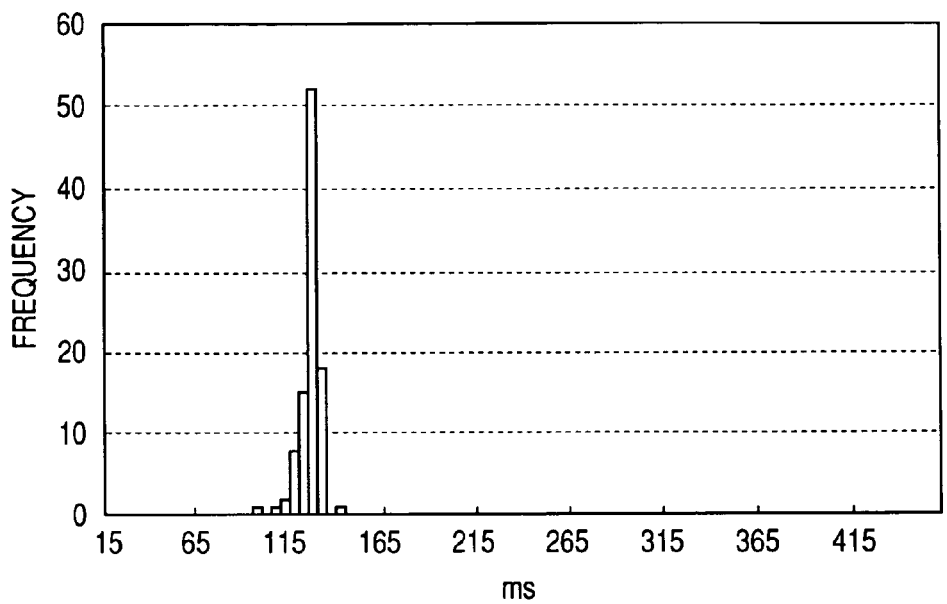
FIG. 22 is diagrams describing a specific example of a failure judgment for the sheet conveyance roll.

FIG. 22 is diagrams describing detailed examples of failure judgment regarding the sheet conveyance rolls. When jamming occurs, it is considered that the block including the drive mechanism section immediately before the jamming point is in failure. However, even when jamming occurs, there are almost no differences in operation current and vibration of the drive members from those in normal conditions. Therefore, in the method in which the characteristic amount Vn based on the operation current and vibration is used as a judgment index, it is difficult to judge a failure (breakage or wearing) of a sheet conveyance roll.

On the other hand, when a sheet conveyance roll fails, the standard deviation of timings at which a printing sheet passes through the sheet timing sensors 69 increases as shown in FIG. 22. When using this in the failure judgment, it becomes possible to judge the conveyance roll failure.

For example, first, at the time of shipment or parts replacement of the image forming apparatus 1, on the basis of the sheet passing times $S_{time}$ detected by the sheet timing sensors 69 shown in FIG. 1, the time distribution among the sensors is analyzed. For example, an average value Tq and a standard deviation σt are calculated. Then, these average value Tq and standard deviation σt are stored in a memory (the storage medium 232 of FIG. 9 in this embodiment) as the reference characteristic amounts.

Next, in a case of detecting jamming during the actual operation, it is considered that a sensor before another sensor that has detected the jamming, for example, the fourth sensor 68 has detected the jamming, the first to fourth sensors 65 to 68 involves the jamming. Therefore, the failure probability based on the actual operation characteristic amounts calculated from the sheet conveyance times between these sensors and the failure probability based on the reference characteristic amounts stored in the memory are compared to judge roll failure.

Also, the above-mentioned characteristic amounts are periodically measured and failure probabilities based on the actual operation characteristic amounts are calculated. Then, the calculated failure probabilities based on the actual operation characteristic amounts are compared with the failure probability based on the reference characteristic amounts stored in the memory. Thereby, a part that will fail in the near future can be estimated.

Figure 22B:
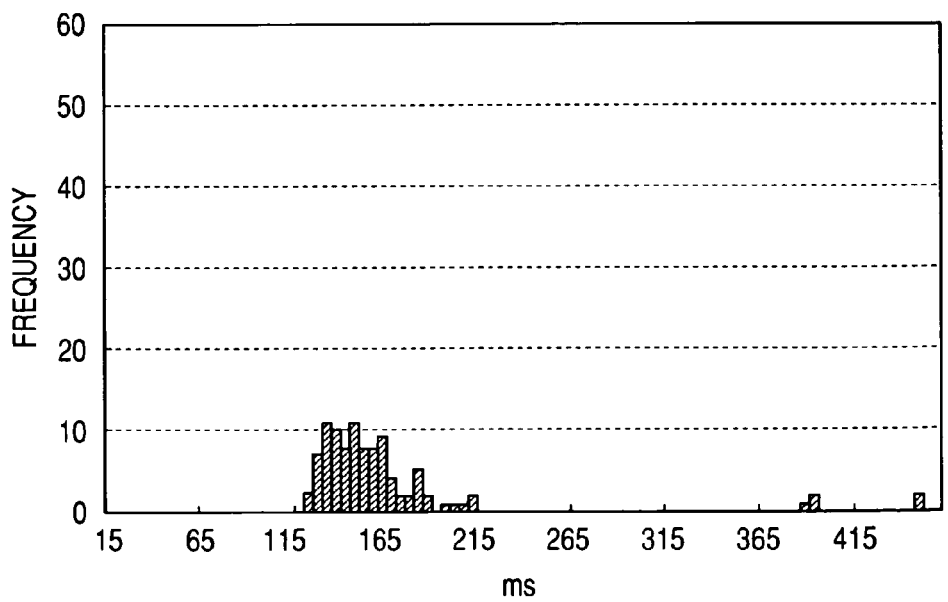

As shown in FIG. 22B, when a part gets deteriorating, the degree of the standard deviation of the time distribution increases. Therefore, for example, if the deviations of the sheet conveyance times between the sensors from the average values Tq stored as reference characteristic amounts become three or four times the standard deviation σt stored as a reference characteristic amount, a part relating thereto (in this case, the sheet conveyance roll) is regarded as being in failure in the near future. Therefore, when the variation is large great, it is possible to easily judge failure of the roll and the failure occurrence in the future by performing calculation of the failure probability while considering the distribution, for example, by adjusting the failure probability to be high.

Furthermore, when extracting failure point candidates, a part relating to a node having the largest failure probability may not be simply estimated as failed, but the degree of fluctuation with respect to the failure probability in normal conditions may also be referred to. In this case, the degree of fluctuation may be always referred to, or the degree of fluctuation may be referred to only when the failure probabilities of all nodes are equal to or less than (or less than) a predetermined value (for example, 90%).

For example, it is assumed that two nodes have potential to be failure candidates, and the failure probability of one node is 80% and the failure probability of the other node is 85%. If the degree of fluctuation with respect to the failure probability in normal conditions is greater at the one node, it is estimated that, not the other node having the largest failure probability, but a part relating to said one node that has fluctuation from a normal condition greater than that of the other one although having a failure probability smaller than that of the other one, is in failure.

Furthermore, although not shown in FIGS. 15 and 16, an installation location and the specification information node ND 6 may be set as the environment information node ND 4, and failure probabilities may calculated with reference to information on a destination and special parts. In this case, failure candidate points are not specified based on only the levels of the failure probabilities, but failure candidates are judged by considering totally the levels of the probabilities and fluctuation ranges with respect to probabilities in normal conditions according to the destination and states of special parts. Thereby, it becomes possible to judge proper failure candidate points according to the location where the image forming apparatus is installed.

For example, with regard to a device installed in a cold region, if a failure probability of a member on the basis of amounts of characteristics that have no relation with specifications for cold regions is smaller than that of other members, it should be judged that the member with specifications for cold regions is suitable for being regarded as a failure candidate as with the case of the judgment made by referring to fluctuation ranges with respect to probabilities in normal conditions described above.

On the other hand, with regard to the failure probability of a member for a cold region based on amounts of characteristics of specification for the cold region, even if fluctuation range with respect to a probability in a normal state is small, when the failure probability is equal to or higher than a predetermined value, a state is judged as being unable to satisfy the specifications. Then, this member should be regarded as a failure candidate ahead of probabilities of other nodes.

Furthermore, in a simple system, it can be considered that failure occurs at only one point. In such a case, as a most direct approach, a simple probability in the case where each failure occurs singly, that is, a probability of occurrence of a predetermined failure is considered regardless of simultaneous occurrence of other failures.

On the other hand, in a complicated system, a plurality of failures may simultaneously occur. In such a case, if a customer is informed of a single failure, that is, a part relating to a node having the highest failure probability as a failure point candidate, the customer may misunderstand. In such a case, a plurality of failure points in pairs and failure probabilities of the failure points are associated and then presented to the customer or customer engineer.

When the extracted failure candidate points and probabilities are presented, not only the extracted points but also the conditions of the entirety may be presented. In this case, for example, the Bayesian network configuration diagram shown in FIGS. 15 and 16 may be presented. The nodes indicated as failure candidate points may be presented in a display manner in which they are easily discriminated by using graphic display architecture by being enhanced (highlighted) or differed in display color from other nodes, and probabilities are indicated in correspondence with the nodes (for example, inside circles that indicate nodes or near the nodes). Numerical characters showing probabilities may be presented in a display manner in which they are discriminated by being sized larger than others, enhanced, or differed in display color.

Furthermore, the same display manner may be applied to all the nodes other than the extracted failure candidates. Alternatively, for example, a display manner may be employed in which the probabilities are divided by several stages, and emphasizing display or different display colors are used depending on the stages so that the stages can be easily discriminated.

Figure 23:
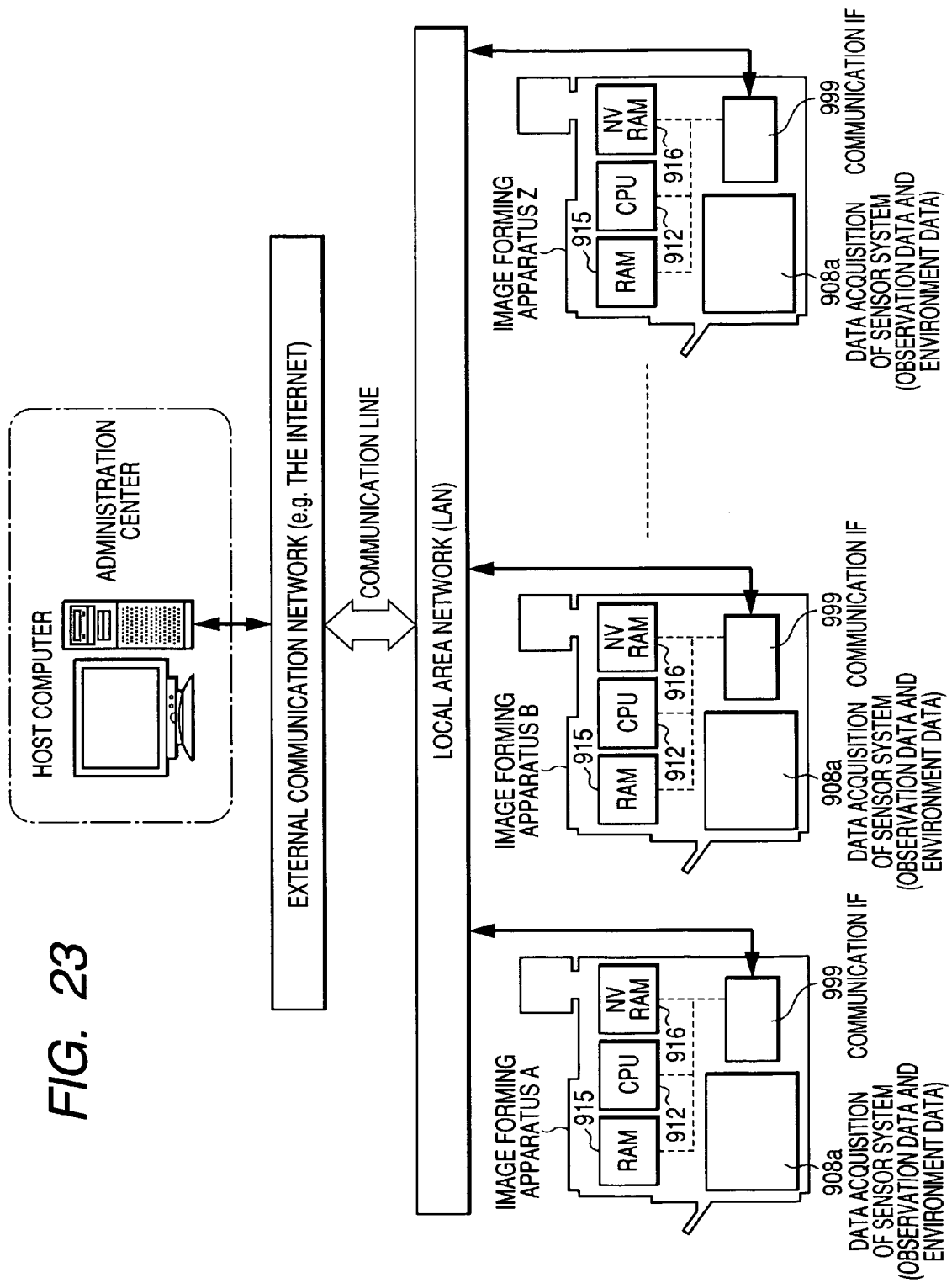
FIG. 23 is a diagram showing a configuration example of the failure diagnosis system, which executes a failure diagnosis at an administration center connected to the image forming apparatus via a communications line.

FIG. 23 is a diagram showing a configuration example of the failure diagnosis system constructed so as to execute failure diagnosis at an administration center connected to the image forming apparatus 1 via a communications line.

In the illustrated failure diagnosis system 800, a plurality of image forming apparatuses 1 (A, B . . . Z) that are configured so as to process data acquired via data acquisition function sections 908a as shown in FIG. 10 by software processing using the CPU 912 and a memory such as the RAM 915 or NVRAM 916 are connected to a local area network (LAN) 802. The LAN 802 is further connected to an external communication network 806 such as the Internet through the communications line 804.

In the respective image forming apparatuses 1 (A, B . . . Z), data acquisition function sections 908a of a sensor system for acquiring the observation data information (ND120) such as the sheet passing times, drive currents, vibrations, operation sounds, and light amounts; and environment information (ND140) such as the temperature and humidity, shown in FIG. 4, are provided. The measured data can be externally notified through the communications IF 999 and the LAN 802.

At the administration center 10, a host computer 812 is provided. Communication processing can be performed between the administration center 10 and the image forming apparatuses (A, B . . . Z) via the external communication network 806, the communication line 804, and the LAN 802.

In the host computer 812, except for the data acquisition function sections 908a in the failure diagnosis apparatus 3 described in the above-mentioned embodiment, an application program for implementing by means of software processing data processing functional parts including characteristic amount acquisition function parts, failure judgment function parts, and estimation engine functional parts relating to failure diagnosis is installed. For example, the characteristic amount acquisition functional parts serving as data reception function parts correspond to the operation state characteristic-amount acquisition section 210, the sheet-passing-time characteristic-amount acquisition section 220, and the control section 250 shown in FIG. 9. The data processing function parts correspond to, for example, the failure judgment section 240, the control section 250, the estimation engine 260, and the notification section 270 shown in FIG. 9.

With this configuration, the failure diagnosis system 800 serves as a system in which the failure judgment section 240 and the estimation engine 260 are provided at the administration center 810 outside the image forming apparatus by utilizing communication lines such as the Internet and the LAN 802. Therefore, the failure diagnosis system 800 is configured so that failure diagnosis for the image forming apparatuses 1 is executed in the host computer 812 of the administration center 810.

Such a system configuration has the data acquisition function section 908a serving as means for automatically acquiring by means of a sensor information about a component (a part), which characterizes failure, such as the sheet conveyance passing time information, the drive time observation information about a part (e.g. a motor, a solenoid, and a clutch) driven by power supply, when executing a processing for specifying a failure point that is a cause of occurrence of conveyance abnormality such as jamming. This system configuration can transmit measurement data acquired by the data acquisition function section 908a to the administration center 810 through the communication lines.

Therefore, in the administration center 810, the host computer 812 automatically determines failure probabilities of parts using the Bayesian network based on the measurement data and characteristic amounts (in the example, the information relating to distribution) extracted from the measurement data, and specifies the failure part.

Therefore, as with the embodiment described above in which the failure diagnosis apparatus 3 is provided inside the image forming apparatus 1, preliminary knowledge and experience are not necessary for failure diagnosis. Accurate, uniform, and quick failure diagnosis without depending on the skill of a person who performs maintenance can be performed. Not only the information on components (members), but also internal-state information such as temperature and humidity of the image forming apparatuses, history information, and surrounding environment information may be automatically acquired. On the basis of the characteristic amounts, failure probability of a part may be determined by using the Bayesian network, and a part in failure may be specified. Thus, more accurate failure diagnosis can be executed.

The administration center can execute failure diagnosis for a plurality of image forming apparatuses together via the Internet. Therefore, a serviceman can check the results of diagnosis in advance. When the serviceman goes to perform repair, he/she can quickly make a response such as preparation of necessary parts.

Furthermore, before resulting in a failure, preliminary diagnosis (example of failure prediction processing) may be performed. Therefore, scheduled maintenance becomes possible before resulting in failure. As a result, service costs can be significantly reduced. The same applies to a case where the failure diagnosis apparatus is provided inside the image forming apparatus 1. A maintenance plan can be prepared by performing diagnosis without going to the apparatus installed location, so that the service costs can be further reduced more.

The invention is described above with reference to an embodiment, however, the technical scope of the invention is not limited to the range described in the above embodiment. Various modifications and improvements of the embodiment are possible without deviating from the spirit of the invention, and modes including such modifications or improvements are also included in the technical scope of the invention.

Furthermore, the above-mentioned embodiment is not intended to limit the invention according to the claims, and all combinations of characteristics described in the embodiment are not always essential to the solution means of the invention. The above-mentioned embodiments include inventions of various steps, and various inventions can be extracted by appropriate combinations of a plurality of constituent features disclosed. Even if several constituent features are deleted from all constituent features shown in the embodiments, a construction from which the several constituent features are deleted can be extracted as an invention as long as the effects are obtained.

For example, in the above-mentioned embodiment, an example is shown in which the method for modeling is the Bayesian network model, however, any method for modeling may be used as long as the method uses probabilities.

Furthermore, in the above-mentioned embodiment, an example is shown in which the failure diagnosis apparatus is applied to an image forming apparatus having a copying function, a printer function, or a facsimile function, or a complex machine having a combination of these functions, however, the unit to which the failure diagnosis apparatus is applied is not limited to the image forming apparatus, and it may be applied to other arbitrary machines such as home appliances and automobiles.

What is claimed is:

1. An image forming apparatus comprising:
    a conveyance section that conveys a member to be conveyed and comprises a drive mechanism having a drive member that receives power supply to operate and a power transmission member that transmits drive force of the drive member to another member;
    an image formation section that forms an image on the member to be conveyed that is conveyed by the conveyance section to a predetermined position;
    an operation state signal acquisition section that acquires by a sensor an operation state signal indicating an operation state during the drive mechanism operating for a predetermined period, the operation state signal acquisition section including a drive mechanism vibration detection section that detects a signal indicating vibration of the drive mechanism as the operation state signal;
    an environment information acquisition section that acquires by a sensor environment information relating to an operation of the drive mechanism; and
    a failure diagnosis apparatus further comprising:
      a failure diagnosis section that includes a failure judgment section, a failure probability estimation section and a notification section, wherein
        the failure diagnosis section analyzes an operation state signal based on a failure probability model, to calculate failure probabilities of constituent members of the drive mechanism, the failure probability model obtained by modeling a cause of failure occurring in the image forming apparatus using previously measured failure probabilities of the constituent members of the drive mechanism, and
        the failure diagnosis section analyzes the environment information based on the failure probability model to execute the failure diagnosis,
    executing failure diagnosis with respect to the image forming apparatus based on the calculated probabilities of the constituent members of the drive mechanism, wherein:
      the operation state signal indicates at least one of (x) a conveyance timing of the member to be conveyed and (y) a conveyance time of the member to be conveyed; and
      at a point in time within the period, the failure probability model is adapted to values of other operating states automatically acquired before the point in time, wherein
    the failure probability model is a Bayesian network model, the Bayesian network utilizes a stochastic model genetic algorithm for generating searching points using statistical information of preferable individuals in a population,
    the failure diagnosis section executes the failure diagnosis based on a reference characteristic amount, calculated by an average value, standard deviation, and dispersion and an adjustment of the failure probability model,
    the failure diagnosis section divides the drive mechanism into a plurality of blocks,
    the failure diagnosis section executes the failure diagnosis with respect to each of the blocks,
    each of the blocks has a single motor as the drive member, and
    a transmission member of each block transmits a drive force of the single motor within each of the blocks.

2. The image forming apparatus according to claim 1, wherein the failure diagnosis section executes the failure diagnosis based on (a) the reference characteristic amount, which is obtained when the drive mechanism operates normally, and (b) an actual operation characteristic amount, which is obtained from the acquired operation state signal.

3. The image forming apparatus according to claim 1, wherein the failure diagnosis section adjusts the analyzing on a basis of degree of deviation of the operation state signal from a normal range, which is set for the operation state signal in advance.

4. The image forming apparatus according to claim 1, wherein the operation state signal acquisition section comprises a drive section operation current detection section that detects a signal indicating operation current flowing in the drive member as the operation state signal.

5. The image forming apparatus according to claim 1, wherein the environment information acquisition section acquires at least one of (s) peripheral temperature of the drive mechanism and (t) peripheral humidity of the drive mechanism as the environment information.

6. The image forming apparatus according to claim 1, further comprising:
   a history storage section that stores history information of the operation state signal in the conveyance section, wherein:
   the failure diagnosis section analyzes the history information stored in the history storage section based on the failure probability model to execute the failure diagnosis.

7. The image forming apparatus according to claim 6, wherein the history storage section stores as the history information number of conveyances of the member to be conveyed after one of new installation of the image forming apparatus, replacement of consumables, and replacement of a part.

* * * * *